United States Patent
Takenaka et al.

(10) Patent No.: US 11,167,791 B2
(45) Date of Patent: Nov. 9, 2021

(54) WORK VEHICLE AND METHOD FOR CONTROLLING WORK VEHICLE

(71) Applicant: KOMATSU LTD., Tokyo (JP)

(72) Inventors: Yuita Takenaka, Tokyo (JP); Masanobu Nakabayashi, Tokyo (JP); Masanori Ikari, Tokyo (JP)

(73) Assignee: KOMATSU LTD., Tokyo (JP)

( * ) Notice: Subject to any disclaimer, the term of this patent is extended or adjusted under 35 U.S.C. 154(b) by 563 days.

(21) Appl. No.: 16/082,561

(22) PCT Filed: May 29, 2017

(86) PCT No.: PCT/JP2017/019935
§ 371 (c)(1),
(2) Date: Sep. 6, 2018

(87) PCT Pub. No.: WO2017/209058
PCT Pub. Date: Dec. 7, 2017

(65) Prior Publication Data
US 2019/0071119 A1    Mar. 7, 2019

(30) Foreign Application Priority Data
May 31, 2016  (JP) .............................. JP2016-109163

(51) Int. Cl.
*B62D 5/09*  (2006.01)
*B62D 6/00*  (2006.01)
(Continued)

(52) U.S. Cl.
CPC .............. *B62D 5/091* (2013.01); *B62D 1/12* (2013.01); *B62D 5/09* (2013.01); *B62D 5/28* (2013.01);
(Continued)

(58) Field of Classification Search
CPC . B62D 5/091; B62D 1/12; B62D 5/09; B62D 5/28; B62D 6/008; B62D 12/00;
(Continued)

(56) References Cited

U.S. PATENT DOCUMENTS 5,307,895 A    5/1994  Duffy
5,732,789 A    3/1998  Stephenson
(Continued)

FOREIGN PATENT DOCUMENTS

CN         1174148 A    2/1998
CN       101772447 A    7/2010
(Continued)

OTHER PUBLICATIONS

The Office Action for the corresponding Chinese application No. 201780013281.6, dated Jan. 3, 2019.
(Continued)

*Primary Examiner* — Jacob D Knutson
(74) *Attorney, Agent, or Firm* — Global IP Counselors, LLP

(57) ABSTRACT

An articulated work vehicle in which front and rear frames are linked includes a joystick lever configured to be operated by an operator, a hydraulic actuator driven by hydraulic pressure, a control valve, a force imparting component, and a controller. The joystick lever is usable to set a target steering angle. The hydraulic actuator performs an articulation to change an actual steering angle of the front frame with respect to the rear frame in response to operation of the joystick lever. The control valve controls flow of fluid supplied to the hydraulic actuator so as to make the actual steering angle coincide with the target steering angle. The force imparting component applies an assisting force or a counterforce to operation of the joystick lever. The controller controls the force imparting component so as to generate (Continued)

resistance to operation of the joystick lever based on a start timing of an articulation.

20 Claims, 29 Drawing Sheets

(51) Int. Cl.
    *B62D 6/10* (2006.01)
    *B62D 1/12* (2006.01)
    *B62D 12/00* (2006.01)
    *E02F 9/08* (2006.01)
    *B62D 5/28* (2006.01)
    *G01L 5/22* (2006.01)
    *B62D 12/02* (2006.01)

(52) U.S. Cl.
    CPC ............ *B62D 6/008* (2013.01); *B62D 12/00* (2013.01); *E02F 9/08* (2013.01); *G01L 5/223* (2013.01); *B62D 6/10* (2013.01); *B62D 12/02* (2013.01)

(58) Field of Classification Search
    CPC .. B62D 6/10; B62D 12/02; E02F 9/08; G01L 5/223
    See application file for complete search history.

(56) References Cited

U.S. PATENT DOCUMENTS

| | | | | |
|---|---|---|---|---|
| 6,179,082 | B1* | 1/2001 | Ikari | B62D 5/06 180/418 |
| 6,202,501 | B1 | 3/2001 | Ikari | |
| 8,272,472 | B2* | 9/2012 | Shinagawa | B62D 5/06 180/421 |
| 8,887,855 | B2* | 11/2014 | Kamada | B60K 17/356 180/242 |
| 10,266,200 | B2* | 4/2019 | Takenaka | B62D 6/002 |
| 10,384,713 | B2* | 8/2019 | Takenaka | B62D 6/008 |
| 10,518,803 | B2* | 12/2019 | Takenaka | E02F 9/225 |
| 10,562,564 | B2* | 2/2020 | Ikari | B62D 12/00 |
| 10,730,549 | B2* | 8/2020 | Takenaka | B62D 5/091 |
| 10,794,043 | B2* | 10/2020 | Takenaka | B62D 12/00 |
| 10,865,543 | B2* | 12/2020 | Takenaka | B62D 1/12 |
| 2008/0041655 | A1 | 2/2008 | Breiner et al. | |
| 2008/0162000 | A1* | 7/2008 | Dattilo | B62D 6/008 701/42 |
| 2010/0108431 | A1 | 5/2010 | Makuta et al. | |
| 2011/0029199 | A1 | 2/2011 | Saito et al. | |
| 2012/0010790 | A1 | 1/2012 | Kanayama et al. | |
| 2012/0217083 | A1* | 8/2012 | Brickner | B62D 12/00 180/417 |
| 2013/0068544 | A1 | 3/2013 | Itou et al. | |
| 2014/0214278 | A1 | 7/2014 | Kuipers et al. | |

FOREIGN PATENT DOCUMENTS

| | | |
|---|---|---|
| CN | 102015417 A | 4/2011 |
| CN | 102365227 A | 2/2012 |
| CN | 102917942 A | 2/2013 |
| DE | 3625003 A1 | 2/1987 |
| EP | 3 248 856 A1 | 11/2017 |
| EP | 3 254 934 A1 | 12/2017 |
| JP | 57-110562 A | 7/1982 |
| JP | 3-74269 A | 3/1991 |
| JP | 6-83469 A | 3/1994 |
| JP | 11-105723 A | 4/1999 |
| JP | 11-321664 A | 11/1999 |
| JP | 2007-106308 A | 4/2007 |
| JP | 2010-23676 A | 2/2010 |
| JP | 2015-168294 A | 9/2015 |

OTHER PUBLICATIONS

The International Search Report for the corresponding international application No. PCT/JP2017/019935, dated Jun. 27, 2017.
The extended European search report for the corresponding European application No. 17806613.0, dated Sep. 6, 2019.

* cited by examiner

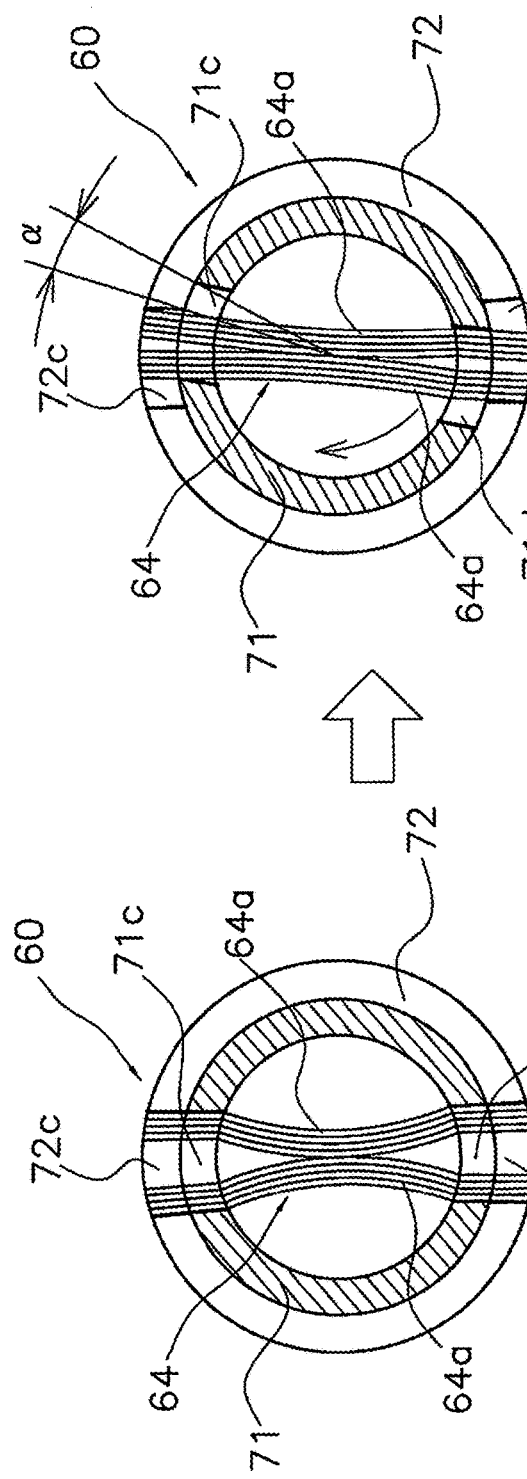
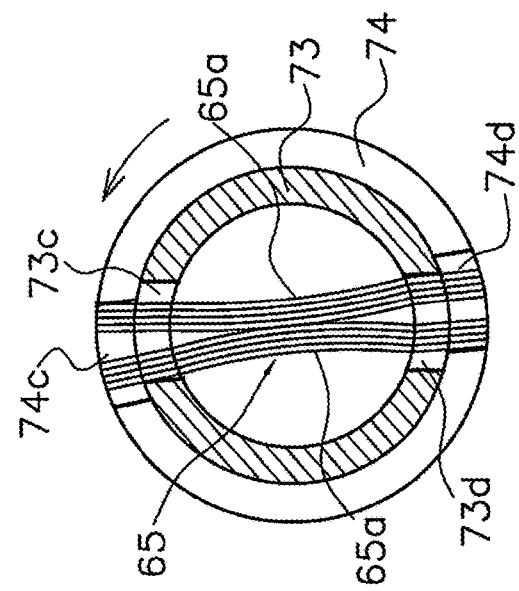
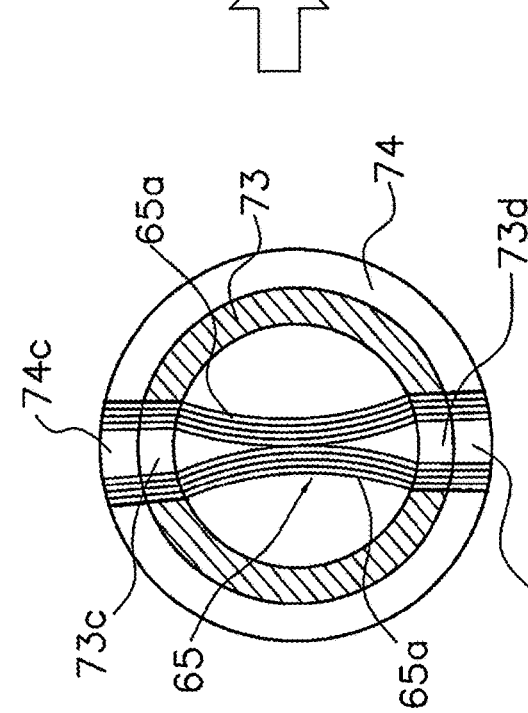
FIG. 4A FIG. 4B FIG. 4C FIG. 4D

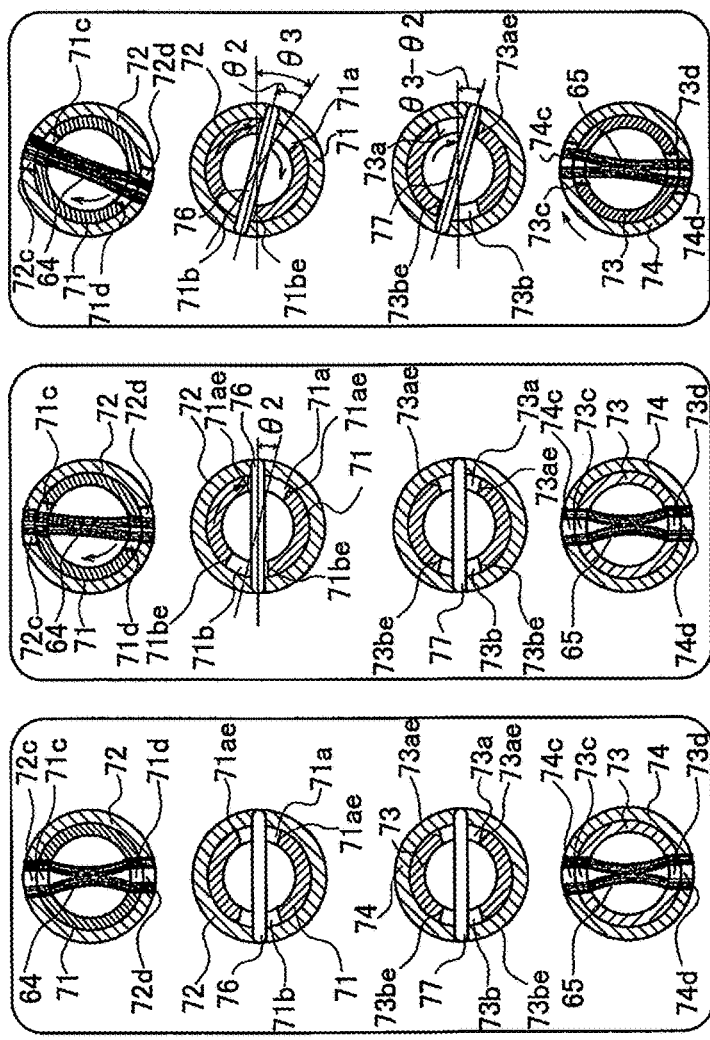
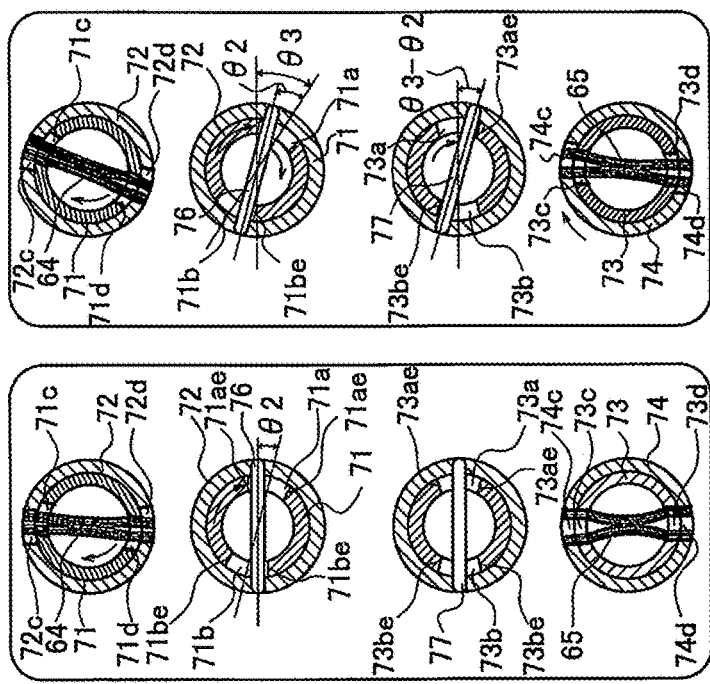
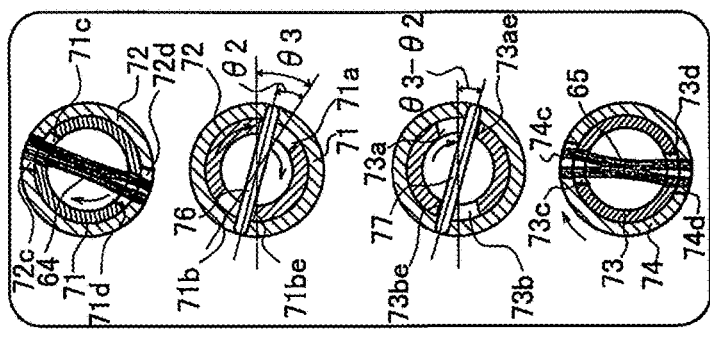
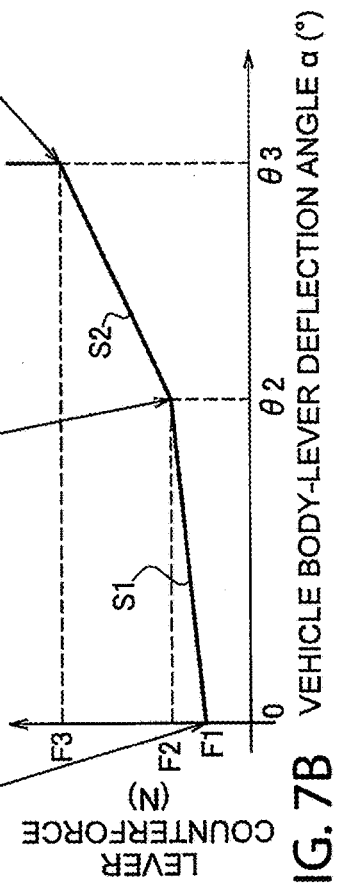
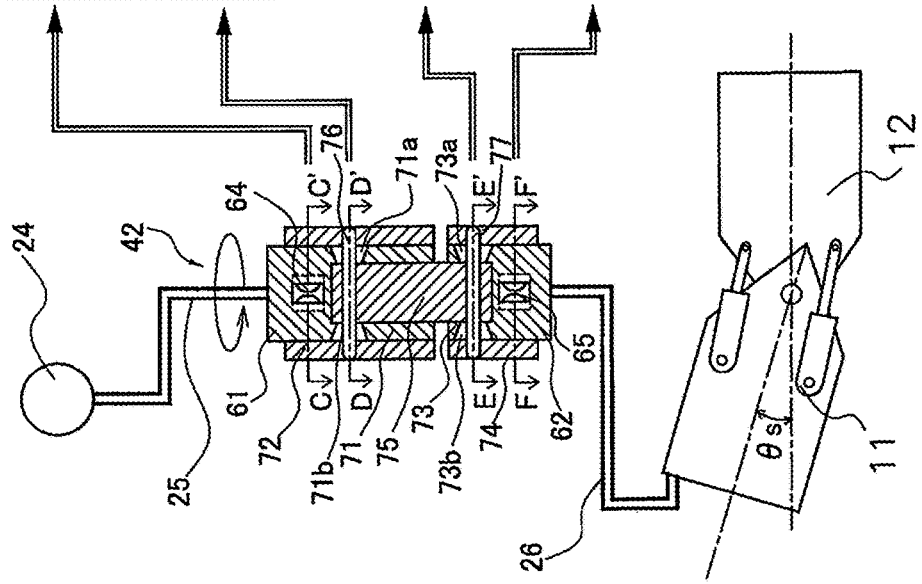

WORK VEHICLE AND METHOD FOR CONTROLLING WORK VEHICLE

CROSS-REFERENCE TO RELATED APPLICATIONS

This application is a U.S. National stage application of International Application No. PCT/JP2017/019935, filed on May 29, 2017. This U.S. National stage application claims priority under 35 U.S.C. § 119(a) to Japanese Patent Application No. 2016-109163, filed in Japan on May 31, 2016, the entire contents of which are hereby incorporated herein by reference.

BACKGROUND

Field of the Invention

The present invention relates to a work vehicle and to a method for controlling a work vehicle.

Background Information

As an articulated work vehicle, a configuration has been disclosed in which the steering angle is varied by controlling the flow of fluid supplied to a hydraulic actuator disposed spanning a front frame and a rear frame (see, for example, JP-A H11-105723 and JP-A H11-321664).

The work vehicles in JP-A H11-105723 and JP-A H11-321664 are provided with a steering valve that adjusts the flow of fluid supplied to a hydraulic actuator according to an inputted pilot pressure, and a pilot valve that adjusts the pilot pressure to be supplied to the steering valve.

The pilot valve is provided with an operation input shaft and a feedback input shaft, which are able to rotate relative to each other. The operation input shaft is linked to the joystick lever and rotates according to the rotation angle of the joystick lever. Also, the feedback input shaft is linked to the front frame by a link mechanism, and rotates according to the change in the steering angle.

This pilot valve adjusts the pilot pressure inputted to the steering valve according to the difference between the rotation angle of the operation input shaft and the rotation angle of the feedback input shaft. The flow of fluid supplied from the steering valve to the hydraulic actuator is changed according to the adjusted pilot pressure, and the steering angle is changed.

Since the steering angle is thus varied hydraulically, the operator can change the steering angle by merely pushing on the joystick lever with the light operating force necessary for changing the open or closed state of the port of the pilot valve.

SUMMARY

However, with the work vehicles in the above-mentioned Patent Literature 1 and 2, it was difficult to perform fine operation on the joystick lever.

That is, due to play in the pilot valve and the characteristics near the neutral position of the steering valve, the joystick lever is provided with a play angle. Therefore, within the angular range of play, the vehicle body will not bend even if the joystick lever is moved, and only once the play angle is exceeded will the spool of the steering valve open and the body begin to bend.

Consequently, when the operator wants to bend the vehicle body just a little, it is necessary to operate the joystick lever by an angle that is somewhat greater than the play angle. However, since the steering angle can be changed by merely pushing on the joystick lever with a light operating force as mentioned above, the operator cannot feel the end of the play angle, making it difficult to perform a fine operation such as slightly bending the vehicle body.

It is an object of the present invention to provide a work vehicle and a method for controlling a work vehicle with which it is easy to perform fine operations.

The work vehicle according to the first invention is an articulated work vehicle in which a front frame and a rear frame are linked, said work vehicle comprising a joystick lever, a hydraulic actuator, a control valve, a force imparting component, and a controller. The joystick lever is operated by the operator and allows the target steering angle to be set. The hydraulic actuator is driven by hydraulic pressure and performs an articulation for changing the actual steering angle of the front frame with respect to the rear frame in response to operation of the joystick lever. The control valve controls the flow of fluid supplied to the hydraulic actuator so as to make the actual steering angle coincide with the target steering angle. The force imparting component imparts an assisting force or counterforce to the operation of the joystick lever. The controller controls the force imparting component so as to generate resistance against the operation of the joystick lever on the basis of the start timing of the articulation.

By thus generating resistance against the operation of the joystick lever on the basis of the start timing of the articulation, the operator can feel the work vehicle start to bend with his hand. Therefore, the vehicle body can be slightly bent, making fine operations easier to perform.

The resistance against the joystick lever may be generated at the start timing of the articulation, or may be before the start timing or after the start timing.

The work vehicle according to the second invention is the work vehicle according to the first invention, wherein the controller controls the force imparting component so as to generate resistance to the operation of the joystick lever from a first position of the joystick lever in a state in which the deviation angle between the target steering angle and the actual steering angle is zero, to a second position of the joystick lever at which the articulation begins.

Thus generating resistance against the operation of the joystick lever before or at the start of the articulation allows the operator to feel the start timing of the articulation with his hand.

Therefore, the vehicle body can be bent slightly by moving the joystick lever just a little from the position where the resistance was felt, making it easy to perform fine operations.

Also, saying that the deviation angle is zero encompasses a margin of error.

The work vehicle according to the third invention is the work vehicle according to the first invention, wherein the controller generates resistance to the operation of the joystick lever by decreasing the assisting force or increasing the counterforce.

This allows resistance to be generated while imparting an assisting force or counterforce to the operation of the joystick lever.

The work vehicle according to the fourth invention is the work vehicle according to the first invention, further comprising a steering valve that adjusts the flow of fluid supplied to the hydraulic actuator on the basis of a pilot pressure inputted from the control valve. The control valve controls the flow of fluid supplied from the steering valve to the hydraulic actuator by adjusting the pilot pressure. The controller controls the force imparting component so that the opening timing of the steering valve falls within the period during which the resistance is generated.

Consequently, the operator can feel the point at which the steering valve driving the hydraulic actuator opens up from the resistance produced in the joystick lever, and it is easier to perform a fine operation.

The work vehicle according to the fifth invention is the work vehicle according to the first invention, wherein the control valve has a first input member, a second input member, and a biasing component. The first input member is displaced according to the target steering angle. The second input member is displaced according to the actual steering angle. The biasing component biases the first input member so that the amount of displacement of the first input member coincides with the amount of displacement of the second input member. The difference between the amount of displacement of the first input member and the amount of displacement of the second input member corresponds to the deviation angle between the target steering angle and the actual steering angle. The joystick lever is operated against the biasing force of the biasing component.

Consequently, after the joystick lever is operated, the steering angle changes in response to the joystick lever, and when the operation amount of the joystick lever coincides with the steering angle, the control valve is in the neutral position.

Also, the control valve is thus provided with a biasing component, and the operator operates the joystick lever with an operating force that goes against the biasing force produced by the biasing component. The force imparting component is controlled so as to generate resistance to operation against this biasing force.

The work vehicle according to the sixth invention is the work vehicle according to the first invention, further comprising a timing sensor that senses the timing at which the generation of resistance is started, which is preset on the basis of the start timing of the articulation. The controller controls the force imparting component so as to start generating resistance against the operation of the joystick lever when the timing sensor senses this timing.

This makes it possible to feel the start of articulation in the operator's hand.

The work vehicle according to the seventh invention is the work vehicle according to the sixth invention, wherein the timing sensor has a target steering angle sensor that senses the target steering angle, and an actual steering angle sensor that senses the actual steering angle. The controller controls the force imparting component so as to start the generation of resistance against the operation of the joystick lever at the point when the deviation angle calculated from the sensing value of the target steering angle sensor and the sensing value of the actual steering angle sensor reaches a specific value preset on the basis of the start timing of the articulation.

Setting the specific value on the basis of the timing at which the articulation starts makes it possible to generate resistance against the operation of the joystick lever near the point when articulation starts, depending on the deviation angle. Accordingly, the operator can feel the start of the articulation, making it easier to perform a fine operation.

The work vehicle according to the eighth invention is the work vehicle according to the sixth invention, further comprising a steering valve that adjusts the flow of fluid supplied to the hydraulic actuator on the basis of the pilot pressure inputted from the control valve. The control valve controls the flow of fluid supplied from the steering valve to the hydraulic actuator by adjusting the pilot pressure.

Thus, articulation can be started by operating the joystick lever to move the control valve and adjust the pilot pressure.

The work vehicle according to the ninth invention is the work vehicle according to the eighth invention, wherein the timing sensor senses the position of the valve body of the steering valve. The controller controls the force imparting component so as to start the generation of resistance against the operation of the joystick lever at the point when the position of the valve body sensed by the timing sensor reaches a specific value set in advance on the basis of the start timing of the articulation.

Setting the specific value on the basis of the timing at which the articulation starts makes it possible to generate resistance against the operation of the joystick lever near the point when articulation is started, depending on the valve body position. Accordingly, the operator can feel the start of the articulation, making it easy to perform a fine operation.

The work vehicle according to the tenth invention is the work vehicle according to the eighth invention, wherein the timing sensor senses the pilot pressure. The controller controls the force imparting component so as to start the generation of resistance against the operation of the joystick lever at the point when the pilot pressure sensed by the timing sensor reaches a specific value preset on the basis of the start timing of the articulation.

Setting the specific value on the basis of the timing at which the articulation starts makes it possible to generate resistance against the operation of the joystick lever near the point when articulation starts, depending on the pilot pressure. Accordingly, the operator can feel the start of the articulation, making it easy to perform a fine operation.

The work vehicle according to the eleventh invention is the work vehicle according to the eighth invention, further comprising a pump that supplies fluid to the hydraulic actuator via the steering valve. The timing sensor senses the load pressure on the pump. The controller controls the force imparting component so as to start the generation of resistance against the operation of the joystick lever at the point when the load pressure on the pump sensed by the timing sensor reaches a specific value set in advance on the basis of the start timing of the articulation.

Setting the specific value on the basis of the timing at which the articulation starts makes it possible to generate resistance against the operation of the joystick lever near the point when articulation starts, depending on the pump load pressure. Accordingly, the operator can feel the start of the articulation, making it easy to perform a fine operation.

The work vehicle according to the twelfth invention is the work vehicle according to the first invention, further comprising a torque sensor that senses the torque produced by operation of the joystick lever. The force imparting component has an electric motor as a drive source. The controller controls the force imparting component on the basis of the value sensed by the torque sensor.

Consequently, a force can be applied according to the torque applied by the operator to the joystick lever. For example, the imparted force can be controlled so that when the torque applied to the joystick lever by the operator is high, the assisting force imparted by the imparting component is increased, and when the torque is low, the assisting force is decreased.

The work vehicle according to the thirteenth invention is the work vehicle according to the seventh invention, further comprising a torque sensor that senses the torque produced by operation of the joystick lever. The force imparting component has an electric motor as a drive source. The controller has a calculator and an operation controller. The calculator calculates the force to be imparted to the operation of the joystick lever by matching the imparted force that is preset for the sensed torque to an imparted force that is preset for the deviation angle. The operation controller operates the force imparting component so that the calculated force will be imparted.

This makes it possible to generate resistance against the operation of the joystick lever on the basis of the timing of the start of the articulation while imparting an assisting force or a counterforce with the force imparting component to the operation of the joystick lever.

The work vehicle according to the fourteenth invention is the work vehicle according to the ninth invention, further comprising a torque sensor that senses the torque produced by operation of the joystick lever. The force imparting component has an electric motor as a drive source. The controller has a calculator and an operation controller. The calculator calculates the force to be imparted to the operation of the joystick lever by matching the imparted force that is preset for the torque to an imparted force that is preset for the position of the valve body. The operation controller operates the force imparting component so that the calculated force will be imparted.

This makes it possible to generate resistance against the operation of the joystick lever on the basis of the timing of the start of the articulation while applying an assisting force or a counterforce with the force imparting component to the operation of the joystick lever.

The work vehicle according to the fifteenth invention is the work vehicle according to the tenth invention, further comprising a torque sensor that senses the torque produced by operation of the joystick lever. The force imparting component has an electric motor as a drive source. The controller has a calculator and an operation controller. The calculator calculates the force to be imparted against the operation of the joystick lever by matching the imparted force that is preset for the torque to an imparted force that is preset for the pilot pressure. The operation controller operates the force imparting component so that the calculated force will be imparted.

This makes it possible to generate resistance against the operation of the joystick lever on the basis of the timing of the start of the articulation while applying an assisting force or a counterforce with the force imparting component to the operation of the joystick lever.

The work vehicle according to the sixteenth invention is the work vehicle according to the eleventh invention, further comprising a torque sensor that senses the torque produced by operation of the joystick lever. The force imparting component has an electric motor as a drive source. The controller has a calculator and an operation controller. The calculator calculates the force to be imparted against the operation of the joystick lever by matching the imparted force that is preset for the torque to an imparted force that is preset for the load pressure on the pump. The operation controller operates the force imparting component so that the calculated force will be imparted.

This makes it possible to generate resistance against the operation of the joystick lever on the basis of the timing of the start of the articulation while applying an assisting force or a counterforce with the force imparting component to the operation of the joystick lever.

The work vehicle according to the seventeenth invention is the work vehicle according to any of the fourteenth to sixteenth inventions, further comprising a speed sensor that senses the speed of the work vehicle. The imparted force preset for the torque is varied on the basis of the speed sensed by the speed sensor.

This makes it possible to change the force imparted to the operation of the joystick lever by the force imparting component according to the torque and also according to the speed of the vehicle, and furthermore allows resistance to the operation of the joystick lever to be generated on the basis of the timing of the start of the articulation.

The work vehicle according to the eighteenth invention is the work vehicle according to any of the first to seventeenth inventions, wherein the control valve is linked to the joystick lever.

Consequently, the operation of the joystick lever is transmitted to the control valve.

The method for controlling a work vehicle according to the nineteenth invention is a method for controlling an articulated work vehicle in which a front frame and a rear frame are linked, comprising a first acquisition step, a generation step, and a transmission step. The first acquisition step involves acquiring a first signal from a timing sensor that senses the start timing of an articulation. The generation step involves generating a second signal for generating resistance against the operation of a joystick lever on the basis of the first signal. The transmission step involves transmitting the second signal to a force imparting component that imparts an assisting force or a counterforce to the operation of the joystick lever.

Thus generating resistance against the operation of the joystick lever on the basis of the start timing of the articulation allows the operator to feel the start of bending of the work vehicle with his hand. Therefore, the vehicle body can be bent just a little, making it easy to perform fine operations.

The resistance to the joystick lever may be generated at the start of the articulation, or may be before or after the start.

The work vehicle control method according to the twentieth invention is the work vehicle control method according to the nineteenth invention, further comprising a second acquisition step. This second acquisition step involves acquiring a third signal from a torque sensor that senses the torque produced by operation of the joystick lever.

The generation step comprises a first determination operation, a second determination operation, and a computation operation. In the first determination operation, the counterforce to be imparted to the operation of the joystick lever is determined on the basis of the first signal, and a fourth signal is outputted. In the second determination operation, the assisting force or counterforce to be imparted to the operation of the joystick lever is determined on the basis of the third signal, and a fifth signal is outputted. In the computation operation, the counterforce indicated by the fourth signal and the assisting force or counterforce indicated by the fifth signal are added together to generate the second signal.

This makes it possible to generate resistance against the operation of the joystick lever on the basis of the timing of the start of the articulation while imparting an assisting force or a counterforce with the force imparting component to the operation of the joystick lever.

The present invention provides a work vehicle and a method for controlling a work vehicle with which it is easy to perform fine operations.

BRIEF DESCRIPTION OF DRAWINGS

FIGS. 4a and 4b are cross sections along the A-N line in FIG. 3, and FIGS. 4c and 4d are cross sections along the B-B' line in FIG. 3;

FIG. 7a is a simplified diagram of the pilot valve in FIG. 3, FIG. 7b is a graph of the relation between the lever counterforce and the vehicle body-lever deflection angle in the pilot valve in FIG. 7a, FIG. 7c consists of cross sections along the C-C', D-D', E-E', and F-F' lines in FIG. 7a when the deviation angle α is zero, FIG. 7d consists of cross sections along the C-C', D-D', E-E', and F-F' lines in FIG. 7a when the deviation angle α is θ2, and FIG. 7e consists of cross sections along the C-C', D-D', E-E', and F-F' lines in FIG. 7a when the deviation angle α is θ3;

FIG. 10a is a graph of first assist torque information provided for each speed stored in the storage component in FIG. 9 (the assist torque imparted versus the lever input torque), and FIG. 10b is a graph of lever counterforce versus the vehicle body-lever deviation angle when assist torque is and is not imparted, on the basis of the first assist torque information in FIG. 9a;

FIG. 11a is a graph of second assist torque information stored in the storage component in FIG. 9 (the assist torque imparted versus the vehicle body-lever deviation angle), and FIG. 11b is a graph of lever counterforce versus the vehicle body-lever deviation angle when assist torque is and is not imparted, on the basis of the second assist torque information in FIG. 11a;

FIG. 13 is a graph of the assist torque obtained by combining the first assist torque information shown in FIG. 10a with the second assist torque information shown in FIG. 11a;

FIG. 27 is a graph of the assist torque obtained by combining the first assist torque information shown in FIG. 26 with the second assist torque information shown in FIG. 11a;

DETAILED DESCRIPTION OF EMBODIMENTS

A wheel loader in an embodiment of the present invention will now be described through reference to the drawings.

Embodiment 1

Configuration Overview of Wheel Loader Configuration

Figure 1:
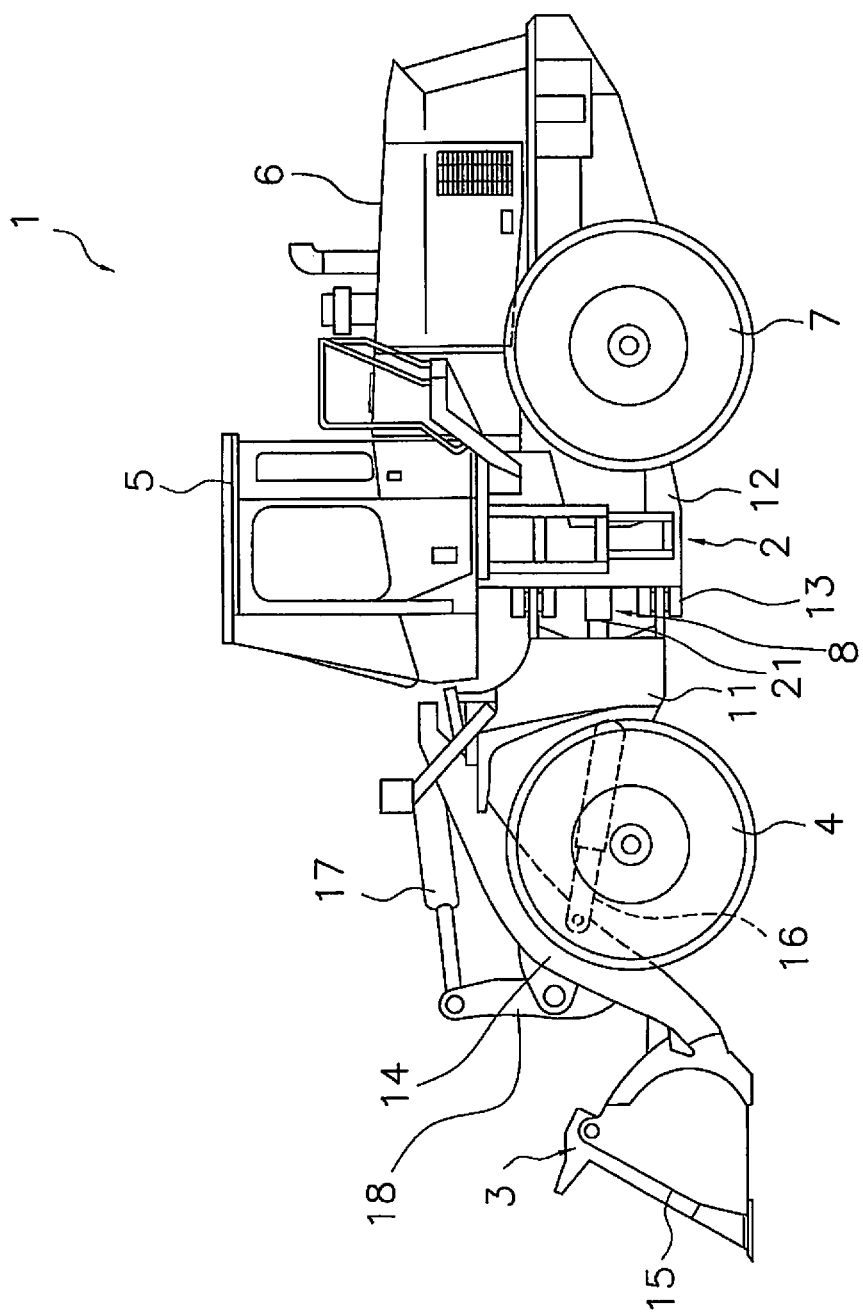
FIG. 1 is a side view of a wheel loader in Embodiment 1 of the present invention.

FIG. 1 is a simplified diagram of the configuration of a wheel loader 1 in this embodiment. The wheel loader 1 in this embodiment comprises a body frame 2, a work implement 3, a pair of front tires 4, a cab 5, an engine compartment 6, a pair of rear tires 7, and a steering operation device 8 (see FIG. 2 described below).

The wheel loader 1 uses the work implement 3 to load earth and perform other such work.

The body frame 2 is what is called an articulated type, and has a front frame 11, a rear frame 12, and a connecting shaft 13. The front frame 11 is disposed ahead of the rear frame 12. The connecting shaft 13 is provided in the center in the vehicle width direction, and links the front frame 11 and the rear frame 12 so that they can pivot relative to each other. The front tires 4 are mounted on the left and right sides of the front frame 11. The rear tires 7 are mounted on the left and right sides of the rear frame 12.

The work implement 3 is driven by hydraulic fluid from a work implement pump (not shown). The work implement 3 has a boom 14, a bucket 15, a lift cylinder 16, and a bucket cylinder 17. The boom 14 is mounted on the front frame 11. The bucket 15 is attached to the distal end of the boom 14.

The lift cylinder 16 and the bucket cylinder 17 are hydraulic cylinders. One end of the lift cylinder 16 is attached to the front frame 11, and the other end of the lift cylinder 16 is attached to the boom 14. The expansion and contraction of the lift cylinder 16 causes the boom 14 to pivot up and down. One end of the bucket cylinder 17 is attached to the front frame 11, and the other end of the bucket cylinder 17 is attached to the bucket 15 via a bell crank 18. As the bucket cylinder 17 expands and contracts, the bucket 15 pivots up and down.

The cab 5 is mounted on the rear frame 12, and in its interior are disposed a steering wheel or a joystick lever 24 (see FIG. 2 described below) for a steering operation, a lever for operating the work implement 3, various display devices, and the like. The engine compartment 6 is disposed on the rear frame 12 to the rear of the cab 5, and houses an engine.

The steering operation device 8 will be described in detail below, but has steering cylinders 21 and 22, and when the flow of fluid supplied to the steering cylinders 21 and 22 is changed, this changes the steering angle of the front frame 11 with respect to the rear frame 12, thereby changing the traveling direction of the wheel loader 1.

Steering Operation Device

Figure 2:
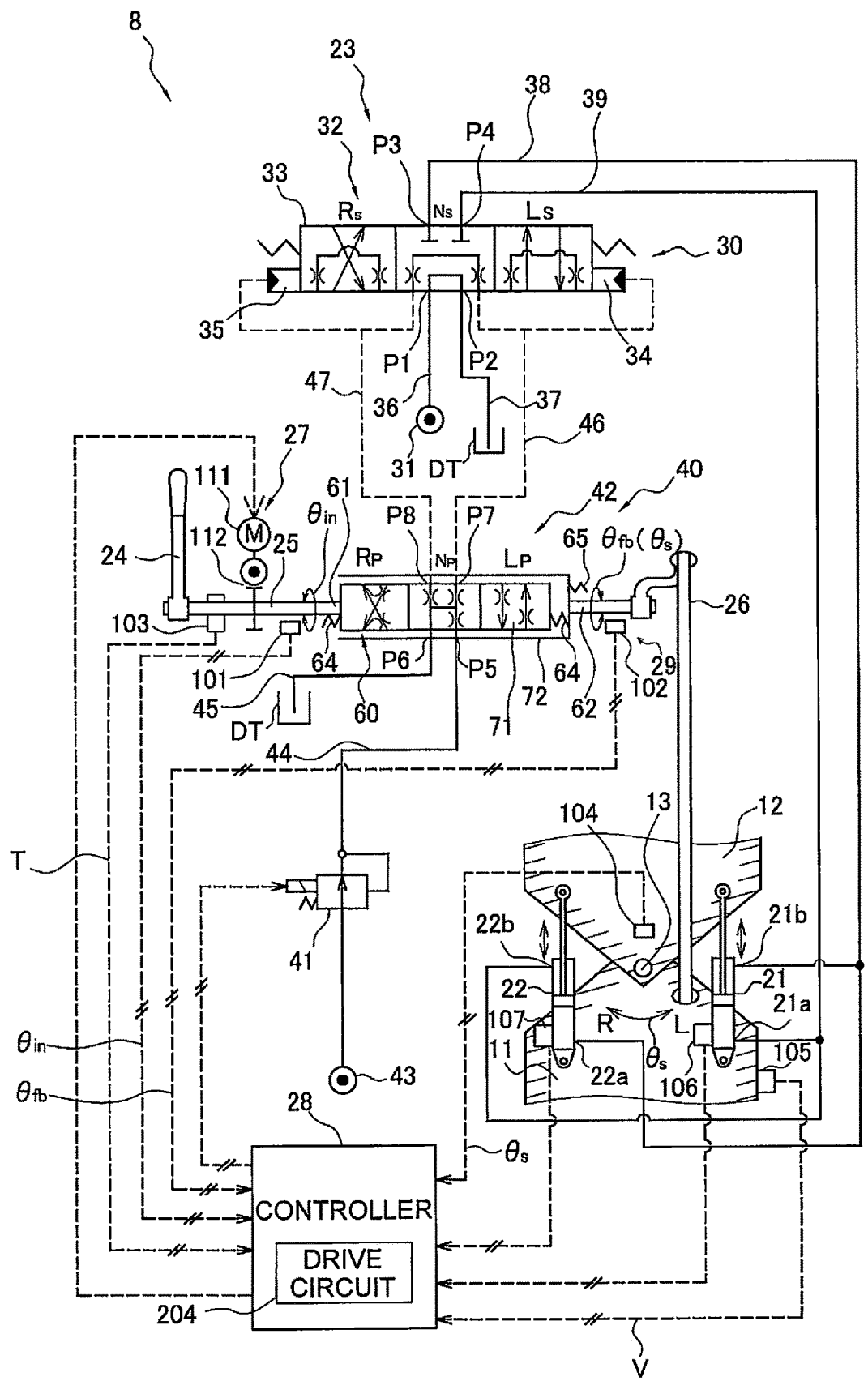
FIG. 2 is a hydraulic circuit diagram showing the configuration of the steering operation device of the wheel loader in FIG. 1.

FIG. 2 is a hydraulic circuit diagram of the configuration of the steering operation device 8. The steering operation device 8 in this embodiment mainly has the pair of steering cylinders 21 and 22, a steering hydraulic circuit 23, the joystick lever 24, a connecting portion 25, a link mechanism 26, a force imparting component 27, a controller 28, and a timing sensor 29.

1-2-1. Steering Cylinders

The steering cylinders 21 and 22 are driven by hydraulic pressure. The steering cylinders 21 and 22 are disposed side by side on the left and right sides in the vehicle width direction, with the connecting shaft 13 in between. The steering cylinder 21 is disposed on the left side of the connecting shaft 13 (see FIG. 1). The steering cylinder 22 is disposed on the right side of the connecting shaft 13. One end of each of the steering cylinders 21 and 22 is attached to the front frame 11, and the other end is attached to the rear frame 12.

The steering cylinder 21 is provided with an extension port 21a and a contraction port 21b, and the steering cylinder 22 is provided with an extension port 22a and a contraction port 22b.

When fluid is supplied to the extension port 21a of the steering cylinder 21 and the contraction port 22b of the steering cylinder 22, and fluid is discharged from the contraction port 21b of the steering cylinder 21 and the extension port 22a of the steering cylinder 22, the steering cylinder 21 extends and the steering cylinder 22 contracts. This changes the steering angle θs, and the vehicle turns to the right. When fluid is supplied to the contraction port 21b of the steering cylinder 21 and the extension port 22a of the steering cylinder 22, and fluid is discharged from the extension port 21a of the steering cylinder 21 and the contraction port 22b of the steering cylinder 22, the steering cylinder 21 contracts and the steering cylinder 22 extends. This changes the steering angle θs, and the vehicle turns to the left.

A steering angle sensor 104 that senses the steering angle θs is provided near the connecting shaft 13 disposed between the steering cylinders 21 and 22. The steering angle sensor 104 is constituted by a potentiometer, for example, and the sensed steering angle θs is sent to the controller 28 as a sensing signal.

The steering cylinder 21 is provided with a cylinder stroke sensor 106 for sensing the stroke of the cylinder, and the steering cylinder 22 is provided with a cylinder stroke sensor 107 for sensing the stroke of that cylinder. The sensed values of the cylinder stroke sensors 106 and 107 may be sent to the controller 28 and to find the steering angle θs.

1-2-2. Steering Hydraulic Circuit

The steering hydraulic circuit 23 is a hydraulic circuit for adjusting the flow of fluid supplied to the steering cylinders 21 and 22. The steering hydraulic circuit 23 has a main hydraulic circuit 30 and a pilot hydraulic circuit 40.

(a) Main Hydraulic Path

The main hydraulic circuit 30 is a circuit that supplies fluid from a main hydraulic pressure source 31 to the steering cylinders 21 and 22, and has a steering valve 32. The main hydraulic pressure source 31 is made up of a hydraulic pump, a relief valve, and the like.

The steering valve 32 is a spool type of valve, and is a flow control valve that adjusts the flow of fluid supplied to the steering cylinders 21 and 22 according to the inputted pilot pressure. The steering valve 32 has a main pump port P1, a main drain port P2, a first steering port P3, and a second steering port P4. The main pump port P1 is connected to the main hydraulic pressure source 31 via a main hydraulic line 36. The main drain port P2 is connected to a drain tank DT that collects fluid via the main drain line 37. The first steering port P3 is connected to the contraction port 21b of the steering cylinder 21 and the extension port 22a of the steering cylinder 22 via a first steering line 38. The second steering port P4 is connected to the extension port 21a of the steering cylinder 21 and the contraction port 22b of the steering cylinder 22 via a second steering line 39.

The steering valve 32 has a valve body 33 that can move between a neutral position Ns, a left steering position Ls, and a right steering position Rs. When the valve body 33 is disposed in the neutral position Ns, the main pump port P1 and the main drain port P2 are communicating with each other. In this case, the first steering port P3 and the second steering port P4 are not in communication with either port. When the valve body 33 is disposed in the left steering position Ls, the main pump port P1 and the first steering port P3 are communicating with each other, and the main drain port P2 and the second steering port P4 are communicating with each other. When the valve body 33 is disposed in the right steering position Rs, the main pump port P1 and the second steering port P4 are communicating with each other, and the main drain port P2 and the first steering port P3 are communicating with each other.

The steering valve 32 has a first pilot chamber 34 and a second pilot chamber 35. When pilot pressure is not being supplied to the first pilot chamber 34 or the second pilot chamber 35, and when the same pilot pressure is being supplied to the first pilot chamber 34 and the second pilot chamber 35, the valve body 33 is located in the neutral position Ns. In a state in which the pilot pressure is being supplied only to the first pilot chamber 34, the valve element 33 is located in the left steering position Ls. In a state in which the pilot pressure is supplied only to the second pilot chamber 35, the valve element 33 is located in the right steering position Rs. When the valve body 33 is located in the left steering position Ls and the right steering position Rs, the steering valve 32 changes the opening surface area through which the fluid from the main hydraulic pressure source 31 passes, according to the supplied pilot pressure. Accordingly, the steering valve 32 controls the flow of fluid supplied to the steering cylinder 21 or the steering cylinder 22 according to the pilot pressure.

(b) Pilot Hydraulic Circuit

The pilot hydraulic circuit 40 is a circuit for supplying fluid from a pilot hydraulic pressure source 43 to the first pilot chamber 34 and the second pilot chamber 35 of the steering valve 32.

The pilot hydraulic circuit 40 has a variable pressure reducer 41 and a pilot valve 42.

Variable Pressure Reducer 41

The variable pressure reducer 41 reduces and adjusts the hydraulic pressure sent from the pilot hydraulic pressure source 43 to the pilot valve 42. The variable pressure reducer 41 has a built-in electromagnetic pressure reducing valve, and receives a command signal from the controller 28 to control the hydraulic pressure.

Pilot Valve

The pilot valve 42 is a rotary type of valve that adjusts the pilot pressure inputted from the pilot hydraulic pressure source 43 to the steering valve 32.

Overview of Pilot Valve Configuration

The rotary pilot valve 42 has a pilot pump port P5, a pilot drain port P6, a first pilot port P7, and a second pilot port P8. The pilot pump port P5 is connected to the variable pressure reducer 41 via the pilot hydraulic line 44, and the variable pressure reducer 41 is connected to the pilot hydraulic pressure source 43. The pilot drain port P6 is connected to the drain tank DT that collects fluid via a pilot drain line 45. The first pilot port P7 is connected to the first pilot chamber 34 of the steering valve 32 via the first pilot line 46. The second pilot port P8 is connected to the second pilot chamber 35 of the steering valve 32 via the second pilot line 47.

The pilot valve 42 has a valve body 60 including an operation spool 71 and an operation sleeve 72. With the operation sleeve 72 serving as a reference, the operation spool 71 has a neutral position Np, a left pilot position Lp, and a right pilot position Rp.

When the operation spool 71 is in the neutral position Np with respect to the operation sleeve 72, the pilot pump port P5, the pilot drain port P6, the first pilot port P7, and the second pilot port P8 communicate with each other. When the operation spool 71 is disposed in the left pilot position Lp with respect to the operation sleeve 72, the pilot pump port P5 communicates with the first pilot port P7, and the pilot drain port P6 and the second pilot port P8 communicate with each other. When the operation spool 71 is disposed in the right pilot position Rp with respect to the operation sleeve 72, the pilot pump port P5 and the second pilot port P8 communicate with each other, and the pilot drain port P6 and the first pilot port P7 communicate with each other.

Figure 3:
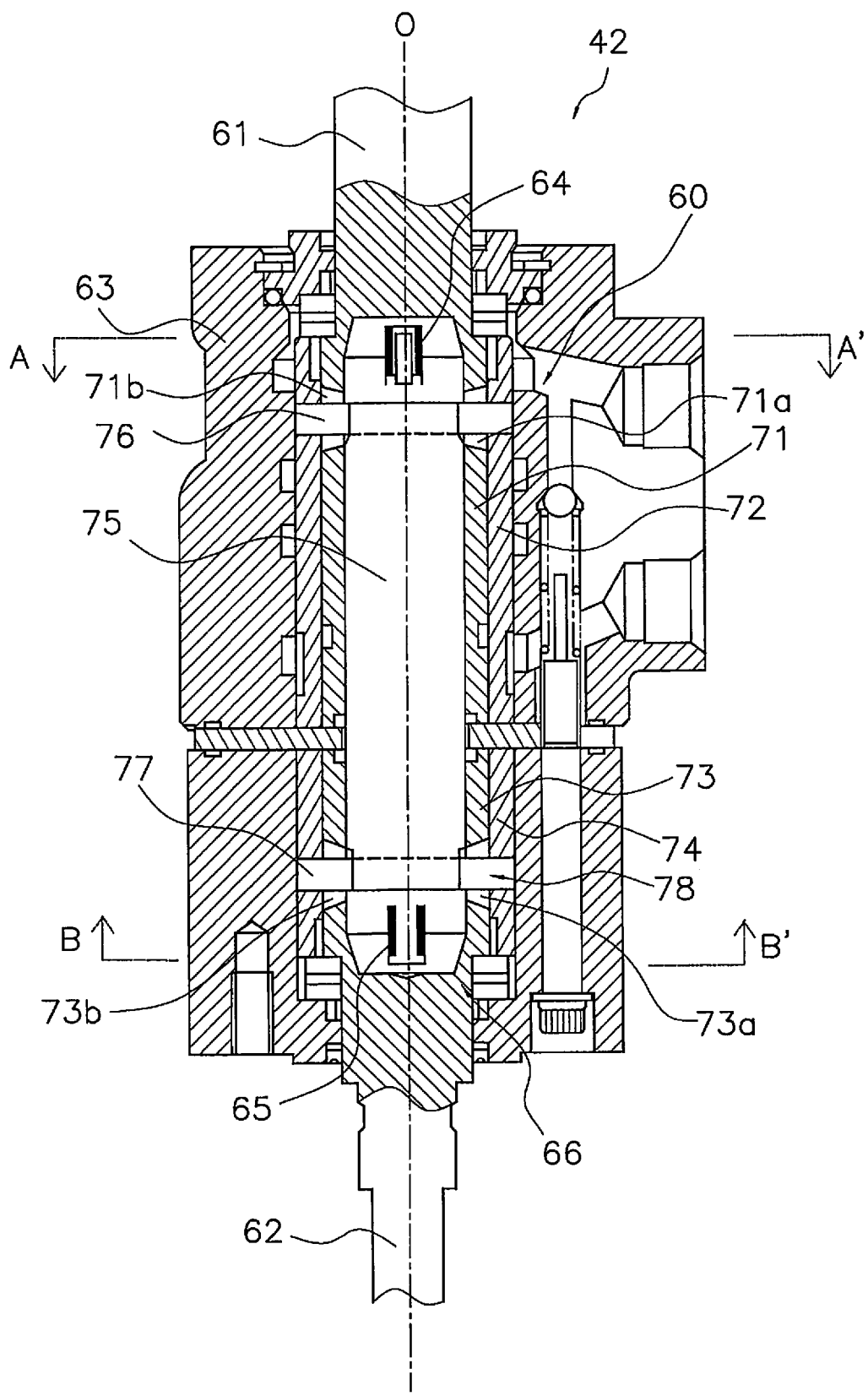
FIG. 3 is a cross sectional configuration diagram of the pilot valve in FIG. 2.

FIG. 3 is a cross sectional configuration diagram of the pilot valve 42.

The pilot valve 42 mainly has the valve body 60, an operation input shaft 61, a feedback input shaft 62, a housing 63, a first spring 64, a second spring 65, and a feedback component 66.

Operation Input Shaft

The operation input shaft 61 is provided rotatably around its center axis O, and is inserted into the housing 63. The operation input shaft 61 is connected to the joystick lever 24 (discussed below) via the connecting portion 25. The operation input shaft 61 rotates to the left and right at the same rotation angle as the rotation angle θin of the joystick lever 24.

Feedback Input Shaft

The feedback input shaft 62 is disposed coaxially with the operation input shaft 61, and is provided rotatably around the center axis O. The feedback input shaft 62 is inserted into the housing 63 so as to be opposite the operation input shaft 61. The feedback input shaft 62 is connected to the front frame 11 via the link mechanism 26 (discussed below), and rotates at the same rotation angle as the steering angle θs of the front frame 11 with respect to the rear frame 12.

Housing

A substantially cylindrical space is formed in the housing 63, and the operation input shaft 61 and the feedback input shaft 62 are inserted as described above. The housing 63 houses the valve body 60 and the feedback component 66, and the pilot pump port P5, the pilot drain port P6, the first pilot port P7, and the second pilot port P8 are formed in the housing 63.

Valve Body

The valve body 60 has the operation spool 71 and the operation sleeve 72, and moves into the neutral position Np, the left pilot position Lp, and the right pilot position Rp when the operation spool 71 rotates with respect to the operation sleeve 72.

The operation spool 71 is substantially cylindrical in shape and is disposed coaxially with the operation input shaft 61, and is connected to the operation input shaft 61. The joystick lever 24 is connected to the operation input shaft 61 via the connecting portion 25 (discussed below), and when the operator operates the joystick lever 24 to the right side by the rotation angle θin, the operation input shaft 61 and the operation spool 71 also rotate to the right around the center axis O by the rotation angle θin. Slits 71a and 71b are formed in the operation spool 71 near the operation input shaft 61 along the circumferential direction at two opposing positions so as to sandwich the center axis O in between.

The operation sleeve 72 has a substantially cylindrical shape and is disposed outside the operation spool 71 and inside the housing 63 so as to be rotatable with respect to the operation spool 71 and the housing 63.

In this specification, "right rotation" and "left rotation" refer to the rotation direction when viewed from above.

First Spring

The first spring 64 is inserted between the operation spool 71 and the operation sleeve 72, which are rotatable with respect to each other, and generates a counterforce corresponding to the difference in rotation angle between the operation spool 71 and the operation sleeve 72.

FIG. 4a is a cross section along the A-A' line perpendicular to the center axis O. As shown in FIG. 4a, square holes 71c and 71d are provided to diametrically opposed walls of the operation spool 71. Also, rectangular grooves 72c and 72d are formed in diametrically opposed walls at the end of the operation sleeve 72 on the operation input shaft 61 side. The first spring 64 is formed from two sets of leaf springs 64a in which a plurality of convex leaf springs are stacked. The two sets of leaf springs 64a are arranged so that the convex parts are opposing to each other to form an X shape in FIG. 4a. The two sets of leaf springs 64a pass through the holes 71c and 71d in the operation spool 71 and both ends thereof intrude into the grooves 72c and 72d in the operation sleeve 72. In this manner, the operation spool 71 and the operation sleeve 72 are linked by the first spring 64.

As shown in FIG. 4a, a state in which the circumferential positions of the hole 71c and the groove 72c substantially coincide and the circumferential positions of the hole 71d and the groove 72d substantially coincide is a state in which the valve body 60 is in the neutral position Np.

Also, when the joystick lever 24 is operated, the operation spool 71 rotates with respect to the operation sleeve 72 as shown in FIG. 4b, and the operation spool 71 moves to the left pilot position Lp or the right pilot position Rp with respect to the operation sleeve 72. When the joystick lever 24 is rotated to the right, the operation spool 71 rotates to the right with respect to the operation sleeve 72 and moves to the right pilot position Rp. When the joystick lever 24 is rotated to the left, the operation spool 71 rotates to the left with respect to the operation sleeve 72 and moves to the left pilot position Lp.

In this movement, since the operator moves the joystick lever 24 against the spring force of the first spring 64, a lever counterforce is generated at the joystick lever 24. In other words, the first spring 64 biases the operation spool 71 so as to be in the neutral position Np with respect to the operation sleeve 72.

Feedback Component

Meanwhile, the feedback component 66 feeds back the steering angle θs of the front frame 11 with respect to the rear frame 12 to the valve body component 60. The feedback component 66 mainly has a feedback spool 73, a feedback sleeve 74, a drive shaft 75, a first center pin 76, and a restrictor 78.

The drive shaft 75 is disposed between the operation input shaft 61 and the feedback input shaft 62, and is coaxially with the operation input shaft 61 and the feedback input shaft 62 (the center axis O). The drive shaft 75 is disposed inside the operation spool 71. The first center pin 76 is disposed perpendicular to the center axis O at the end of the drive shaft 75 on the operation input shaft 61 side. The ends of the first center pin 76 pass through the slits 71a and 71b and are fixed to the operation sleeve 72. As will be described in detail below, the rotation angle of the operation spool 71 with respect to the operation sleeve 72 is restricted to an angle within a specific range by the first center pin 76 and the slits 71a and 71b. Also, since the first center pin 76 is fixed to the operation sleeve 72 and the drive shaft 75, when the drive shaft 75 rotates, the operation sleeve 72 integrated with the drive shaft 75 also rotates.

The feedback spool 73 has a substantially cylindrical shape and is disposed coaxially with the feedback input shaft 62, and is connected to the feedback input shaft 62. Slits 73a and 73b are formed in the feedback spool 73 in the circumferential direction near the feedback input shaft 62, at two positions opposite each other with the center axis O in between. The drive shaft 75 is disposed inside the feedback spool 73. The feedback input shaft 62 is linked to the front frame 11 via the link mechanism 26 (discussed below), and when the front frame 11 rotates to the right by a steering angle θs with respect to the rear frame 12, the feedback input shaft 62 and the feedback spool 73 also rotate to the right by the same rotation angle θs as the steering angle θs.

The feedback sleeve 74 has a substantially cylindrical shape and is disposed outside the feedback spool 73 and inside the housing 63 so as to be rotatable with respect to the feedback spool 73 and the housing 63.

The restrictor 78 restricts the rotation of the feedback sleeve 74 with respect to the feedback spool 73 to an angle within a specific range. The restrictor 78 is constituted by a second center pin 77 and wall portions 73ae and 73be (see FIG. 7 (discussed below)) at the ends of the slits 73a and 73b in the circumferential direction.

The second center pin 77 is disposed at the end of the drive shaft 75 on the feedback input shaft 62 side, perpendicular to the center axis O. The ends of the second center pin 77 pass through the slits 73a and 73b and are fixed to the feedback sleeve 74. The rotation of the feedback sleeve 74 relative to the feedback spool 73 is restricted to an angle within a specific range by the second center pin 77 and the slits 73a and 73b. Also, since the second center pin 77 is fixed to the feedback sleeve 74 and the drive shaft 75, when the feedback sleeve 74 rotates, the drive shaft 75 integrated with the feedback sleeve 74 also rotates. When the drive shaft 75 rotates, the operation sleeve 72 fixed to the drive shaft 75 is rotated by the first center pin 76.

Second Spring

The second spring 65 is inserted between the feedback spool 73 and the feedback sleeve 74, which are rotatable with respect to each other, and generates a counterforce corresponding to the rotation difference between the spool and the sleeve. FIG. 4c is a cross section along the B-B' line in FIG. 23.

As shown in FIG. 4c, square holes 73c and 73d are provided to the feedback spool 73, in diametrically opposed walls.

Rectangular grooves 74c and 74d are formed in diametrically opposite walls at the end of the feedback sleeve 74 on the feedback input shaft 62 side. The second spring 65 is formed from two sets of leaf springs 65a in which a plurality of convex leaf springs are stacked. The two sets of leaf springs 65a are disposed so that the convex parts are opposite each other to form an X shape in FIG. 4c. The two sets of leaf springs 65a pass through the holes 73c and 73d in the feedback spool 73 and both ends thereof intrude into the grooves 74c and 74d in the operation sleeve 72. In this manner, the feedback spool 73 and the feedback sleeve 74 are linked by the second spring 65. In the state in FIG. 4c, the hole 73c and the groove 74c coincide in the circumferential direction, and the hole 73d and the groove 74d coincide in the circumferential direction. Thus, the feedback sleeve 74 is biased by the second spring 65 so that the positions of the grooves 74c and 74d in the circumferential direction match up with the circumferential positions of the holes 73c and 73d of the feedback spool 73.

Although the first spring 64 bends until the operation spool 71 is restricted with respect to the operation sleeve 72, the second spring 65 is set to begin bending upon being subjected to a force greater than or equal to the counterforce generated in the first spring 64 until the operation spool 71 is restricted.

More precisely, as will be discussed below through reference to FIG. 7, when the operation spool 71 rotates to the angle at which it is restricted with respect to the operation sleeve 72, and when the joystick lever 24 is then operated, as shown in FIG. 4d, the second spring 65 bends and the feedback sleeve 74 rotates with respect to the feedback spool 73. FIG. 4d is a cross section along the B-B' line in FIG. 3, and since the view is from below, the arrows in the rotation direction are opposite to those in FIG. 4b.

That is, when the joystick lever 24 is operated beyond the angle at which the operation spool 71 is restricted with respect to the operation sleeve 72, the operator will have to operate the joystick lever 24 against the biasing force of the second spring 65.

With the above configuration of the feedback unit 66, when the feedback input shaft 62 rotates in response to a change in the steering angle, the feedback spool 73 rotates, and the feedback sleeve 74 linked to the feedback spool 73 via the second spring 65 also rotates. Then, the operation sleeve 72 fixed to the feedback sleeve 74 via the second center pin 77, the drive shaft 75, and the first center pin 76 rotates, a change occurs in the difference in the rotation angle between the operation spool 71 and the operation sleeve 72, and the pilot pressure is changed.

That is, with the pilot valve 42, the position of the operation spool 71 with respect to the operation sleeve 72 moves to the neutral position Np, the left pilot position Lp, or the right pilot position Rp according to the difference a between the rotation angle θin of the operation input shaft 61 and the rotation angle fb of the feedback input shaft 62 (which coincides with the steering angle θs). When the rotational angle difference α is zero, the operation spool 71 is in the neutral position Np with respect to the operation sleeve 72. When the operation spool 71 is in the left pilot position Lp or the right pilot position Rp with respect to the operation sleeve 72, the pilot valve 42 changes the opening surface area through which fluid passes from the pilot hydraulic pressure source 43 in accordance with the rotation angle difference a. This adjusts the pilot pressure that is sent from the pilot valve 42 to the steering valve 32 according to the difference α of the rotation angle.

In addition, the operation input shaft 61 is provided with a first rotation angle sensor 101 constituted by a rotary sensor, for example. The first rotation angle sensor 101 senses the rotation angle θin of the operation input shaft 61. The feedback input shaft 62 is also provided with a second rotation angle sensor 102 constituted by a rotary sensor, for example. Also, the second rotation angle sensor 102 senses the rotation angle θfb (=θs) of the feedback input shaft 62. The rotation angles θin and θfb sensed by the first rotation angle sensor 101 and the second rotation angle sensor 102 are sent to the controller 28 as sensing signals.

As described above, the steering angle θs is also sensed by the steering angle sensor 104 in the connecting shaft 13, but since the rotation angle θfb of the feedback input shaft 62 coincides with the steering angle θs, the steering angle sensor 104 need not be provided.

1-2-3. Joystick Lever, Connecting Portion

Figure 5:
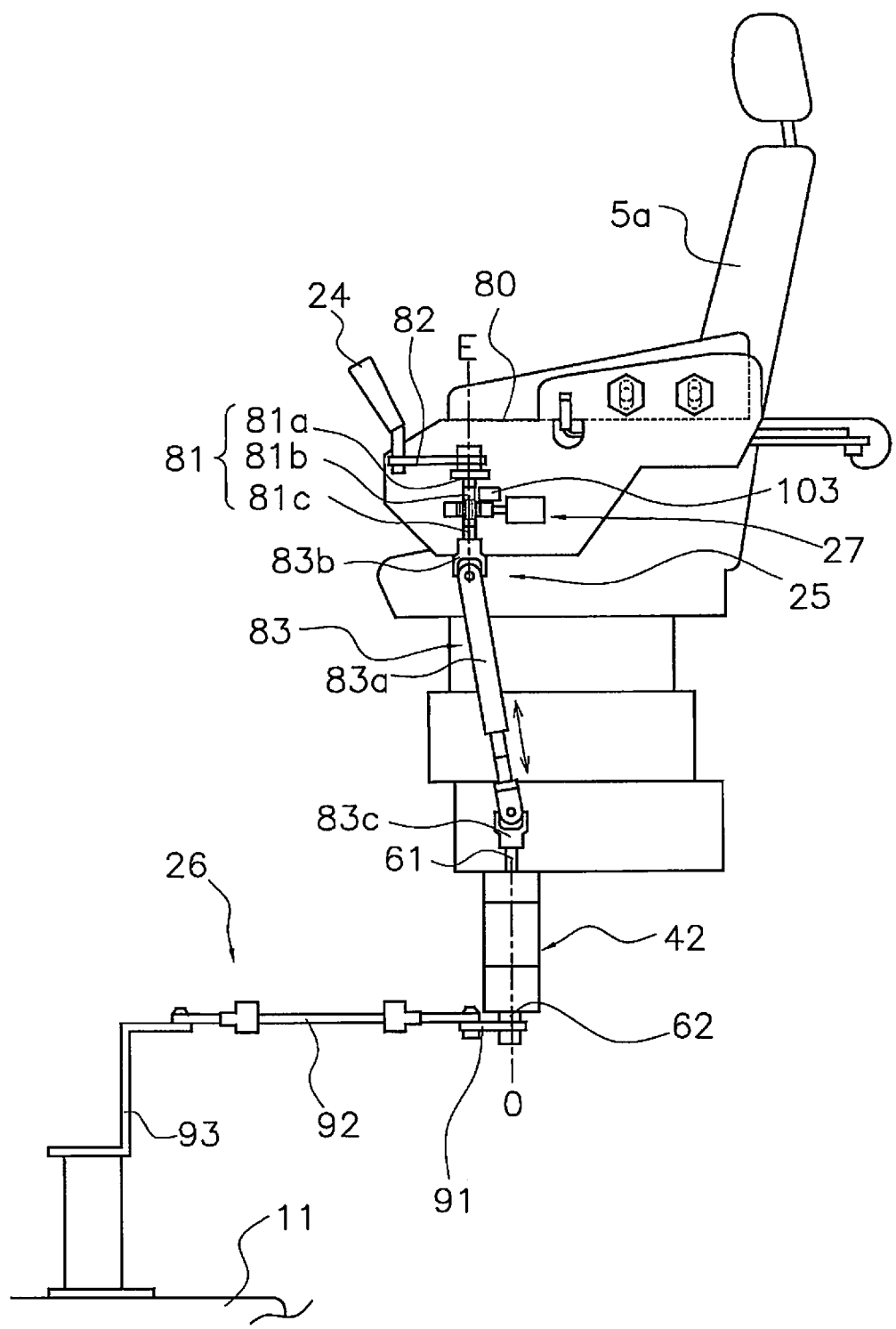
FIG. 5 is a side view of the connecting portion and link mechanism in FIG. 2.

FIG. 5 is a side view of the configuration inside the cab 5. A driver's seat 5a in which an operator sits is provided in the cab 5. A steering box 80 is disposed on the left side of the driver's seat 5a in the vehicle width direction.

The joystick lever 24 is disposed so as to protrude obliquely upward from the steering box 80 toward the front.

The connecting portion 25 connects the joystick lever 24 and the pilot valve 42. The connecting portion 25 mainly has a steering operation shaft 81, a connecting bar 82, and a universal joint 83.

The steering operation shaft 81 is disposed vertically and is supported by the steering box 80 so as to be rotatable around its center axis E. The connecting bar 82 is disposed in the steering box 80 and connects the joystick lever 24 and the steering operation shaft 81.

More precisely, the steering operation shaft 81 is configured to connect a lever side shaft 81a, an input shaft 81b, and a valve side shaft 81c, in that order (see FIG. 8 (discussed below)). That is, one end of the lever side shaft 81a is connected to the connecting bar 82, and the other end of the lever side shaft 81a is connected to one end of the input shaft 81b. Also, the other end of the input shaft 81b is connected to one end of the valve side shaft 81c, and the other end of the valve side shaft 81c is connected to the universal joint 83. An assisting force or a counterforce from the force imparting component 27 (discussed below) is inputted to the input shaft 81b.

The universal joint 83 connects the steering operation shaft 81 and the operation input shaft 61 of the pilot valve 42 disposed near the driver's seat 5a. The universal joint 83 has an extendible central portion 83a and joint portions 83b and 83c disposed at the ends of the central portion 83a. The joint portion 83b is connected to the steering operation shaft 81. The joint portion 83c is connected to the operation input shaft 61.

Figure 6:
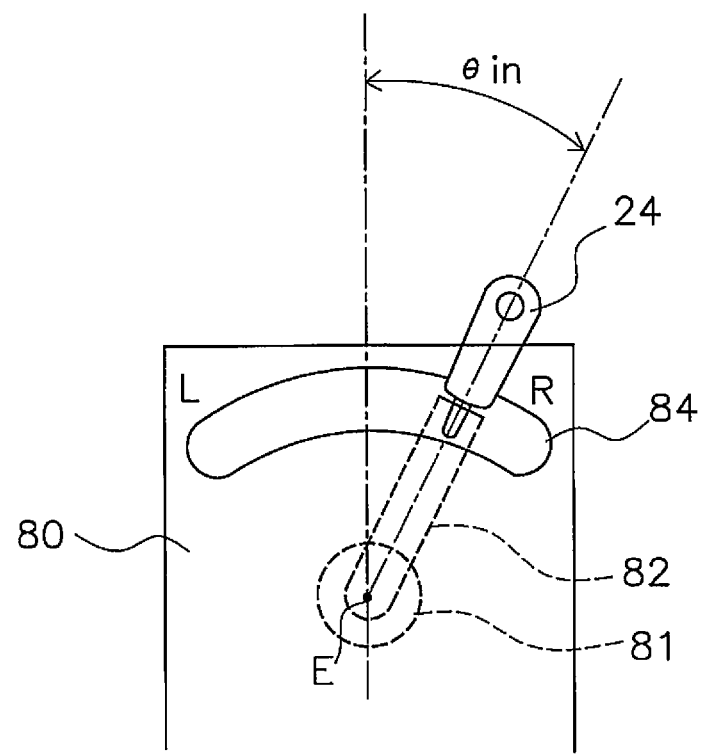
FIG. 6 is a top view of the joystick lever in FIG. 5.

FIG. 6 is a plan view of the area near the joystick lever 24 as viewed from above. As shown in FIG. 6, the joystick lever 24 is formed so as to protrude obliquely upward from an arc-shaped hole 84 formed in the upper face of the steering box 80. The joystick lever 24 can turn horizontally around the steering operation shaft 81 (more precisely, the center axis E). Also, an R mark is made at the right edge of the hole 84 of the steering box 80, and an L mark is made at the left edge.

For example, as shown in FIG. 6, when the operator rotates the joystick lever 24 from the center position to the right by the rotation angle θin, the steering operation shaft 81 also rotates to the right by the rotation angle θin. This rotation of the steering operation shaft 81 by the rotation angle θin is transmitted through the universal joint 83 to the operation input shaft 61, and the operation input shaft 61 also rotates to the right by the rotation angle θin. The same is true when the joystick lever 24 is rotated to the left.

1-2-4. Link Mechanism

The link mechanism 26 has a follow-up lever 91, a follow-up link 92, and a bracket 93.

The follow-up link 92 is fixed to the feedback input shaft 62 of the pilot valve 42. The bracket 93 is fixed to the front frame 11. The follow-up link 92 connects the follow-up lever 91 and the bracket 93.

This link mechanism 26 links the front frame 11 to the pilot valve 42 disposed on the rear frame 12.

The steering angle θs of the front frame 11 relative to the rear frame 12 is made to be the same as the rotation angle θfb of the feedback input shaft 62 by the link mechanism 26.

That is, when the front frame 11 rotates to the right by the steering angle θs around the connecting shaft 13 with respect to the rear frame 12, the feedback input shaft 62 also rotates to the right by the rotation angle θs via the link mechanism 26, and when the front frame 11 rotates to the left by the angle θs, the feedback input shaft 62 also rotates to the left by the rotation angle θs via the link mechanism 26.

1-2-5. Lever Counterforce

Next, the lever counterforce generated by the first spring 64 and the second spring 65 when the joystick lever 24 is operated will be described.

FIG. 7a is a simplified diagram of the pilot valve 42. FIG. 7b is a graph of the relation between the vehicle body-lever deviation angle and the lever counterforce. The vehicle body-lever deviation angle α is the difference (θin−θfb) between the rotation angle θin of the joystick lever 24 and the steering angle θs (=θfb) of the front frame 11 with respect to the rear frame 12. FIG. 7c consists of cross sections along the C-C', D-D', E-E', and F-F' lines in FIG. 7a when the deviation angle α is zero. FIG. 7d consists of cross sections along the C-C', D-D', E-E', and F-F' lines in FIG. 7a when the deviation angle α is θ2. FIG. 7e consists of cross sections along the C-C', D-D', E-E', and F-F' lines in FIG. 7a when the when the deviation angle α is θ3. As shown in FIG. 7a, the cross sections along the C-C', D-D', E-E', and F-F' lines are all views from above. In FIG. 7b, play in the joystick lever 24 is not taken into account in order to make the drawing easier to understand.

When the operator rotates the joystick lever 24 from the center position by the rotation angle θin, the operation input shaft 61 also rotates by the rotation angle θin. On the other hand, since the response of the steering cylinders 21 and 22 is delayed, the steering angle θs gradually increases along with the rotation angle θin. This rotation angle θin of the joystick lever 24 indicates the target steering angle, and the steering angle θs indicates the actual steering angle. The feedback input shaft 62 also rotates at the same rotation angle θs as the steering angle θs in response to a change in the steering angle θs. The feedback spool 73 also rotates along with the feedback input shaft 62, and the feedback sleeve 74 connected via the second spring 65 also rotates as a result of this rotation.

Here, since the feedback sleeve 74 and the operation sleeve 72 are integrated by the first center pin 76, the second center pin 77, and the drive shaft 75, the operation sleeve 72 is also rotated by the rotation of the feedback sleeve 74.

That is, the difference in rotation angle that occurs between the rotation angle of the operation spool 71 and the rotation angle of the operation sleeve 72 corresponds to the deviation angle α (see FIG. 4b).

Since the first spring 64 biases the operation spool 71 to the neutral position Np with respect to the operation sleeve 72, in order to increase the deviation angle α, the joystick lever 24 has to be operated against the biasing force of the first spring 64.

The first spring 64 has the spring characteristic S1 shown in FIG. 7b. With the spring characteristic S1 of the first spring 64, in order to rotate the operation input shaft 61, the joystick lever 24 has to be operated with a force greater than or equal to the initial counterforce F1 (the force required to start bending the first spring 64). Also, with the spring characteristic S1 of the first spring 64, the lever counterforce increases as the deviation angle α increases. That is, as the deviation angle α increases, the force required to operate the joystick lever 24 increases.

As shown in FIG. 7c, in the neutral position Np where the deviation angle α is zero, the first center pin 76 is disposed in the center of the slits 71a and 71b of the operation spool 71. Also, the second center pin 77 is disposed in the center of the slits 73a and 73b of the feedback spool 73.

Then, the deviation angle α is increased by turning the joystick lever 24 to the right, for example, and when the deviation angle α reaches the angle θ2, as shown in FIG. 7d, the first center pin 76 hits the wall portion 71ae formed in the circumferential direction of the slit 71a, and the wall portion 71be formed in the circumferential direction of the slit 71b. At this point, the second center pin 77 is disposed in the center of the slits 73a and 73b of the feedback spool 73. This is because, if we let F2 be the counterforce produced by the first spring 64 when the deviation angle α is the angle θ2, the initial counterforce (the force necessary to start bending the second spring 65) is set to F2 as indicated by the spring characteristic S2 of the second spring 65. The initial counterforce of the second spring 65 may be set higher than F2, as long as it is equal to or greater than F2.

Furthermore, in order for the operator to rotate the joystick lever 24 to the right, it is necessary to operate it against the counterforce of the second spring 65. That is, when the joystick lever 24 is rotated further to the right, the first center pin 76 hits the wall portion 71be and the wall portion 71ae, so if the operator tries to rotate operation spool 71, it is necessary to rotate the operation sleeve 72 as well. Also, as described above, the operation sleeve 72 is integrated with the feedback sleeve 74, and the feedback spool 73 is connected to the feedback input shaft 62. Therefore, when the joystick lever 24 is further rotated to the right, as shown in FIG. 4d, the joystick lever 24 is operated against the counterforce of the second spring 65.

When the deviation angle α reaches θ3, the second center pin 77 hits the wall portion 73ae formed in the circumferential direction of the slit 73a and the wall portion 73be formed in the circumferential direction of the slit 73b, as shown in FIG. 7e. Thus, the second center pin 77 can rotate by an angle of (θ3−θ2). That is, the pilot valve 42 is configured so that the deviation angle α can not be greater than the angle θ3. Therefore, as shown in FIG. 7b, the lever counterforce rises linearly at the angle θ3. If the second center pin 77 hits the wall portions 73ae and 73be hard, it produces a sudden reaction that subjects the wrist of the operator to a load. This angle θ3 is also called a catch-up angle.

FIG. 7b illustrates an example in which the joystick lever 24 is rotated to the right, but the same holds true when the joystick lever 24 is rotated to the left, in which case the deviation angle α is a negative value, and is in right and left symmetry as indicated by the two-dot chain line L7 in FIG. 10b (discussed below). That is, the first center pin 76 hits the wall portions 71ae and 71be at −θ2, and the second center pin 77 hits the wall portions 71ae and 71be at −θ3. Thus, the pilot valve 42 is configured so that the absolute value of the deviation angle α does not become greater than the angle θ3.

A difference is generated between the rotation angle of the operation spool 71 and the rotation angle of the operation sleeve 72 up until the deviation angle α reaches θ2, but once the difference exceeds the angle θ2, there is no longer any difference between the operation spool 71 and the operation sleeve 72, so the aperture of the pilot valve 42 is constant. The deviation angle α is constant while the deviation angle α between the angles θ2 and θ3, but the pilot pressure may be varied according to the deviation angle by controlling the variable pressure reducer 41.

1-2-6. Force Imparting Component

Figure 8:
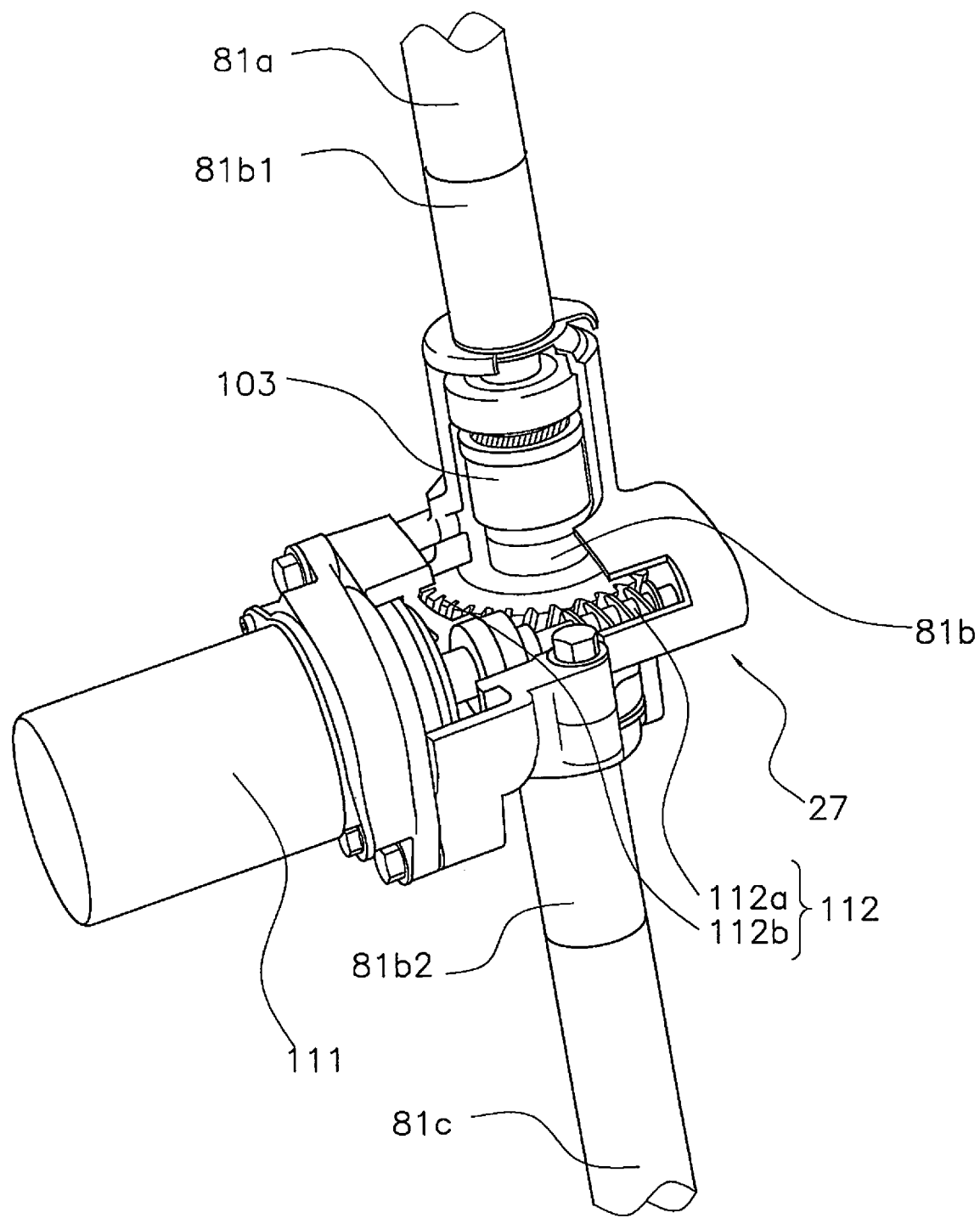
FIG. 8 is an oblique view of the configuration of the force imparting component in FIG. 2.

FIG. 8 is an oblique view of the force imparting component 27.

The force imparting component 27 imparts an assisting force or a counterforce to the operation of the joystick lever 24. The force imparting component 27 has an electric motor 111 and a worm gear 112. The worm gear 112 has a cylindrical worm 112a and a worm wheel 112b. The worm wheel 112b is provided around the input shaft 81b described above, and meshes with the cylindrical worm 112a. The output shaft of the electric motor 111 is connected to the cylindrical worm 112a, and rotates the cylindrical worm 112a around its center axis. The electric motor 111 is driven on the basis of a command from a drive circuit 204 provided to the controller 28.

A first end 81b1 of the input shaft 81b is connected to the lever side shaft 81a, and the second end 81b2 is connected to the valve side shaft 81c.

When the electric motor 111 is driven, the cylindrical worm 112a rotates, this rotation causes the worm wheel 112b to rotate, and a rotational force is also generated at the input shaft 81b fixed to the worm wheel 112b. A rotational force can be applied to the input shaft 81b in the directions of both left rotation and right rotation by changing the rotation direction of the cylindrical worm 112a.

For example, when the joystick lever 24 is rotated to the right, a force is applied to the input shaft 81b in the clockwise direction, thereby imparting an assisting force to the operation of the joystick lever 24. Also, when the joystick lever 24 is rotated to the right, a counterforce is applied to the operation of the joystick lever 24 by applying a force to the input shaft 81b in the counterclockwise direction.

A torque sensor 103 is provided to the input shaft 81b. The torque sensor 103 senses torque generated at the input shaft 81b when the operator applies force to the joystick lever 24. The torque sensor 103 in this embodiment senses the rotation direction of the input shaft 81b and the torque generated at the input shaft 81b by using a coil to sense twisting of the torsion bar, for example. The sensed rotation direction and torque T are outputted to the controller 28 as a steering torque signal.

1-2-7. Control Component

Figure 9:
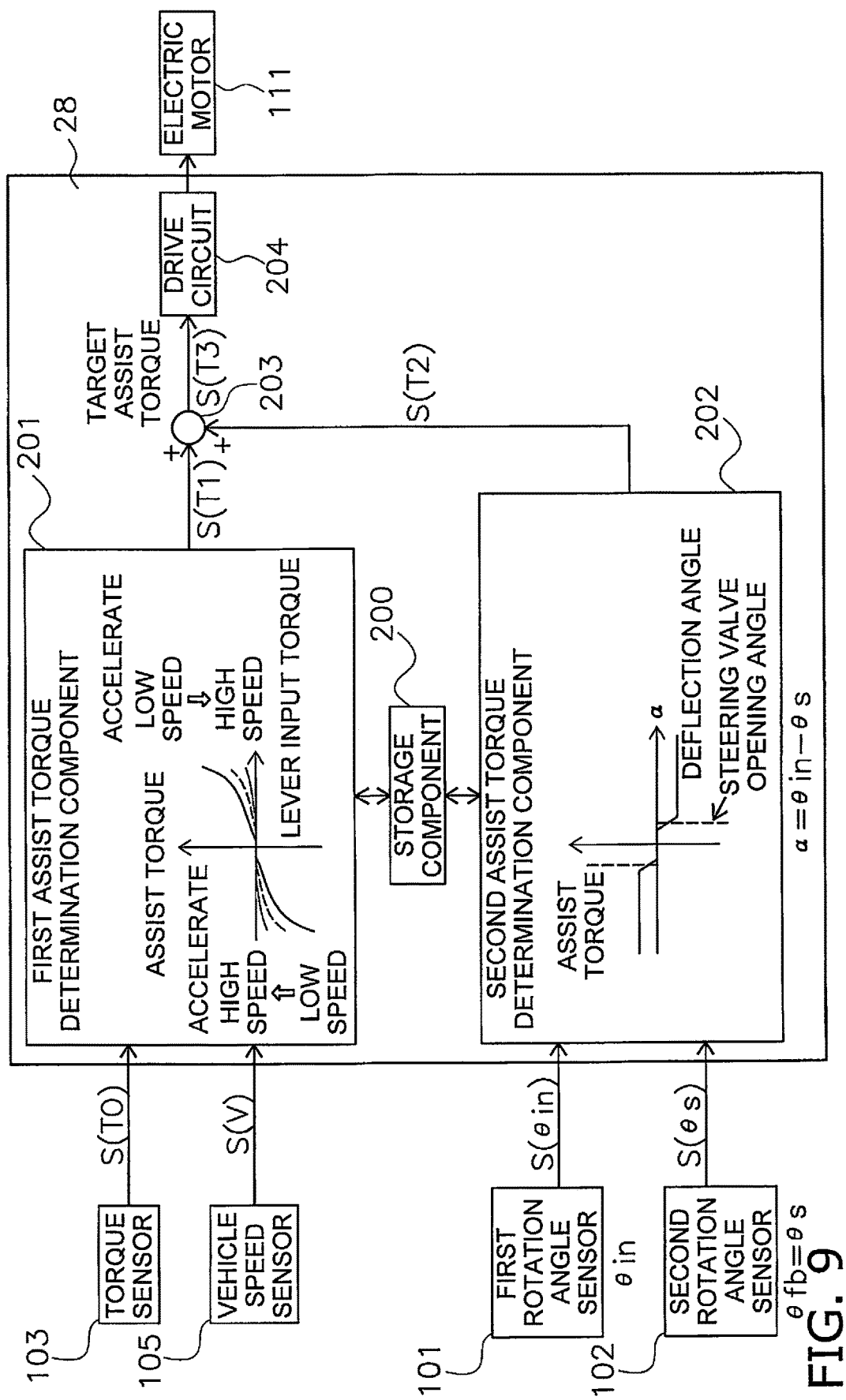
FIG. 9 is a block diagram of the configuration of the controller in FIG. 2.

FIG. 9 is a block diagram of the configuration of the controller 28. As shown in FIG. 9, the controller 28 comprises a storage component 200, a first assist torque determination component 201, a second assist torque determination component 202, a calculator 203, and the drive circuit 204. The first assist torque determination component 201, the second assist torque determination component 202, and the calculator 203 are executed by a computing device such as a CPU.

The storage component 200 stores the relation of the applied assist torque to the lever input torque (first assist torque information) for each speed. Also, the storage component 200 stores the relation of the applied assist torque to the deviation angle α (second assist torque information). The first assist torque information and the second assist torque information are preset. The first assist torque information and the second assist torque information will be described in detail below. The storage component 200 may be provided inside the controller 28 or outside the controller 28. Also, the storage component 200 is constituted by a RAM, a ROM, a hard disk drive, or the like.

The first assist torque determination component 201 receives a steering torque signal (S(T0) in FIG. 9) from the torque sensor 103 and a speed signal (S(V) in FIG. 9) from a vehicle speed sensor 105. The first assist torque determination component 201 then determines the first assist torque from the steering torque signal from the torque sensor 103 and the speed signal from the vehicle speed sensor 105, on the basis of the first assist torque information stored in the storage component 200. The first assist torque determination component 201 outputs the determined first assist torque as a first assist torque signal (S(T1) in FIG. 9).

The second assist torque determination component 202 receives a first rotation angle signal (S(θin) in FIG. 9) indicating the rotation angle θin sensed by the first rotation angle sensor 101, and a second rotation angle signal (S(θs) in FIG. 9) indicating the rotation angle θfb (=θs) sensed by the second rotation angle sensor 102. The second assist torque determination component 202 then calculates the difference between the rotation angle θin and the rotation angle θfb, and calculates the deviation angle α (θin−θfb). The second assist torque determination component 202 determines the second assist torque from the deviation angle α on the basis of the second assist torque information stored in the storage component 200. More precisely, as will be described below, the second assist torque information is set so as to generate resistance against operation so that when the joystick lever 24 is operated, the operator will intuitively grasp the timing at which the inclination operation (articulation) of the front frame 11 with respect to the rear frame 12 starts. The second assist torque determination component 202 outputs the determined second assist torque as a second assist torque signal (S(T2) in FIG. 9).

The calculator 203 calculates the sum of the first assist torque determined by the first assist torque determination component 201 and the second assist torque determined by the second assist torque determination component 202, and calculates the target assist torque to be imparted to the input shall component 81b. The calculator 203 outputs the calculated target assist torque to the drive circuit 204 as a target assist torque signal (S(T3) in FIG. 9).

The drive circuit 204 drives the electric motor 111 on the basis of the calculated target assist torque.

As described above, the controller 28 can impart an assisting force or a counterforce to the operation of the joystick lever 24 by the operator on the basis of the torque T, the deviation angle α, and the speed V.

The controller 28 also controls the variable pressure reducer 41 as shown in FIG. 2 on the basis of the rotation angle θin, the rotation angle θfb (=θs), and the vehicle speed V. Consequently, the original pilot pressure sent to the pilot valve 42 can be controlled so that there is no sudden change in the flow of fluid to the left and right steering cylinders 21 and 22.

Also, the control of the electric motor 111 and the variable pressure reducer 41 by the controller 28 may be performed by wire or wirelessly.

1-2-8. Timing Sensor 29

The timing sensor 29 senses the timing at which resistance against the operation of the joystick lever 24 is generated in order to allow the operator to feel the start timing of the articulation. The timing sensor 29 has the first rotation angle sensor 101 and the second rotation angle sensor 102 described above. The first rotation angle sensor 101 is provided to the operation input shaft 61, and senses the rotation angle θin of the operation input shaft 61. The second rotation angle sensor 102 is provided to the feedback input shaft 62, and senses the rotation angle θfb (=θs) of the feedback input shaft 62.

2. Operation

The steering of the wheel loader 1 in this embodiment will be described below.

2-1. Steering Operation

When the joystick lever 24 is in its center position, the operation input shaft 61 is in a specific initial position, and the rotation angle θin of the operation input shaft 61 is zero. Since the steering angle θs is also zero, the feedback input shaft 62 is also in a specific initial position. In this embodiment, as shown in FIG. 7a, if zero is a state of going along the longitudinal direction with respect to the rear frame 12, then the steering angle θs is the angle from that state. Also, as shown in FIG. 6, the rotation angle θin indicates the rotation angle from the center position of the joystick lever 24. In finding the deviation angle, rotation to the right may be calculated as a positive angle and rotation to the left may be calculated as a negative angle, for example.

At this point, the operation spool 71 is in the neutral position Np shown in FIG. 4a with respect to the operation sleeve 72. In this case, the pilot pressure is the same in the first pilot chamber 34 and the second pilot chamber 35 of the steering valve 32, and the valve body 33 of the steering valve 32 is also in the neutral position Ns. Therefore, fluid is neither supplied to nor discharged from the left and right steering cylinders 21 and 22, the steering angle θs is maintained at zero, and the rotation angle θfb (=θs) of the feedback input shaft 62 is also maintained at zero.

Next, the operator applies the operation force Fin in order to rotate the joystick lever 24 from the center position to the right side as shown in FIG. 6. If the operation force Fin exceeds F1 of the first spring 64, the operation input shaft 61 rotates to the right just like the joystick lever 24, and the rotation angle θin of the operation input shaft 61 increases. At this point, the steering angle θs is still zero and the rotation angle θfb (=θs) of the feedback input shaft 62 is also zero, due to the delay in the response of the left and right steering cylinders 21 and 22. Therefore, the deviation angle (α=θin−θs) between the rotation angle θin and the steering angle θs increases.

The operation spool 71 rotates to the right with respect to the operation sleeve 72 along with the rotation of the operation input shaft 61. Here, the operation sleeve 72 is integrated with the feedback sleeve 74, and the feedback sleeve 74 is linked to the feedback spool 73 by the second spring 65. The initial counterforce F2 of the second spring 65 is equal to or greater than the counterforce of the spring characteristic S1 of the first spring 64 shown in FIG. 7b. Therefore, the operation sleeve 72 does not rotate along with the operation spool 71, and the operation spool 71 rotates to the right with respect to the operation sleeve 72.

Thus, the operation spool 71 rotates to the right with respect to the operation sleeve 72 and moves to the right pilot position Rp, pilot pressure is supplied to the second pilot port P8, and pilot pressure is supplied to the second pilot chamber 35.

Consequently, the valve body 33 of the steering valve 32 moves to the right steering position Rs, fluid is supplied to the extension port 21a of the steering cylinder 21 and the contraction port 22b of the steering cylinder 22, and fluid is discharged from the contraction port 21b of the steering cylinder 21 and the extension port 22a of the steering cylinder 22. Consequently, articulation commences, the steering angle θs gradually increases, and the front frame 11 is pointed to the right with respect to the rear frame 12 (see R in FIG. 2). This change in the steering angle θs is transmitted by the link mechanism 26 to the feedback input shaft 62, and the feedback input shaft 62 rotates at the rotation angle θs.

When the operator stops the joystick lever 24 at a specific rotation angle θ1, the operation input shaft 61 also stops at the rotation angle θ1. On the other hand, since the steering angle θs gradually increases, the rotation angle θs of the feedback input shaft 62 also increases. The feedback spool 73 rotates along with the feedback input shaft 62, and the feedback sleeve 74 linked to the feedback spool 73 via the second spring 65 also rotates. Since the feedback sleeve 74 is integrated with the operation sleeve 72 via the first center pin 76, the second center pin 77, and the drive shaft 75, the operation sleeve 72 also rotates along with the rotation of the feedback sleeve 74. The difference in the rotation angle between the operation sleeve 72 and the operation spool 71 (the deviation angle α) decreases as the operation sleeve 72 rotates. When the steering angle θs (the rotation angle θs of the feedback input shaft 62) catches up with the rotation angle θ1 (the rotation angle θin of the operation input shaft 61), the deviation angle α drops to zero. At this point, the operation spool 71 of the pilot valve 42 is in the neutral position Np with respect to the operation sleeve 72. In this case, the pilot pressure is the same in the first pilot chamber 34 and the second pilot chamber 35 of the steering valve 32, and the steering valve 32 is also in the neutral position Ns. Accordingly, fluid is neither supplied nor discharged to the left and right steering cylinders 21 and 22, and the steering angle θs is maintained at the rotation angle θ1.

Thus, when the joystick lever 24 is rotated to the right and stopped at the specific rotation angle θ1, the steering angle θs is also maintained at the same rotation angle θ1. Consequently, the front frame 11 is kept facing in the direction of the rotation angle θ1, to the right with respect to the rear frame 12.

Next, when the operator returns the joystick lever 24 from the right side position toward the center position, the operation input shaft 61 similarly rotates, and the rotation angle θin of the operation input shaft 61 decreases. At this point, because of the delay in the response of the left and right steering cylinders 21 and 22, the steering angle θs is still in the state of the rotation angle θ1. Therefore, the difference α in rotation angle (=θin−θs) decreases from zero and becomes negative. Then, the operation spool 71 rotates to the left with respect to the operation sleeve 72 and moves to the left pilot position Lp, and pilot pressure is supplied to the first pilot port P7. Consequently, the valve body 33 of the steering valve 32 moves to the left steering position Ls, fluid is supplied to the contraction port 21b of the steering cylinder 21 and the extension port 22a of the steering cylinder 22, and fluid is discharged from the extension port 21a of the steering cylinder 21 and the contraction port 22b of the steering cylinder 22. The steering angle θs therefore gradually decreases from the rotation angle θ1. This change in the steering angle θs is transmitted by the link mechanism 26 to the feedback input shaft 62, and the feedback input shaft 62 rotates at the same change in the rotation angle as the change in the steering angle θs.

When the operator stops the joystick lever 24 in the central position, the operation input shaft 61 also stops in the initial position, that is, at the position where the rotation angle θin is zero. On the other hand, since the steering angle θs is also gradually decreasing from the rotation angle θ1, the difference in the rotation angle (deviation angle) α gradually decreases. When the steering angle θs goes to zero, the rotation angle θfb of the feedback input shaft 62 (=θs) also goes to zero, and the difference α in the rotation angle goes to zero. At this point, the operation spool 71 is disposed in the neutral position Np with respect to the operation sleeve 72. In this case, the pilot pressure is the same in the first pilot chamber 34 and the second pilot chamber 35 of the steering valve 32, and the steering valve 32 is also in the neutral position Ns. Consequently, fluid is neither supplied to nor discharged from the left and right steering cylinders 21 and 22, and the steering angle θs also returns to zero and held there. As a result, the front frame 11 is returned to an orientation along the longitudinal direction with respect to the rear frame 12.

When the joystick lever 24 is rotated to the left side, everything is the same as above, so it will not be described again.

2-2. Control of Force Imparting Component

The control of the force imparting component 27 when the joystick lever 24 is operated as discussed above will now be described.

The wheel loader 1 in this embodiment changes the assist torque to be imparted to the operation of the joystick lever 24 according to the torque and the speed on the basis of the first assist torque information.

The wheel loader 1 in this embodiment is set to generate resistance against operation so that when the joystick lever 24 is operated, the operator will intuitively grasp the timing at which an inclination operation (articulation) of the front frame 11 with respect to the rear frame 12 starts, on the basis of the second assist torque information.

First, the first assist torque information and the second assist torque information will be described.

2-2-1. First Assist Torque Information

Figures 10A, 10B:
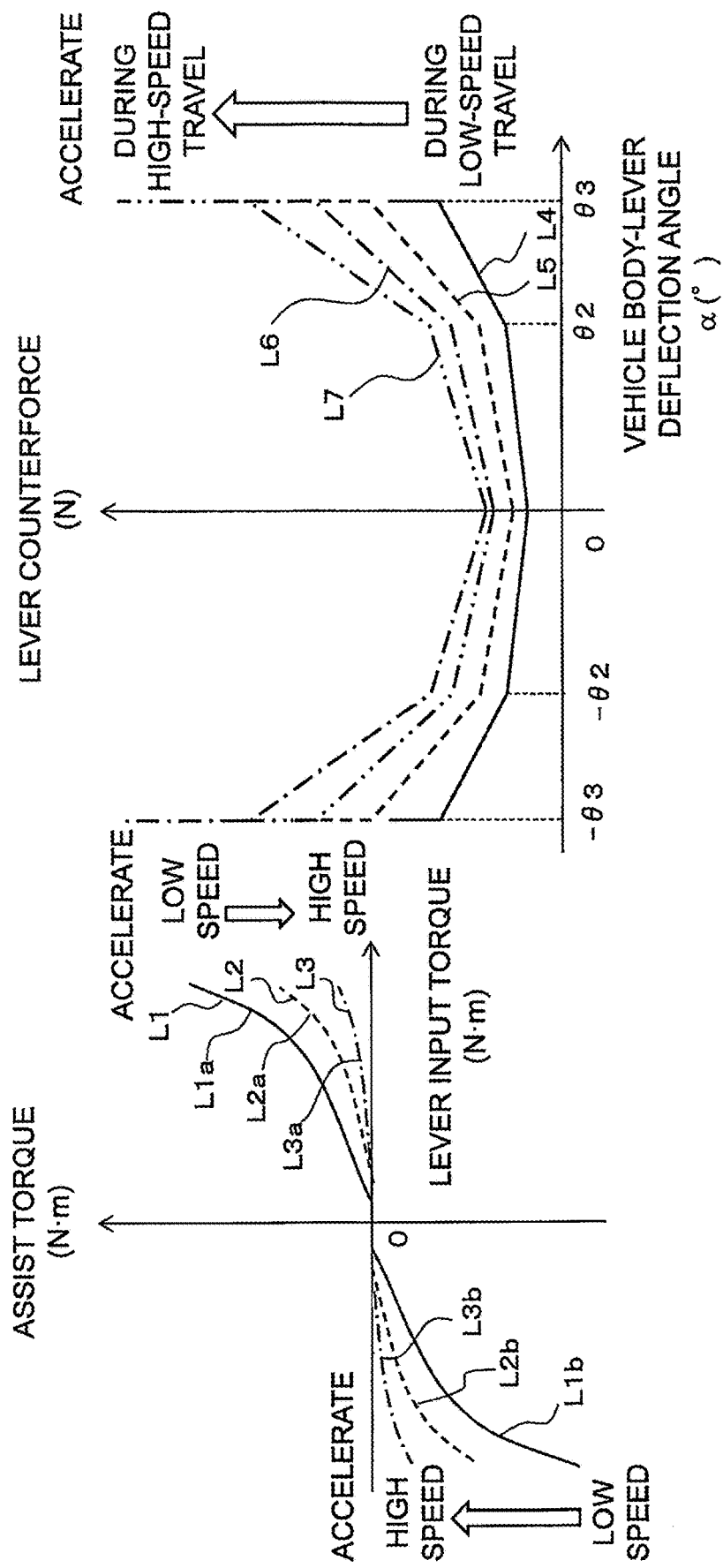

FIG. 10a is a graph of the assist torque (first assist torque information) imparted for each speed versus the input torque. In FIG. 10a, the solid line L1 indicates assist torque information at a vehicle speed of 0 km/h, the dotted line L2 indicates assist torque information at a vehicle speed of 25 km/h, and the one-dot chain line L3 indicates assist torque information at a vehicle speed of 40 km/h.

In the graph shown in FIG. 10a, positive lever input torque indicates the torque generated by rotation of the joystick lever 24 toward the right side, and negative lever input torque indicates rotation of the joystick lever 24 toward the left side. Also, a case is shown in which the positive assist torque applies a force to clockwise rotation of the input shaft 81b, and a case is shown in which the negative assist torque applies a force to the counterclockwise rotation of the input shaft 81b.

That is, L1a indicates the assist torque when the joystick lever 24 is rotated to the right at a vehicle speed of 0 km/h, and L1b indicates the assist torque when the joystick lever 24 is rotated to the left at a vehicle speed of 0 km/h. L2a indicates the assist torque when the joystick lever 24 is rotated to the right at a vehicle speed of 25 km/h, and L2b indicates the assist torque when the joystick lever 24 is rotated to the left at a vehicle speed of 25 km/h. L3a indicates the assist torque when the joystick lever 24 is rotated to the right at a vehicle speed of 40 km/h, and L3b indicates the assist torque when the joystick lever 24 is rotated to the left at a vehicle speed of 40 km/h.

L1a, L2a, and L3a show a case in which the joystick lever 24 is rotated to the right side, and since the assist torque is a positive value at this point, a force is applied to the clockwise rotation of the input shaft 81b. L1b, L2b, and L3b show a case in which the joystick lever 24 is rotated to the left side, and since the assist torque is a negative value, a force is applied to the counterclockwise rotation of the input shaft 81b. Thus, an assist force is added to the operation of the joystick lever 24.

Also, L1a and L1b are symmetrical with respect to the origin, L2a and L2b are symmetrical with respect to the origin, and L3a and L3b are symmetrical with respect to the origin. Therefore, the assist force is in right and left symmetry with respect to the absolute value of the input torque.

FIG. 10b is a graph of lever counterforce versus the vehicle body-lever deviation angle when assist torque is and is not imparted. In FIG. 10b, a positive deviation angle $\alpha$ indicates that the joystick lever 24 has moved to the right side, and a negative deviation angle $\alpha$ indicates that the joystick lever 24 has moved to the left side. That is, as shown in FIG. 7e, the angle $\theta 3$ indicates the angle at which the operation is restricted when the joystick lever 24 has been rotated to the right, and the angle $-\theta 3$ indicates the angle at which the operation is restricted when the joystick lever 24 has been rotated to the left. As shown in FIG. 7d, the angle $\theta 2$ indicates the angle at which the first center pin 76 hits the wall portions 71ae and 71be when the joystick lever 24 has been rotated to the right, and the angle $-\theta 2$ indicates the angle at which the first center pin 76 hits the wall portions 71ae and 71be when the joystick lever 24 has been rotated to the left.

The solid line L4 shows the lever counterforce with respect to the deviation angle when the vehicle speed is 0 km/h, the dotted line L5 shows the lever counterforce with respect to the deviation angle when the vehicle speed is 25 km/h, and the one-dot chain line L6 shows the lever counterforce with respect to the deviation angle when the vehicle speed is vehicle speed is 40 km/h. In FIG. 10b, the two-dot chain line L7 shows the case when no assist torque is imparted. FIG. 10b shows the same state as FIG. 7b.

As shown in FIG. 10b, L4 to L7 are in line symmetry with respect to the vertical axis, and in L4 to L6, an assist force is imparted symmetrically to left and right operations, and the lever counterforce is smaller than when no assist torque is imparted (L7).

Also, the lever counterforce is set to increase as the speed rises. This makes it possible to achieve both good operability at low speed and good stability at high speed.

The first assist torque determination component 201 determines the first assist torque from the assist torque information for three stored vehicle speeds on the basis of the sensed value from the vehicle speed sensor 105. When the sensed value from the vehicle speed sensor 105 is within these three speeds (for example, 12 km/h), assist torque for that vehicle speed is calculated by interpolation. Calculating the first assist torque by interpolation allows the assist torque to be continuously varied according to changes in speed.

2-2-2. Second Assist Torque Information

Figures 11A, 11B:
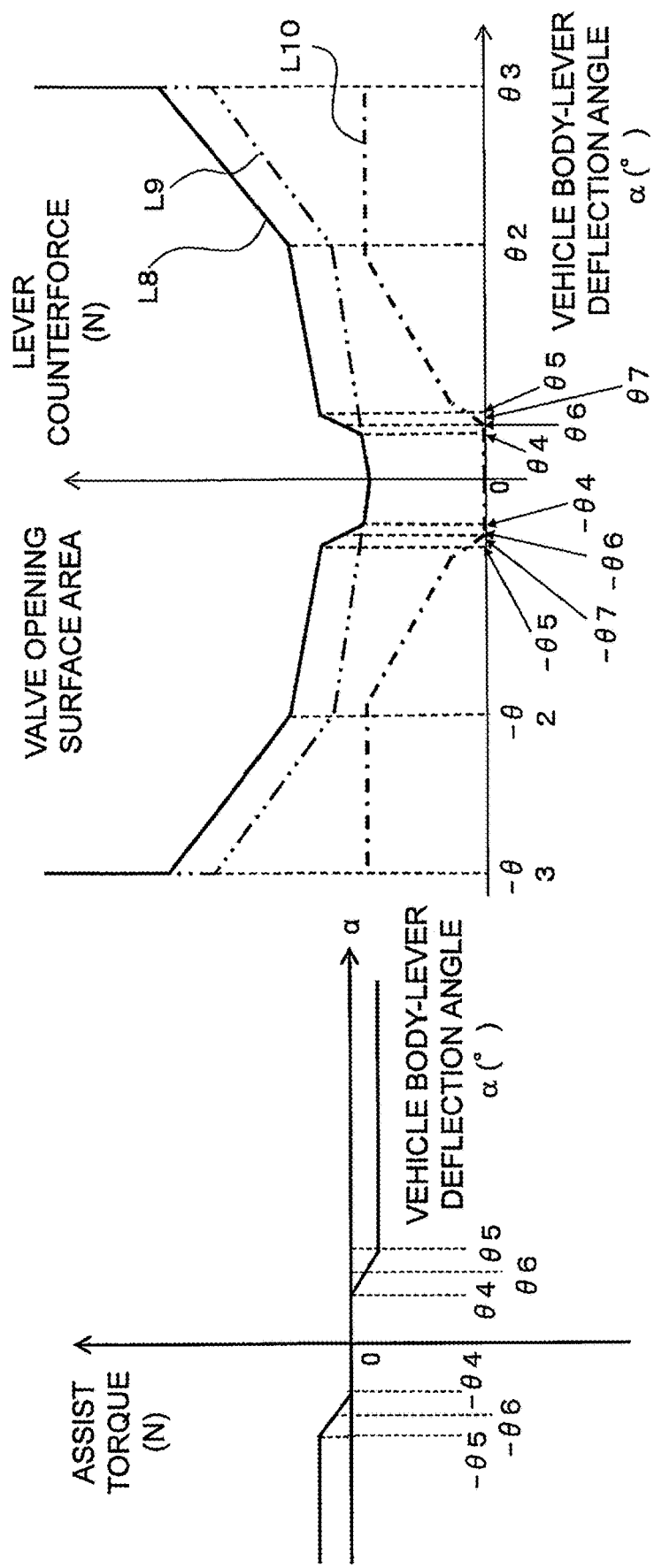

The second assist torque information indicates the assist torque to be imparted in order to generate resistance to the operation of the joystick lever 24 before articulation begins when the joystick lever 24 is operated. FIG. 11a is a graph of assist torque versus vehicle body-lever deviation angle ($\alpha$) (second assist torque information). FIG. 11a also shows the case when the joystick lever 24 is operated to the right side at a positive vehicle body-lever deviation angle $\alpha$ ($\theta in-\theta s$), when the joystick lever 24 is operated to the left side at a negative vehicle body-lever deviation angle $\alpha$. Also shows are the case when positive assist torque applies a force to the clockwise rotation of the input shaft 81b, and when negative assist torque applies a force to the counterclockwise rotation of the input shaft 81b.

With the second assist torque information shown in FIG. 11a, a counterforce is generated when the deviation angle $\alpha$ reaches an angle of $\pm\theta 4$, and the assist torque is set so that the counterforce increases until the deviation angle reaches $\pm\theta 5$.

Specifically, with the second assist torque information, when the joystick lever 24 is rotated to the right and the deviation angle $\alpha$ reaches an angle of $+\theta 4$, a force is applied to the counterclockwise rotation of the input shaft 81b until the deviation angle $\alpha$ reaches $+\theta 5$. This force in the counterclockwise rotation direction is set so that resistance increases at a constant slope from $+\theta 4$ to $+\theta 5$. Once the deviation angle has reached $+\theta 5$, the force applied to the input shaft 81b in the counterclockwise rotation direction is constant.

When the joystick lever 24 is rotated to the left and the deviation angle $\alpha$ reaches an angle of $-\theta 4$, a force is applied to the input shaft 81b in the clockwise direction until the deviation angle $\alpha$ reaches $-\theta 5$. This force in the clockwise rotation direction is set such that resistance increases at a constant slope. Once the deviation angle reaches $-\theta 5$, the force applied to the input shaft 81b in the clockwise direction is constant.

FIG. 11b is a graph of lever counterforce versus the vehicle body-lever deviation angle when assist torque is and is not imparted, on the basis of the second assist torque information in FIG. 11a. The solid line L8 indicates the case when assist torque is imparted, and the two-dot chain line L9 indicates the case when assist torque is not imparted. L9 is the same graph as in FIG. 7b and L7 in FIG. 10b.

Also, in FIG. 11b, the one-dot chain line L10 shows a graph of the opening surface area of the steering valve 32 with respect to the deviation angle $\alpha$. In L10, the vertical axis is the opening surface area. As described above, after the joystick lever 24 is operated so that pilot pressure is supplied from the pilot valve 42, the valve body 33 moves and the steering valve 32 starts to open. The angle at which this opening occurs is when the deviation angle $\alpha$ is $\pm\theta 6$. That is, when the deviation angle reaches $\pm\theta 6$ from the neutral position, the port starts to open and fluid starts being supplied toward the steering cylinder 21. After this, the left and right steering cylinders 21 and 22 expand and contract, and articulation is commenced. As the absolute value of the deviation angle further increases, the opening area of the steering valve 32 also increases, the deviation angle reaches its maximum value in the vicinity of $\theta 2$, and even if the absolute value of the deviation angle increases after that, the opening area remains constant. Also, the timing at which the articulation begins is delayed somewhat from $\pm\theta 6$, which is the opening timing of the steering valve 32, and is indicated by $\pm\theta 7$. $-\theta 7$ to $+\theta 7$ correspond to the angle of play in the joystick lever 24. The angle θ4 is set to a value less than the angle θ2 shown in FIGS. 7b and 10b, and the angle −θ4 to a value greater than −θ2.

As shown in FIG. 11a, the opening angle +θ6 is set between +θ4 and +θ5, and the opening angle −θ6 is set between −θ5 and −θ4. Also, since the start of the articulation is delayed from the start of the opening of the steering valve 32, resistance against the operation of the joystick lever 24 is generated before the start of the articulation.

As shown by L8, when the operator operates the joystick lever 24, the slope from the neutral position to the deviation angle θ4 (the increase in lever counterforce with respect to the deviation angle α) is due to the elastic force of the first spring 64. The slope from +θ4 to +θ5 is due to the increase in resistance produced by the second assist torque shown in FIG. 11a and to the elastic force of the first spring 64, and the proportional increase of the lever counterforce versus the deviation angle is greater than between the neutral position (where the deviation angle α is zero) and +θ4. The slope of L8 when the deviation angle α is from +θ5 to +θ2 is due to the elastic force of the first spring 64. The slope of L8 when the deviation angle α is from +θ2 to +θ3 is due to the elastic force of the second spring 65. The negative side of L8 is symmetrical with the positive side.

As shown by L8, when the operator operates the joystick lever 24, the slope of the graph, which is the proportional increase in lever counterforce versus the absolute value of the deviation angle when the absolute value of the deviation angle is between θ4 and θ5, is greater than the slope when the absolute value of the deviation angle is up to θ4. Consequently, the operator can feel the point at which the articulation starts as resistance, so it is easy to perform fine operations in which only a slight articulation is performed.

2-2-3. Control Operation

Figure 12:
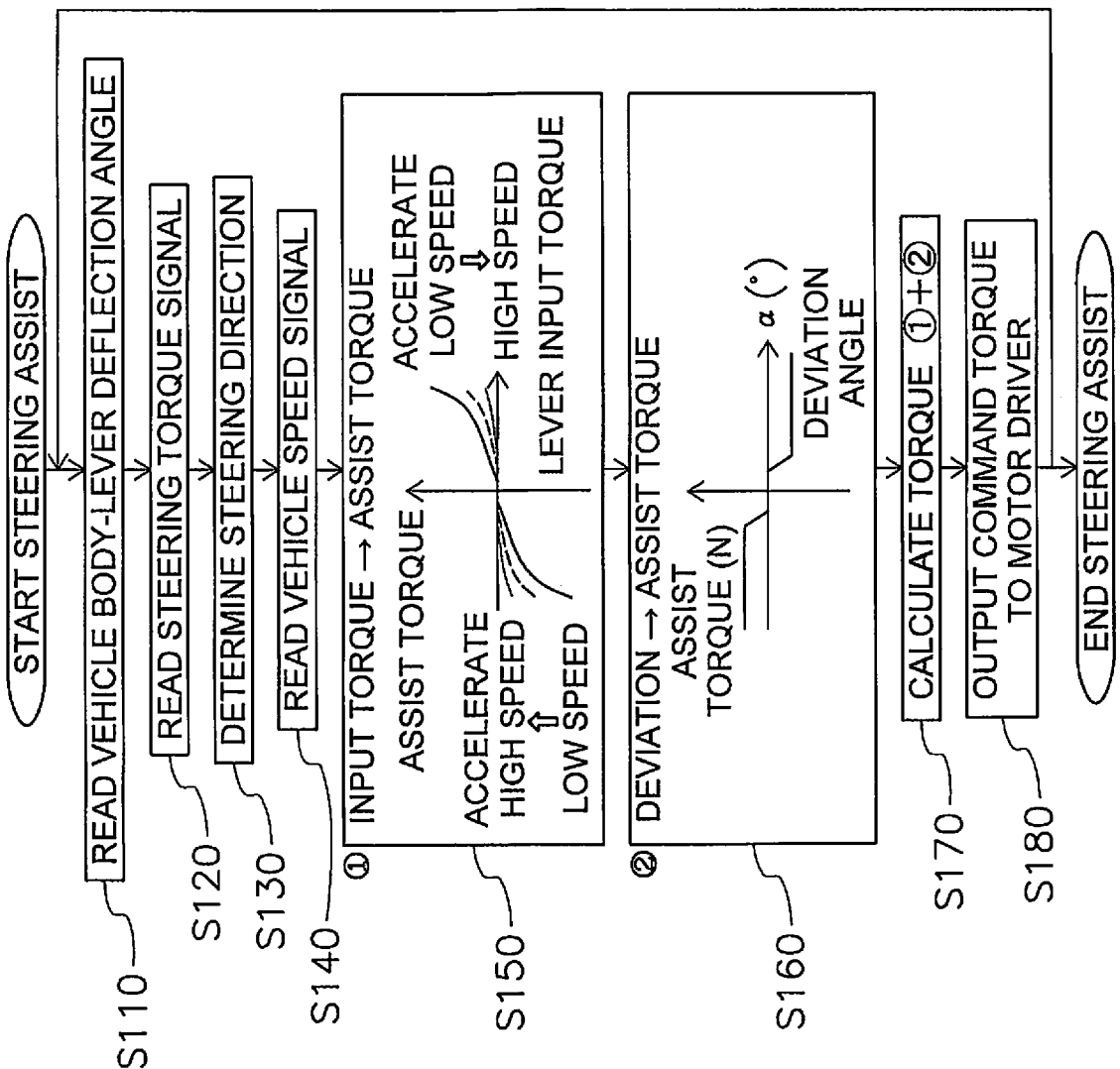
FIG. 12 is a flowchart of the wheel loader control method in Embodiment 1 of the present invention.

FIG. 12 is a flowchart of the control operation of the force imparting component 27.

When the joystick lever 24 is operated, in step S110 the second assist torque determination component 202 of the controller 28 receives a first rotation angle signal (S(θ1) in FIG. 9) from the first rotation angle sensor 101, and receives a second rotation angle signal (S(θ2) in FIG. 9) from the second rotation angle sensor 102. Consequently, the second assist torque determination component 202 acquires the rotation angle θin of the operation input shaft 61 from the first rotation angle sensor 101, and acquires the rotation angle θfb (=θs) of the feedback input shaft 62 from the second rotation angle sensor 102. The second assist torque determination component 202 then calculates the deviation angle α (=θin−θs).

Next, in step S120, the first assist torque determination component 201 of the controller 28 receives a steering torque signal (S(T0) in FIG. 9) from the torque sensor 103. The steering torque signal includes information related to the amount of torque and the direction of rotation. For example, if the torque value is positive, the torque is considered to be produced by clockwise rotation of the input shaft 81b, and if the torque value is negative, the torque is considered to be produced by counterclockwise rotation of the input shaft 81b, and therefore information related to the amount of torque and the rotation direction can be included in the torque value.

Next, in step S130, the controller 28 determines the steering direction of the joystick lever 24 on the basis of the steering torque signal. This steering direction determines the rotational direction of the electric motor 111 when force is imparted.

Next, in step S140, the first assist torque determination component 201 of the controller 28 acquires a signal of the vehicle speed V (S(V) in FIG. 9) from the vehicle speed sensor 105.

Next, in step S150, the first assist torque determination component 201 determines the first assist torque on the basis of the first assist information stored in the storage component 200. The first assist torque determination component 201 then outputs the first assist torque thus determined as a first assist torque signal (S(T1) in FIG. 9).

The controller 28 stores the three kinds of first assist torque information shown in FIG. 10 (when the vehicle speed is 0 km/h, 25 km/h, and 40 km/h). When the sensed value from the vehicle speed sensor 105 is within these three speeds (for example, 12 km/h), the controller 28 calculates the assist torque at that speed by interpolation. The controller 28 thus determines the first assist torque by interpolation. Calculating the first assist torque by interpolation allows the assist torque to be continuously varied according to changes in speed.

Next, in step S160, the second assist torque determination component 202 determines the second assist torque on the basis of the second assist torque information shown in FIG. 11a from the deviation angle α calculated in step S110. The second assist torque determination component 202 then outputs the second assist torque thus determined as a second assist torque signal (S(T2) in FIG. 9).

Next, in step S170, the calculator 203 adds the first assist torque to the second assist torque to calculate the target assist torque, and outputs the calculated target assist torque as a target assist torque signal (S(T3)) to the drive circuit 204.

Here, the target assist torque is a positive or negative value, and also includes information about the rotational direction. For example, if the rotation is to the right, an assisting force is imparted with the first assist torque information shown in FIG. 10a, but with the second assist torque information shown in FIG. 11a, if the deviation angle α exceeds the angle θ4, counterforce is imparted. In the calculator 203, these values are summed, and when the absolute value of the counterforce is greater than the absolute value of the assisting force, the target assist torque is a negative value, and a force equal to the remainder of subtracting the absolute value of the assisting force from the absolute value of the counterforce is imparted to counterclockwise rotation. On the other hand, when the absolute value of the assisting force is greater than the absolute value of the counterforce, the target assist torque is a positive value, and a force equal to the remainder of subtracting the absolute value of the counterforce from the absolute value of the assisting force is imparted.

Figure 13:
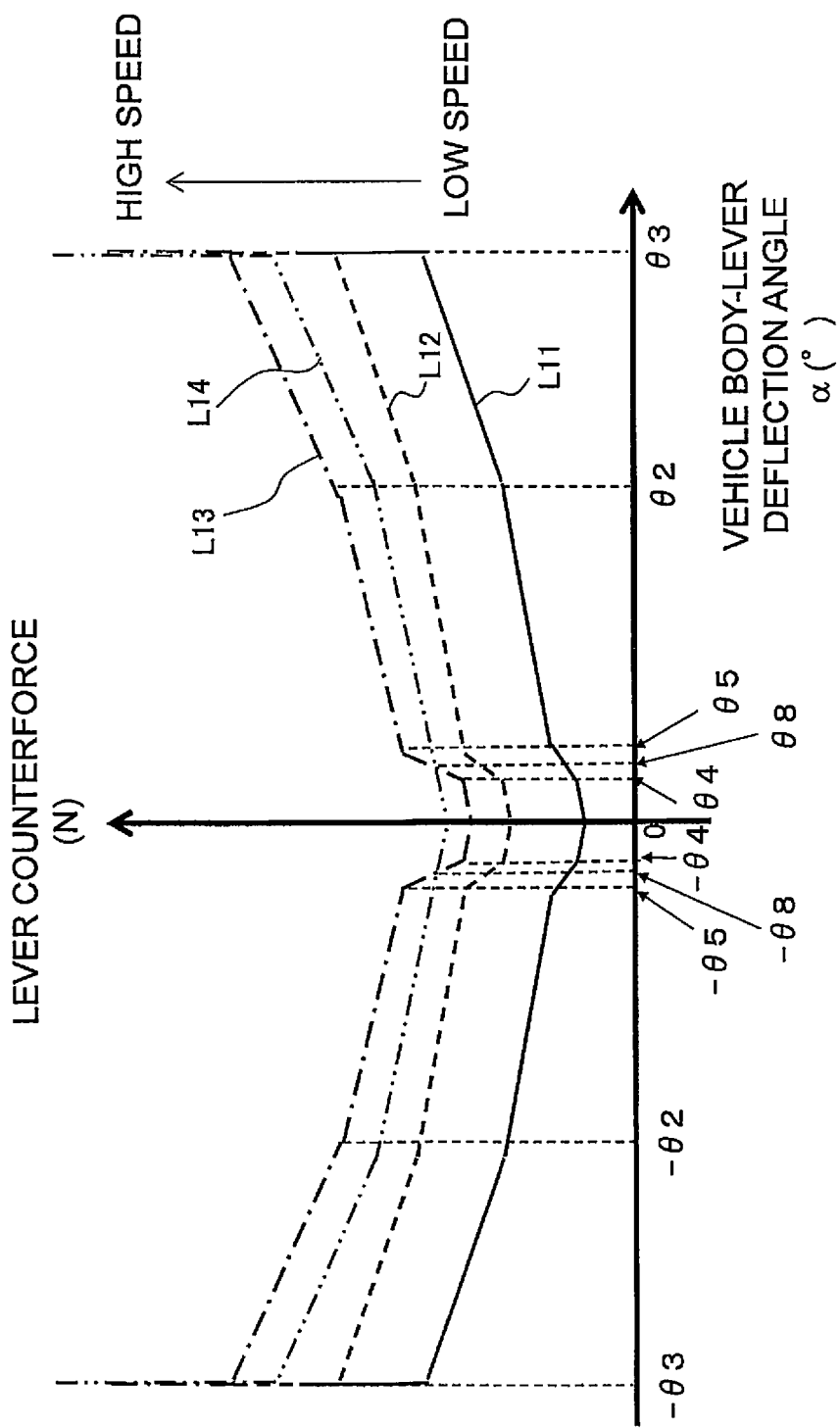

FIG. 13 is a graph of the lever counterforce versus the deviation angle when the assist torque combined by the calculator 203 is imparted to the operation of the joystick lever 24. In FIG. 13, three kinds of combined assist torque are shown as examples: high speed, medium speed, and low speed. The solid line L11 indicates the lever counterforce versus the deviation angle when the vehicle speed is 0 km/h, the dotted line L12 indicates the lever counterforce versus the deviation angle when the vehicle speed is 25 km/h, and the one-dot chain line L13 indicates the lever counterforce versus the deviation angle when the vehicle speed is 40 km/h. The two-dot chain line L14 indicates the case when no assist torque is imparted. L14 is the same graph as L9 and L7.

As shown in FIG. 13, the lever counterforce is set to increase as the speed rises. This makes it possible to achieve both good operability at low speed and good stability at high speed. Also, since the rate of increase (slope) of the lever counterforce versus the deviation angle is steep between the absolute values of θ4 and 85 of the deviation angle for each speed (solid line L11, dotted line L12, one-dot chain line L13), the operator can feel the beginning of the articulation.

In the low-speed graph (solid line L11) and the medium-speed graph (dotted line L12) in FIG. 13, when the deviation angle α reaches ±θ4 the assisting force is weakened with respect to when no assist torque is imparted (see the two-dot chain line L14), and as a result, resistance is generated in the joystick lever 24, and the operator is made to feel the start of the articulation.

Also, in FIG. 13, the high-speed graph (one-dot chain line L13) intersects with the graph when no assist torque is imparted (the two-dot chain line L14) at the angle θ8 between the absolute values of θ4 to θ5 of the deviation angle. This is because the assisting force imparted by the first assist torque information is small at high speed, so the counterforce is increased by imparting counterforce according to the second assist torque information, as compared to when no assist torque is imparted. That is, a counterforce is imparted to the operation of the joystick lever 24 in the region where the absolute value of the deviation angle is greater than the intersecting angle θ8.

As described above, in the high-speed graph (one-dot chain line L13) in FIG. 13, resistance is generated in the joystick lever 24 by weakening the assisting force when the deviation angle is between θ4 and θ8 and between −θ4 and −θ8, with respect to when no assisting force is imparted (see the two-dot chain line L14). Resistance is then generated in the joystick lever 24 by increasing the counterforce when the deviation angle is between θ8 and θ5, and between −θ5 and −θ8.

Next, in step S180, the calculator 203 outputs a command torque signal to the drive circuit 204 on the basis of the target assist torque that has been determined. Consequently, the electric motor 111 is driven, and a force is imparted to the operation of the joystick lever 24 via the connecting portion 25.

Embodiment 2

The wheel loader 1 in Embodiment 2 of the present invention will now be described.

Figure 14:
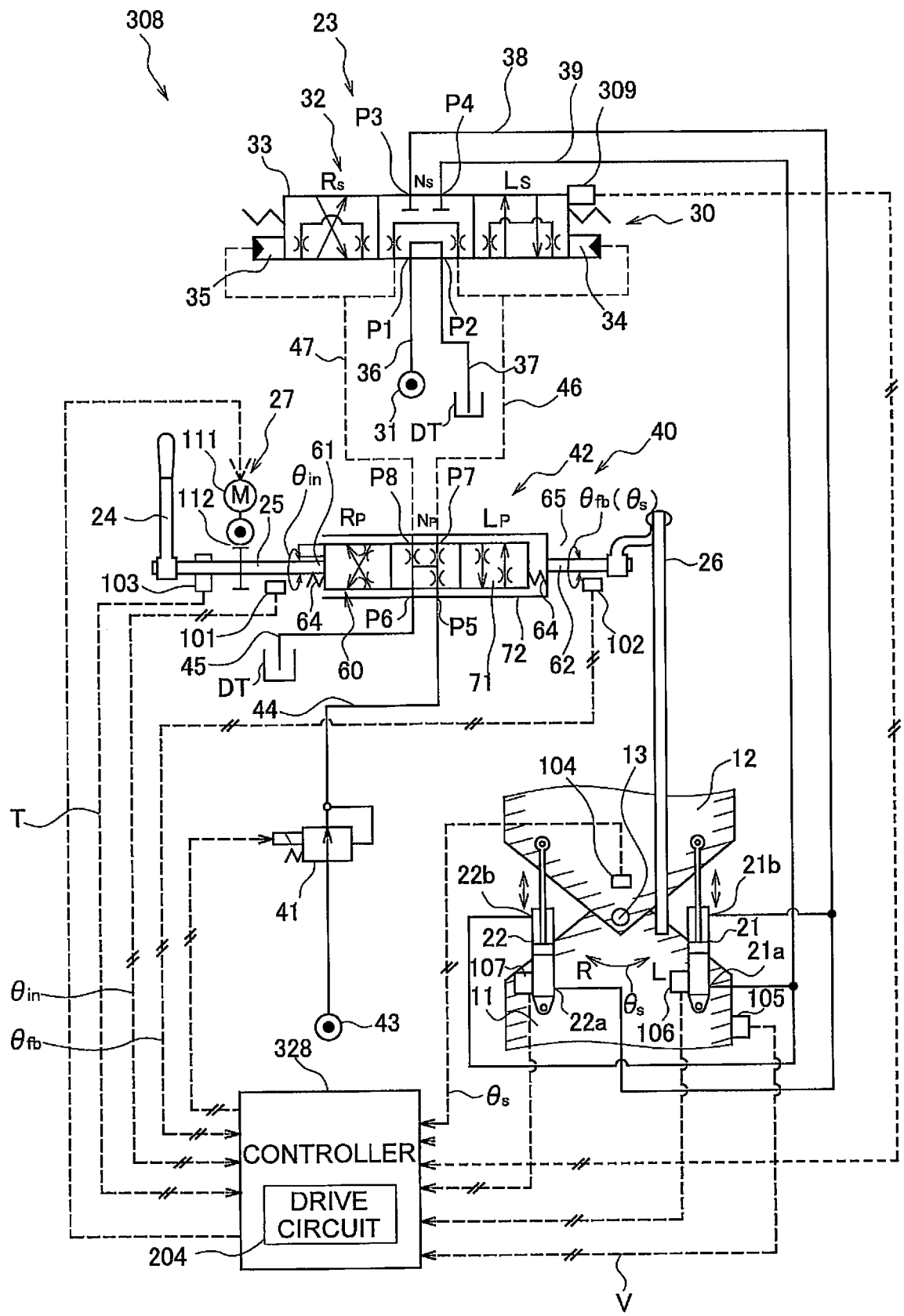
FIG. 14 is a hydraulic circuit diagram showing the configuration of the steering operation device of the wheel loader in Embodiment 2 of the present invention.

In the first embodiment, as shown by the first assist torque information in FIG. 11a, the timing at which resistance to the operation of the joystick lever 24 is generated is determined on the basis of the deviation angle α, but in Embodiment 2, the timing of at which the resistance is generated is determined by sensing the position of the valve body 33 of the steering valve 32. In Embodiment 2 we will focus on what is different from the configuration in Embodiment 1. Those components that are the same as in Embodiment 1 will be numbered the same and will not be described again.
Configuration FIG. 14 is a diagram of a steering operation device 308 of the wheel loader 1 Embodiment 2. As shown in FIG. 14, the steering operation device 308 in Embodiment 2 is different from the steering operation device 8 in Embodiment 1 in that it has a valve body position sensor 309 that senses the position of the valve body 33 of the steering valve 32. A controller 328 receives the sensed value from the valve body position sensor 309.

Figure 15:
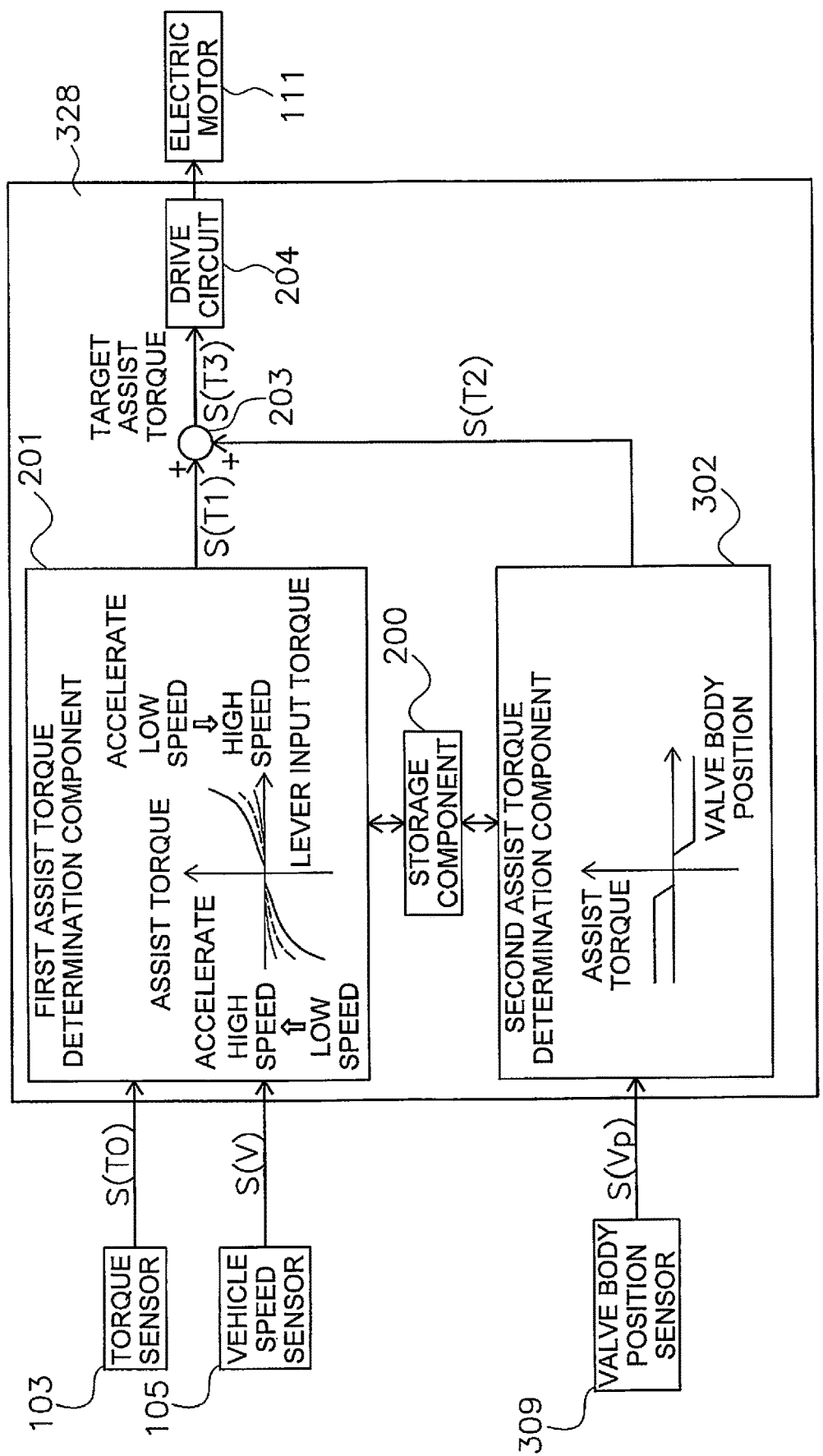
FIG. 15 is a block diagram of the configuration of the controller in FIG. 14.

FIG. 15 is a block diagram of the configuration of the controller 328 in Embodiment 2. Unlike the controller 28 in Embodiment 1, the controller 328 has a second assist torque determination component 302. The second assist torque determination component 302 receives a valve body position signal (S(Vp) in FIG. 15) related to the valve body position sensed by the valve body position sensor 309. The second assist torque determination component 302 then determines the second assist torque from the valve body position on the basis of the second assist torque information stored in the storage component 200, and sets the second assist torque thus determined as the second assist torque (S(T2) in FIG. 15).

Figure 16:
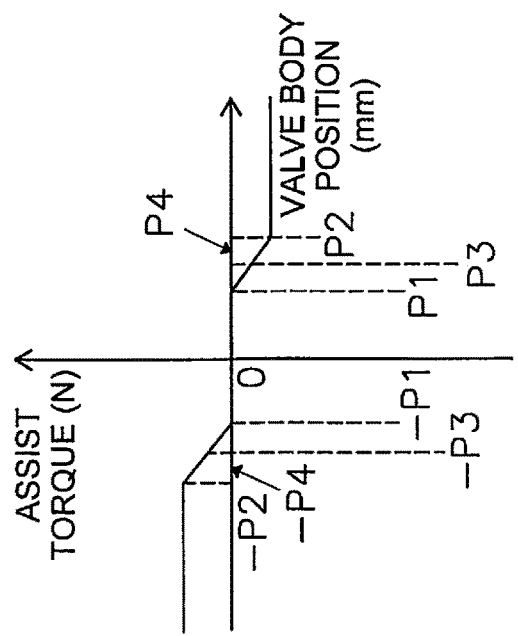
FIG. 16 is a graph of second assist torque information stored in the storage component in FIG. 15 (the assist torque imparted versus the valve body position)

FIG. 16 is a diagram of the second assist torque information in Embodiment 2. In FIG. 16, a state in which the valve body 33 of the steering valve 32 is in the neutral position Ns is defined as 0, a state in which the valve body 33 has moved to the right steering position Rs side is on the positive side of the horizontal axis, and a state in which the valve body 33 has moved to the left steering position Ls side is on the negative side of the horizontal axis. Also, the diagram shows a case in which a positive assist torque applies a force to the input shaft 81b in the clockwise rotation direction, and a case in which a negative assist torque applies a force to the input shaft 81b in the counterclockwise rotation direction.

With the second assist torque information, when the joystick lever 24 is rotated to the right and the valve body 33 moves to the right steering position Rs side and reaches the position P1, a force is applied to the input shaft 81b in the counterclockwise rotation direction. Then, the force in the counterclockwise direction increases (the resistance increases) at a constant slope until the position reaches P2. Once the position reaches P2, the force applied to the input shaft 81b in the counterclockwise rotation direction is constant.

Also, with the second assist torque information, when the joystick lever 24 is rotated to the left and the valve body 33 moves to the left steering position Ls side and reaches the position −P1, a force is applied to the input shaft 81b in the clockwise direction. Then, the force in the clockwise direction increases (the resistance increases) at a constant slope until the position reaches −P2. Once the position reaches −P2, the force applied to the input shaft 81b in the clockwise direction is constant.

These positions ±P1 and ±P2 are set on the basis of the opening timing of the steering valve 32 or the start timing of the articulation.

The opening position of the steering valve 32 is indicated by the position ±P3. The position P1 and position P2 are preset to include the position P3 in between them. The position −P1 and position −P2 are preset to include the position −P3 in between them.

The position of the valve body 33 when articulation begins is indicated by P4. As shown in FIG. 16, since the articulation is slightly delayed from the opening position of the steering valve 32, the position P4 is somewhat larger than the position P3, and the position −P4 is somewhat smaller than the position −P3. Also, the position P4 is smaller than the position P2, and the position −P4 is larger than the position −P2, but depending on the rise (slope) of the assist torque, the position P4 may be larger than the position P2, and the position −P4 may be smaller than the position −P2.

2. Operation

Figure 17:
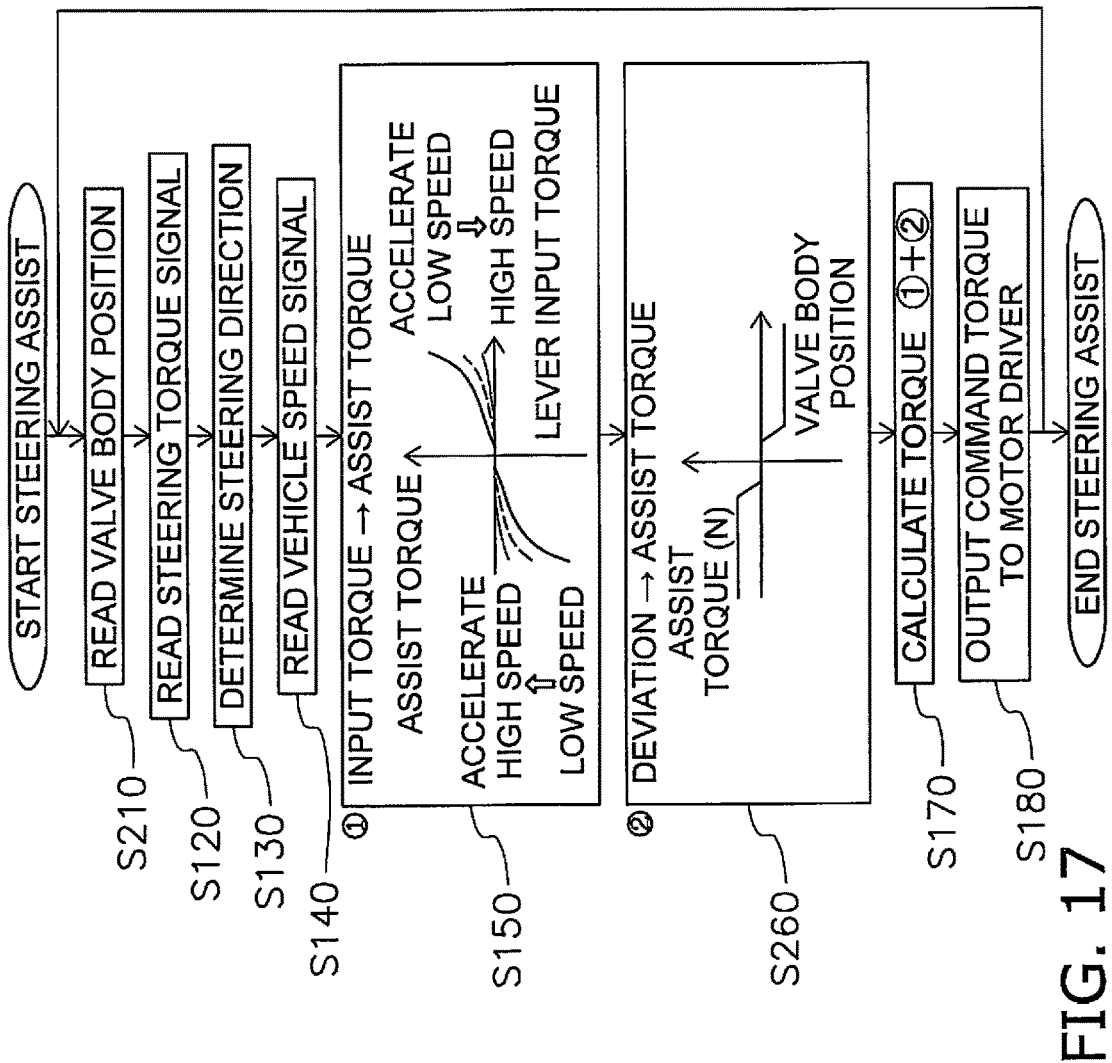
FIG. 17 is a flowchart of the wheel loader control method according to Embodiment 2 of the present invention.

Next, the operation for controlling the force imparting component 27 when the joystick lever 24 is operated will be described. FIG. 17 is a flowchart of the operation for controlling the force imparting component.

When the joystick lever 24 is operated, in step S210 the controller 328 receives a valve body position signal (S(Vp) in FIG. 15) from the valve body position sensor 309, and acquires information about the position of the valve body 33.

Next, in step S120, the first assist torque determination component 201 of the controller 328 receives a steering torque signal from the torque sensor 103. The steering torque signal includes information related to the amount of torque and the rotation direction.

Next, in step S130, the controller 328 determines the steering direction of the joystick lever 24 on the basis of the steering torque signal. This steering direction determines the rotation direction of the electric motor 111 when the force is imparted.

Next, in step S140, the first assist torque determination component 201 of the controller 328 acquires a signal indicating the vehicle speed V (S(V) in FIG. 15) from the vehicle speed sensor 105.

Next, in step S150, the first assist torque determination component 201 determines the first assist torque on the basis of the first assist information stored in the storage component 200. The first assist torque determination component 201 then outputs the first assist torque thus determined as a first assist torque signal (S(T1) in FIG. 15).

Next, in step S260, the second assist torque determination component 302 determines the second assist torque on the basis of the second assist torque information shown in FIG. 16 from the valve body position calculated in step S210. The second assist torque determination component 202 then outputs the second assist torque thus determined as a second assist torque signal (S(T2) in FIG. 15).

Next, in step S170, the calculator 203 calculates the target assist torque by adding the first assist torque to the second assist torque, and outputs the calculated target assist torque as a target assist torque signal (S(T3) in FIG. 15) to the drive circuit 204.

As described above, in Embodiment 2, when the absolute value of the valve body position sensed by the valve body position sensor 309 reaches P1, resistance to the operation of the joystick lever 24 is generated using this absolute value as a trigger.

Embodiment 3

The wheel loader 1 in Embodiment 3 of the present invention will now be described.

In Embodiment 2, the timing at which resistance against the operation of the joystick lever 24 is generated is determined by sensing the position of the valve body 33 of the steering valve 32, but in Embodiment 3, the timing at which resistance is generated is determined by sensing the pilot pressure. In Embodiment 3 we will focus on what is different from the configuration in Embodiment 2. Those components that are the same as in Embodiment 2 will be numbered the same and will not be described again.

Configuration

Figure 18:
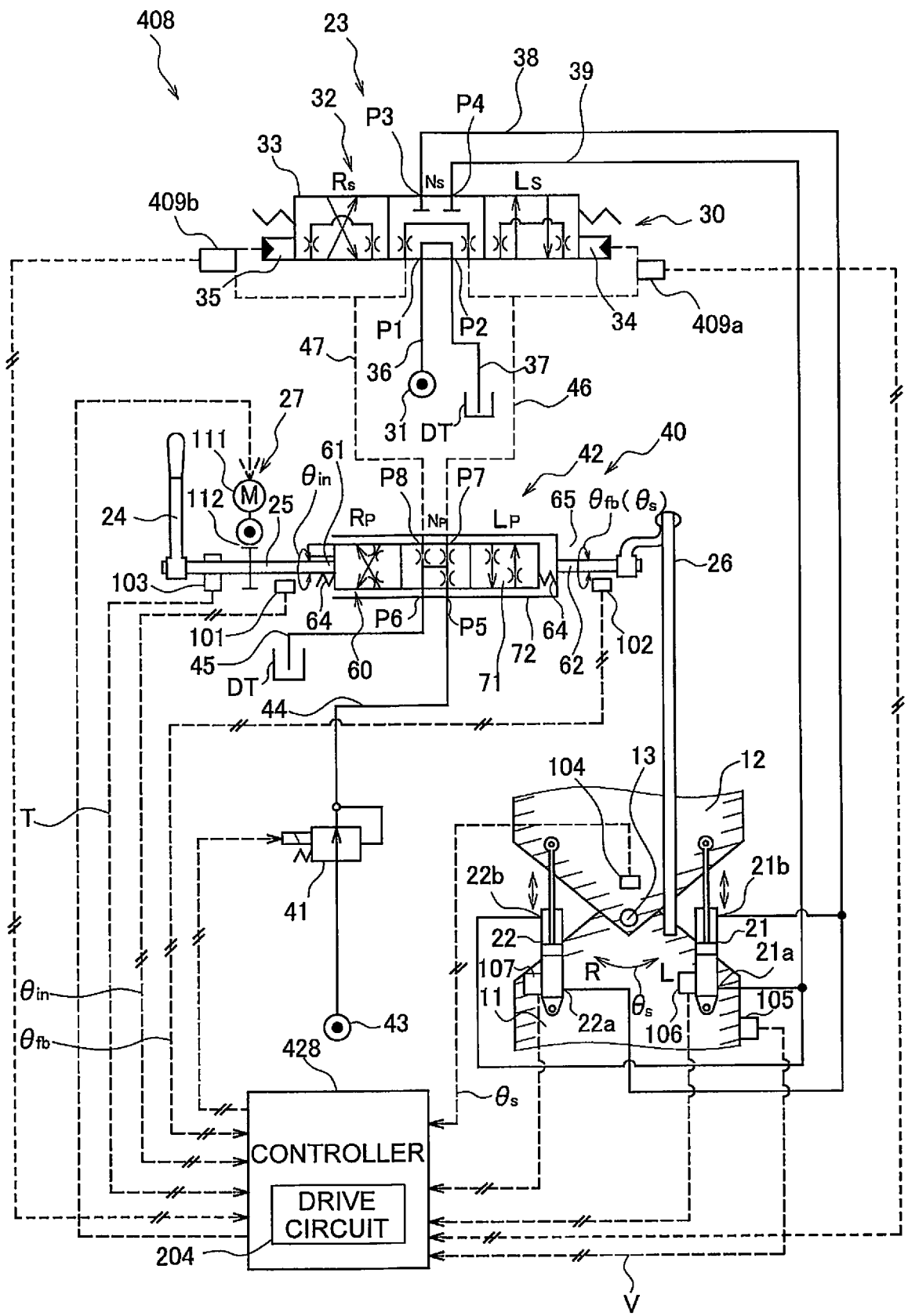
FIG. 18 is a hydraulic circuit diagram of the configuration of the steering operation device of the wheel loader in Embodiment 3 of the present invention.

FIG. 18 is a view of the steering operation device 408 of the wheel loader 1 in Embodiment 3. As shown in FIG. 18, the steering operation device 408 in Embodiment 3 differs from the steering operation device 308 in Embodiment 2 in that the valve body position sensor 309 is not provided, and there are pilot pressure sensors 409a and 409b for sensing the pilot pressure.

The pilot pressure sensor 409a is provided to the first pilot line 46 and senses the pilot pressure supplied from the pilot hydraulic pressure source 43 to the first pilot line 46 via the pilot valve 42. The pilot pressure sensor 409b is provided to the second pilot line 47 and senses the pilot pressure supplied from the pilot hydraulic pressure source 43 to the second pilot line 47 via the pilot valve 42.

The controller 428 receives the sensed values from the pilot pressure sensors 409a and 409b.

Figure 19:
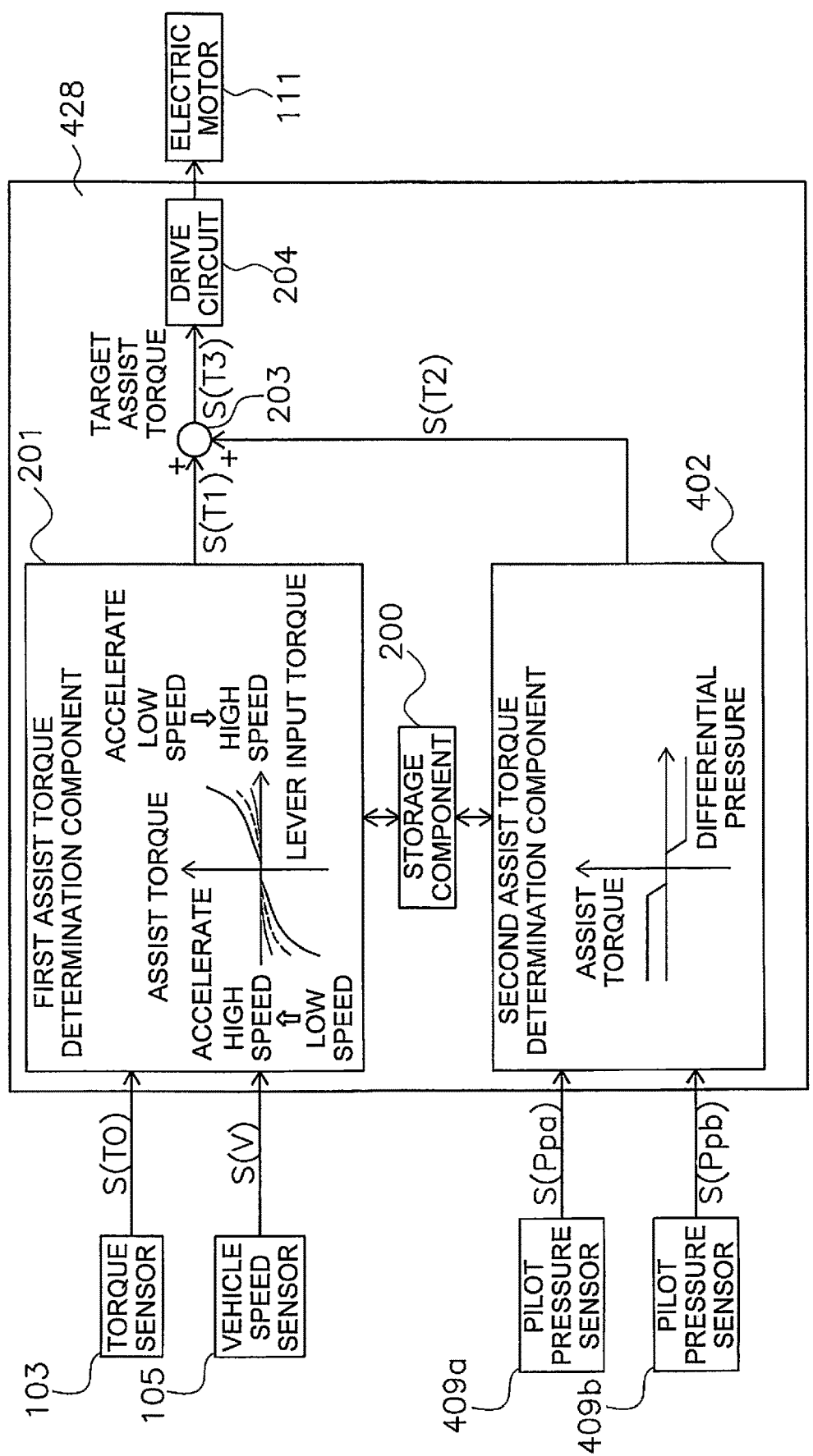
FIG. 19 is a block diagram of the configuration of the controller in FIG. 18.

FIG. 19 is a block diagram of the configuration of the controller 428 in Embodiment 3. Unlike the controller 328 in Embodiment 2, the controller 428 has a second assist torque determination component 402. The second assist torque determination component 402 receives pilot pressure signals (S(Ppa) and S(Ppb) in FIG. 19) related to the values sensed by the pilot pressure sensors 409a and 409b. The second assist torque determination component 402 then finds the differential pressure from the values sensed by the pilot pressure sensors 409a and 409b, and determines the second assist torque from the differential pressure on the basis of the second assist torque information stored in the storage component 200. The second assist torque determination component 402 then outputs the second assist torque thus determined as a second assist torque signal (S(T2) in FIG. 19).

The first assist torque and the determined second assist torque are added together by the calculator 203 to calculate the assist torque.

Figure 20:
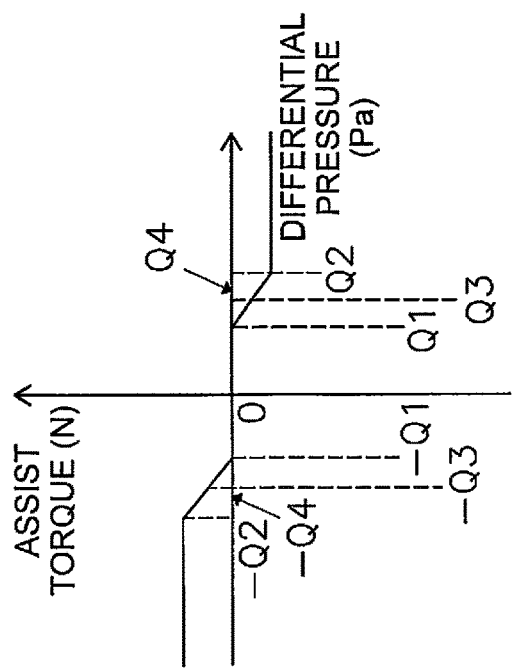
FIG. 20 is a graph of second assist torque information stored in the storage component in FIG. 19 (the assist torque imparted versus the differential pressure)

FIG. 20 is a diagram showing second assist torque information in Embodiment 3. FIG. 20 shows the case when positive assist torque applies a clockwise force to the input shaft 81b, and when negative assist torque applies a counterclockwise force to the input shaft 81b.

Also, in FIG. 20, a state in which there is no difference between the hydraulic pressure of the first pilot line 46 and the hydraulic pressure of the second pilot line 47 is set as zero. The positive size of the horizontal axis is when the hydraulic pressure of the second pilot line 47 is higher than the hydraulic pressure of the first pilot line 46, and the negative size of the horizontal axis is when the hydraulic pressure of the second pilot line 47 is lower than the hydraulic pressure of the first pilot line 46. When the joystick lever 24 is rotated to the right and the pilot valve 42 moves to the right pilot position Rp side and fluid is supplied to the second pilot line 47 side, the differential pressure obtained by subtracting the hydraulic pressure of the line 46 from the hydraulic pressure of the second pilot line 47 becomes larger on the positive side. On the other hand, when the joystick lever 24 is rotated to the left and the pilot valve 42 moves to the left pilot position Lp side and fluid is supplied to the first pilot line 46 side, the differential pressure obtained by subtracting the hydraulic pressure of first pilot line 46 from the hydraulic pressure of second pilot line 47 becomes larger on the negative side.

With the second assist torque information, when the joystick lever 24 is rotated to the right and the differential pressure reaches Q1, a force is applied to the input shaft 81b in the counterclockwise rotation direction. Then, the force in the counterclockwise direction increases (resistance increases) at a constant slope until the differential pressure reaches Q2. Once the differential pressure reaches Q2, the force applied to the input shaft 81b in the counterclockwise rotation direction remains constant.

Also, with the second assist torque information, when the joystick lever 24 is rotated to the left and the differential pressure reaches −Q1, a force is applied to the input shaft 81b in the clockwise direction. Then, the force in the clockwise direction increases (resistance increases) at a constant slope until the differential pressure reaches −Q2. Once the differential pressure reaches −Q2, the force applied to the input shaft 81*b* in the counterclockwise rotation direction remains constant.

The differential pressure ±Q1 and the differential pressure ±Q2 are set on the basis of the timing at which the steering valve 32 opens or the timing at which articulation starts. In FIG. 20, the differential pressure when the steering valve 32 opens is indicated by ±Q3. The differential pressure Q1 and the position Q2 are preset so as to include a differential pressure Q3 in between them. Also, the differential pressure −Q1 and the differential pressure −Q2 are preset so as to include a differential pressure −Q3 in between them.

The differential pressure at the point when articulation starts is indicated by ±Q4. As shown in FIG. 20, since the articulation is slightly later than the opening of the steering valve 32, the differential pressure Q4 is somewhat greater than the differential pressure Q3, and the differential pressure −Q4 is somewhat less than the differential pressure −Q3. Also, the differential pressure Q4 is less than the differential pressure Q2, and the differential pressure −Q4 is greater than the differential pressure −Q2, but depending on the rise (slope) of the assist torque, the differential pressure Q4 may be greater than the differential pressure Q2, and the differential pressure −Q4 may be less than the differential pressure −Q2.

2. Operation

Figure 21:
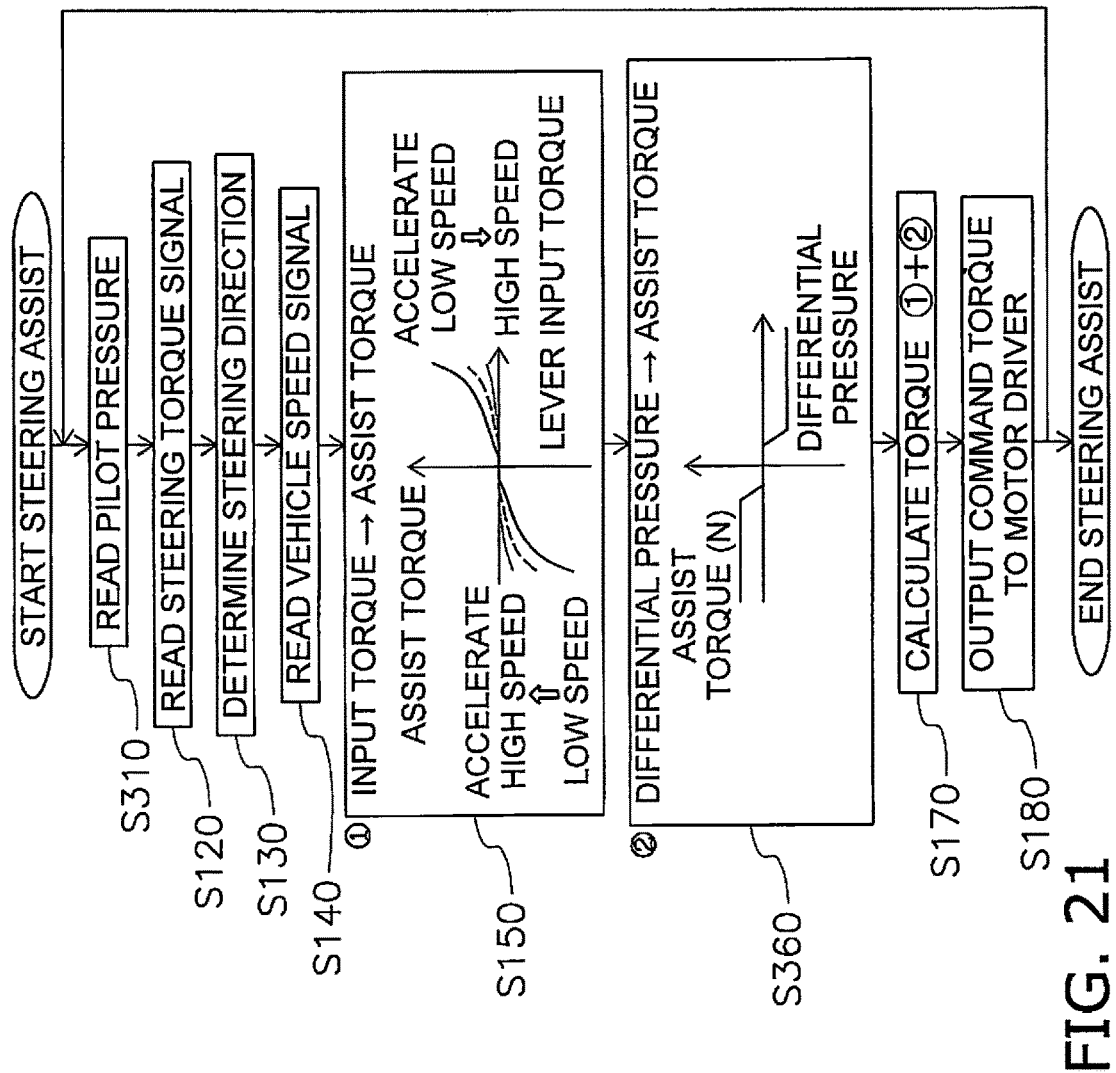
FIG. 21 is a flowchart of the wheel loader control method in Embodiment 3 of the present invention.

The operation of controlling the force imparting component 27 when the joystick lever 24 is operated will now be described. FIG. 21 is a flowchart of the operation of controlling the force imparting component.

When the joystick lever 24 is operated, in step S310 the controller 428 receives pilot pressure signals (S(Ppa) and S(Ppb) in FIG. 19) from the pilot pressure sensors 409*a* and 409*b*, and reads the values sensed by the pilot pressure sensors 409*a* and 409*b*.

Steps S120 to S150 are the same as those in Embodiment 2.

In step S360, the second assist torque determination component 402 calculates the differential pressure by subtracting the hydraulic pressure of the first pilot line 46 from the hydraulic pressure of the second pilot line 47, and calculates the second assist torque from the second assist torque information stored in the storage component 200 (see FIG. 20). The second assist torque determination component 402 then outputs the determined second assist torque as a second assist torque signal (S(T2) in FIG. 19).

Next, in step S170, the calculator 203 calculates the target assist torque by adding the first assist torque to the second assist torque, and in step S180 a command torque signal (S(T3) in FIG. 19) is outputted to the drive circuit 204.

As described above, in Embodiment 3, when the absolute value of the differential pressure obtained by subtracting the hydraulic pressure of the first pilot line 46 from the hydraulic pressure of the second pilot line 47 reaches Q1, the force imparting component 27 is controlled so that resistance to the operation of the joystick lever 24 is generated.

Embodiment 4

The wheel loader 1 in Embodiment 4 of the present invention will now be described.

In Embodiment 2, the timing at which resistance to the operation of the joystick lever 24 is generated is determined by sensing the position of the valve body 33 of the steering valve 32, but in Embodiment 4, the timing at which the resistance is generated is determined by sensing the load pressure of the pump of the hydraulic pressure source 31. In Embodiment 4 we will focus on the differences from the configuration of Embodiment 2. Those components that are the same as in Embodiment 2 will be numbered the same and will not be described again.

Configuration

Figure 22:
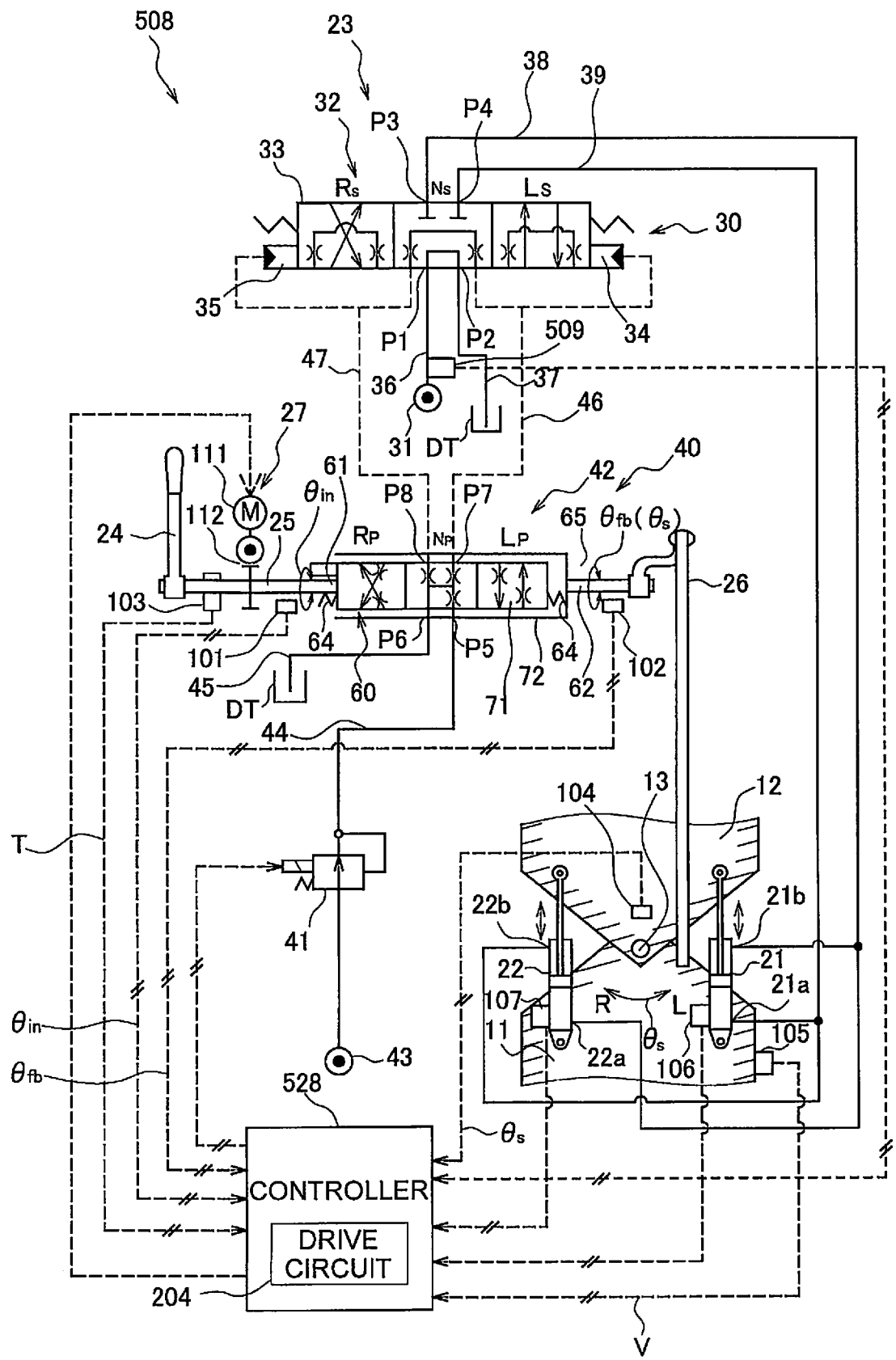
FIG. 22 is a hydraulic circuit diagram of the configuration of the steering operation device of the wheel loader in Embodiment 4 of the present invention.

FIG. 22 is a diagram of a steering operation device 508 of the wheel loader 1 in Embodiment 4. As shown in FIG. 22, the steering operation device 508 in Embodiment 4 differs from the steering operation device 308 in Embodiment 2 in that it does not have the valve body position sensor 309, and instead has a pump load pressure sensor 509. The pump load pressure sensor 509 is provided to the main hydraulic line 36 and senses the load pressure on the main hydraulic pressure source 31 by sensing the pressure of the main hydraulic line 36. A controller 528 receives the value sensed by the pump load pressure sensor 509.

Figure 23:
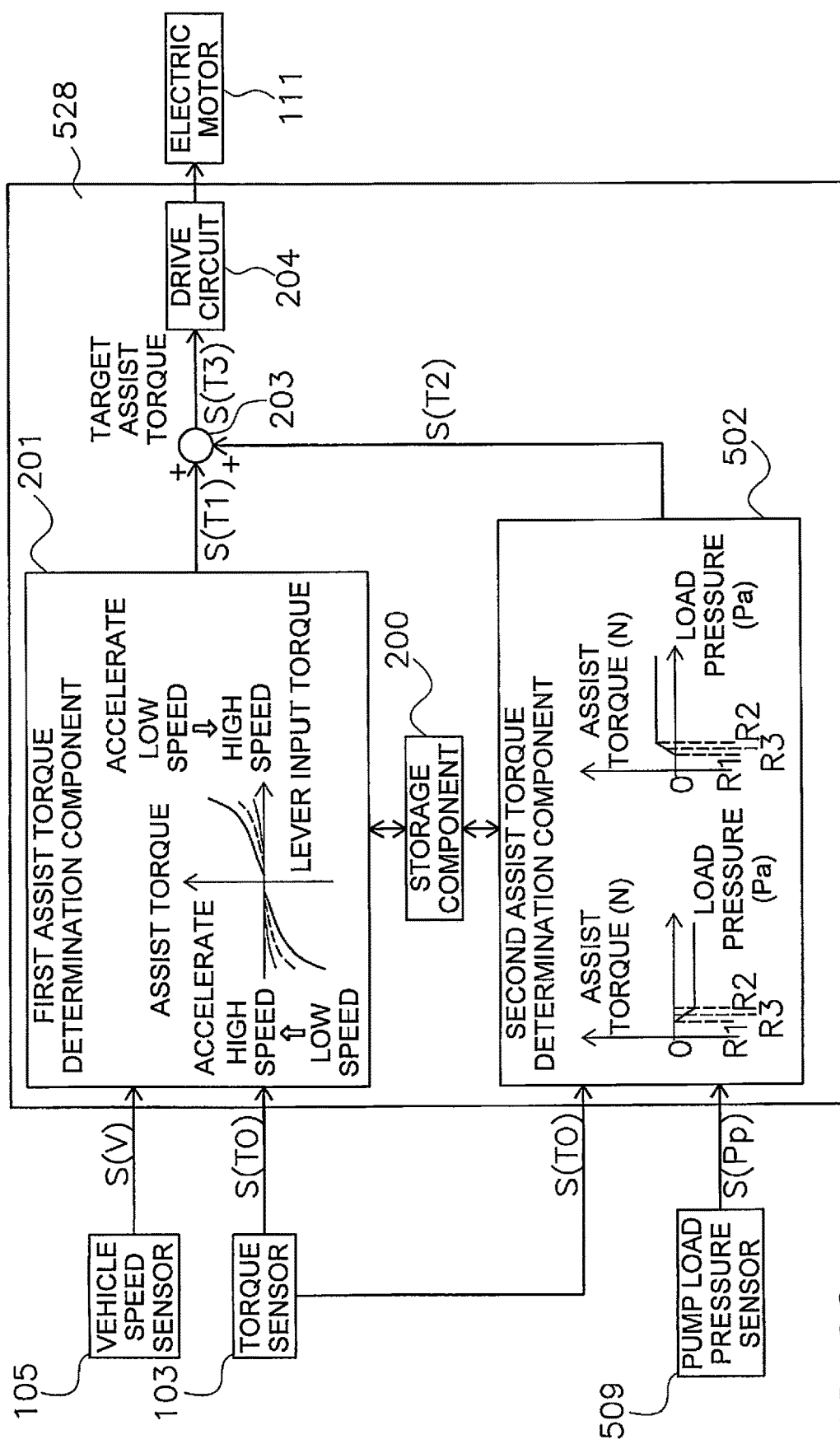
FIG. 23 is a block diagram of the configuration of the controller in FIG. 22.

FIG. 23 is a block diagram of the configuration of the controller 528 in Embodiment 4. Unlike the controller 328 in Embodiment 2, the controller 528 has a second assist torque determination component 502. The second assist torque determination component 502 receives a pump load pressure signal (S(Pp) in FIG. 23) related to the value sensed by the pump load pressure sensor 509. The second assist torque determination component 502 then determines the second assist torque from the sensed value on the basis of the second assist torque information stored in the storage component 200, and outputs the second assist torque thus determined as a second assist torque signal (S(T2) in FIG. 23).

Figure 24:
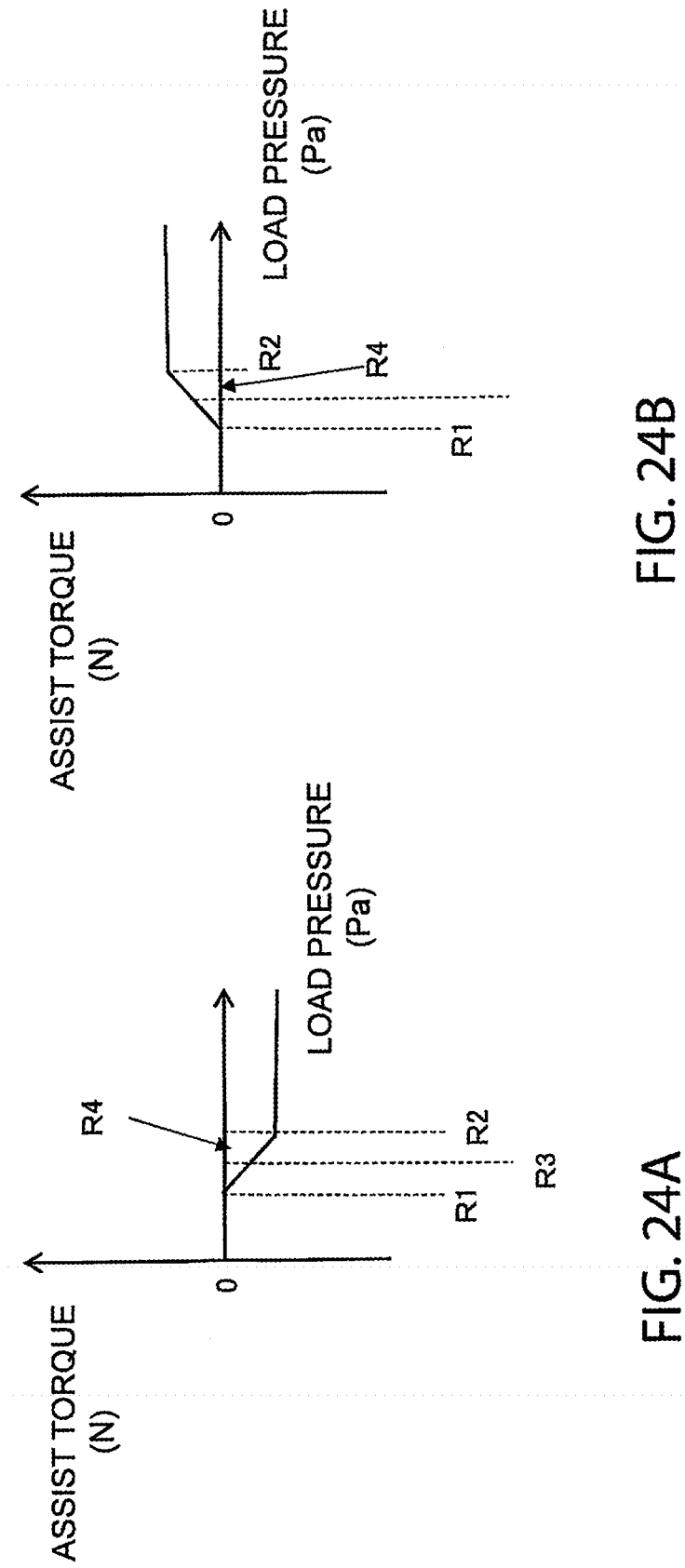
FIGS. 24a and 24b are graphs of second assist torque information stored in the storage component in FIG. 23 (the assist torque imparted versus the load pressure)

FIGS. 24*a* and 24*b* are graphs of the second assist torque information in Embodiment 4. FIG. 24*a* shows the second assist torque information that is used when the torque sensor 103 has sensed that the joystick lever 24 has moved to the right side. FIG. 24*b* shows the second assist torque information used when the torque sensor 103 senses that the joystick lever 24 is moved to the left. With the second assist torque information in FIGS. 24*a* and 24*b*, the load pressure in a state where the valve body 33 of the steering valve 32 is disposed in the neutral position Np is set to zero.

When the joystick lever 24 is rotated to the right, the second assist torque determination component 502 senses the operation direction of the joystick lever 24 on the basis of the value sensed by the torque sensor 103, and applies the second assist torque information shown in FIG. 24*a*. With the second assist torque information shown in FIG. 24*a*, when the pump load pressure produced by the main hydraulic pressure source 31 reaches R1, a force is applied to the input shaft 81*b* in the counterclockwise rotation direction. The force in the counterclockwise rotation direction then increases (resistance increases) at a constant slope until the pump load pressure reaches R2. Once the pump load pressure reaches R2, the force applied to the input shaft 81*b* in the counterclockwise rotation direction remains constant.

Also, when the joystick lever 24 is rotated to the left, the second assist torque determination component 502 senses the operation direction of the joystick lever 24 on the basis of the value sensed by the torque sensor 103, and applies the second assist torque information shown in FIG. 24*b*. With the second assist torque information shown in FIG. 24*b*, when the joystick lever 24 is rotated to the left and the load pressure reaches R1, a force is applied to the input shaft 81*b* in the clockwise rotation direction. The force in the clockwise direction then increases (resistance increases) at a constant slope until the load pressure reaches R2. Once the load pressure reaches −R2, the force in the clockwise direction applied to the input shaft 81*b* remains constant. These load pressures R1 and R2 are set on the basis of the timing at which the steering valve 32 opens or the timing at which the articulation starts. With the second assist torque information shown in FIGS. 24a and 24b, the load pressure when the steering valve 32 opens is indicated by R3. The load pressure R1 and the load pressure R2 are preset so as to include the load pressure R3 in between them.

The load pressure when the articulation starts is indicated by R4. As shown in FIG. 20, since the articulation is slightly later than the opening of the steering valve 32, the load pressure R4 is greater than the load pressure R3. Also, the load pressure R4 is less than the load pressure R2, but depending on the rise (slope) of the assist torque, the load pressure R4 may be greater than the load pressure R2, and the load pressure −R4 may be less than the load pressure −R2.

2. Operation

Figure 25:
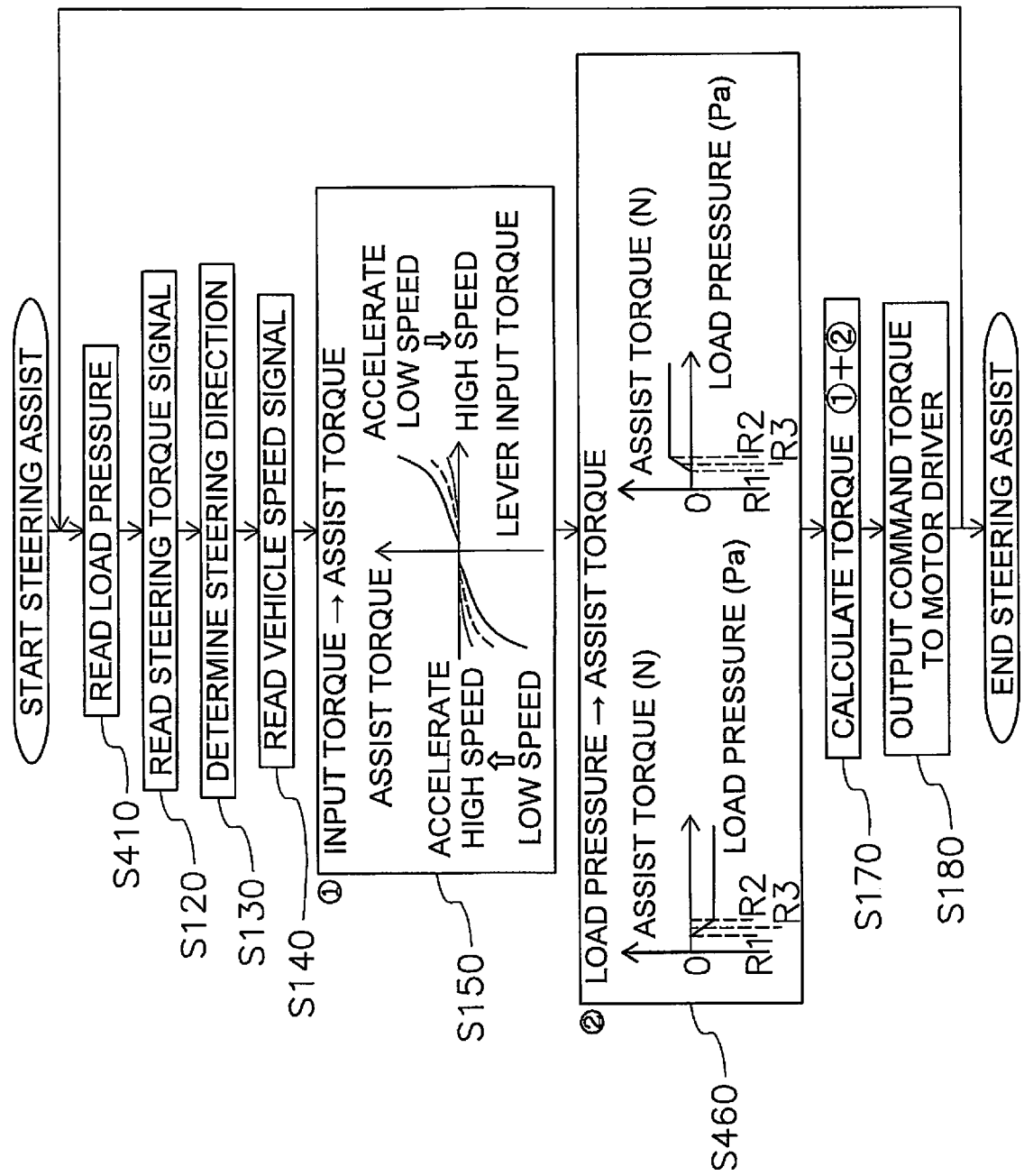
FIG. 25 is a flowchart of the wheel loader control method in Embodiment 4 of the present invention.

The operation of controlling the force imparting component 27 when the joystick lever 24 is operated will now be described. FIG. 25 is a flowchart of the operation of controlling the force imparting component.

When the joystick lever 24 is operated, in step S410 the controller 428 receives a pump load pressure signal (S(Pp) in FIG. 23) from the pump load pressure sensor 509, and reads the value sensed by the pump load pressure sensor 509.

Steps S120 to S150 are the same as in Embodiment 2.

Then, in step S460, the second assist torque determination component 402 senses the operation direction of the joystick lever 24 from the value sensed by the torque sensor 103, and applies one of the two kinds of second assist information stored in the storage component 200 (see FIGS. 24a and 24b). The second assist torque determination component 402 then calculates the second assist torque from the applied second assist torque information on the basis of the value sensed by the pump load pressure sensor 509. Next, the second assist torque determination component 402 outputs the second assist torque thus determined as a second assist torque signal (S(T2) in FIG. 23).

Next, in step S170, the calculator 203 calculates the target assist torque by adding the first assist torque to the second assist torque, and in step S180 outputs a command torque signal (S(T3) in FIG. 23) to the drive circuit 204.

As described above, in Embodiment 4, when the load pressure of the main hydraulic pressure source 31 reaches R1, this triggers the control of the force imparting component 27 so as to produce resistance to the operation of the joystick lever 24.

3. Features, etc.

(1) The wheel loader 1 (an example of a work vehicle) in Embodiments 1 to 4 is an articulated type in which the front frame 11 and the rear frame 12 are linked. The wheel loader 1 comprises the joystick lever 24, the steering cylinders 21 and 22 (an example of hydraulic actuators), the pilot valve 42 (an example of a control valve), the force imparting component 27, and the controller 28, 328, 428, or 528. The joystick lever 24 is operated by an operator and can set a rotation angle θin (an example of a target steering angle). The steering cylinders 21 and 22 are driven by hydraulic pressure and perform articulation for changing the steering angle θs (an example of the actual steering angle) of the front frame 11 with respect to the rear frame 12 in response to the operation of the joystick lever 24. The pilot valve 42 controls the flow of fluid supplied to the steering cylinders 21 and 22 so that the steering angle θs coincides with the rotation angle θin. The force imparting component 27 imparts an assisting force or a counterforce to the operation of the joystick lever 24. The controller 28, 328, 428, or 528 controls the force imparting component 27 so as to generate resistance to the operation of the joystick lever on the basis of the deviation angle ±θ7, the position ±P4, the differential pressure ±Q4, or the load pressure R4 (the start timing of the articulation).

Thus generating resistance against the operation of the joystick lever 24 on the basis of the start timing of the articulation allows the operator to feel by hand when the wheel loader 1 starts bending. Therefore, the vehicle body can be slightly bent, making it easy to perform fine operations.

In this embodiment, the resistance to the joystick lever 24 is generated at the point when the articulation begins, but it may be before or after this starting point. If before the starting point, immediately before the starting point is preferable, and if after the starting point, immediately after the starting point is preferable.

(2) With the wheel loader 1 (an example of a work vehicle) in Embodiments 1 to 4, the controller 28, 328, 428, or 528 controls the force imparting component 27 so as to generate resistance to the operation of the joystick lever 24 during the period between the differential pressure when the deviation angle is 0, the valve body 33 is in the neutral position Ns, and the pilot valve 42 is in the neutral position Np, or the load pressure when the valve element 33 is in the neutral position Ns (an example of the first position of the joystick lever in a state in which the deviation angle between the target steering angle and the actual steering angle is zero), and the deviation angle ±θ7, the position ±P4, the differential pressure ±Q4, or the load pressure R4 at which the articulation begins (an example of the second position of the joystick lever 24).

Thus generating resistance to the operation of the joystick lever 24 before or at the start of the articulation allows the operator to feel the start of the articulation in his hand.

Therefore, slightly moving the joystick lever 24 from the position where the resistance is felt makes it easy to bend the vehicle body slightly, and makes it easy to perform fine operations.

The concept of "from the first position to the second position" encompasses the second position.

(3) With the wheel loader 1 (an example of a work vehicle) in Embodiments 1 to 4, the controller 28, 328, 428, or 528 decreases the assisting force or increases the counterforce to generate resistance to the operation of the joystick lever 24.

Consequently, resistance can be generated while imparting an assisting force or counterforce to the operation of the joystick lever 24.

(4) The wheel loader 1 (an example of a work vehicle) in Embodiments 1 to 4 further comprises the steering valve 32 that adjusts the flow of fluid supplied to the steering cylinders 21 and 22 (an example of hydraulic actuators) on the basis of the pilot pressure inputted from the pilot valve 42 (an example of a control valve). The pilot valve 42 controls the flow of fluid supplied from the steering valve 32 to the steering cylinders 21 and 22 by adjusting the pilot pressure. The controller 28, 328, 428, or 528 controls the force imparting component 27 so that the deviation angle ±θ7, the position ±P4, the differential pressure ±Q4, or the load pressure R4 (an example of the opening timing of the steering valve 32) will be located within the period in which the resistance is increasing.

Consequently, the operator can feel from the resistance generated in the joystick lever 24 the point when the steering valve 32 that drives the steering cylinders 21 and 22 opens, making it easy to perform fine operations.

(5) With the wheel loader 1 (an example of a work vehicle) in Embodiments 1 to 4, the pilot valve 42 (an example of a control valve) has the operation input shaft 61 (an example of a first input member), the feedback input shaft 62 (an example of a second input member), the first spring 64 (an example of a biasing component), and the second spring 65 (an example of a biasing component). The operation input shaft 61 is displaced according to the rotation angle θin (an example of the target steering angle). The feedback input shaft 62 is displaced according to the steering angle θs (an example of the actual steering angle). The first spring 64 and the second spring 65 bias the operation input shaft 61 so that the rotation angle θin of the operation input shaft 61 (an example of a displacement amount) matches the rotation angle θfb (=θss) of the feedback input shaft 62 (an example of a displacement amount). The difference between the rotation angle θin of the operation input shaft 61 and the rotation angle θfb (=θs) of the feedback input shaft 62 corresponds to the deviation angle α. The joystick lever 24 is operated against the biasing force of the first spring 64 and the second spring 65.

Consequently, after the joystick lever 24 is operated, the steering angle θs changes following the joystick lever 24, and when the rotation angle θin of the joystick lever 24 matches up with the steering angle θs, the pilot valve 42 is in the neutral position Np.

Also, the pilot valve 42 is provided with the first spring 64 and the second spring 65, and the operator operates the joystick lever 24 with an operation force that goes against the biasing force of the first spring 64 and the second spring 65. The operating force required to operate the joystick lever 24 can be raised by decreasing the assisting force or increasing the counterforce before operation against this resistance is restricted.

(6) The wheel loader 1 in Embodiments 1 to 4 (an example of a work vehicle) further comprises the first rotation angle sensor 101 and the second rotation angle sensor 102, the valve body position sensor 309, the pilot pressure sensor 409a and the pilot pressure sensor 409b, or the pump load pressure sensor 509 (an example of a timing sensor), which sense the point at which a preset rise in resistance begins on the basis of the deviation angle ±θ7, the position ±P4, the differential pressure ±Q4, or the load pressure R4 (an example of the start timing of articulation). When this timing is sensed by the valve body position sensor 309, the pilot pressure sensor 409a and the pilot pressure sensor 409b, or the pump load pressure sensor 509, the controller 28, 328, 428, or 528 controls the force imparting component 27 so as to start generating resistance to the operation of the joystick lever 24.

This allows the operator to feel by hand the start of the articulation.

(7) The wheel loader 1 (an example of a work vehicle) in Embodiment 1 has the first rotation angle sensor 101 (an example of a target steering angle sensor) that senses the rotation angle θin (an example of the target steering angle), and the second rotation angle sensor 102 (an example of an actual steering angle sensor) that senses the steering angle θs (an example of the actual steering angle). The controller 28 controls the force imparting component 27 so as to start generating resistance to the operation of the joystick lever 24 at the point when the deviation angle α (an example of a deviation angle) calculated from the value sensed by the first rotation angle sensor 101 and the value sensed by the second rotation angle sensor 102 reaches the deviation angle ±θ6 (an example of a specific value) set in advance on the basis of the deviation angle ±θ7 (an example of the start timing of the articulation).

Here, setting the deviation angle ±θ6 to a value from before the start of the articulation allows resistance to the operation of the joystick lever 24 to be generated ahead of the articulation start position on the basis of the deviation angle α. Accordingly, the operator can feel the start of the articulation, making it easy to perform fine operations.

(8) The wheel loader 1 (an example of a work vehicle) in Embodiments 1 to 4 further comprises the steering valve 32 that adjusts the flow of fluid supplied to the steering cylinders 21 and 22 (an example of hydraulic actuators) on the basis of the pilot pressure inputted from the pilot valve 42 (an example of a control valve). The pilot valve 42 controls the flow of fluid supplied from the steering valve 32 to the steering cylinders 21 and 22 by adjusting the pilot pressure.

Thus, articulation can be started by operating the joystick lever 24 and thereby moving the pilot valve 42 and adjusting the pilot pressure.

(9) With the wheel loader 1 (an example of a work vehicle) in Embodiment 2, the valve body position sensor 309 (an example of a timing sensor) senses the position of the valve body 33 of the steering valve 32. The controller 328 controls the force imparting component 27 so as to start generating resistance to the operation of the joystick lever 24 at the point when the position of the valve body 33 sensed by the valve body position sensor 309 reaches the position ±P3 (an example of a specific value) preset on the basis of the position ±P4 (an example of the start timing of the articulation).

Here, resistance to the operation of the lever 24 can be generated ahead of the articulation start position on the basis of the position of the valve body 33 of the steering valve 32 by setting the position ±P3 (an example of a specific value) to a value from before the start of the articulation. Accordingly, the operator can feel the start of the articulation, making it easy to perform fine operations.

(10) With the wheel loader 1 (an example of a work vehicle) in Embodiment 3, the pilot pressure sensors 409a and 409b (an example of timing sensors) sense the pilot pressure. The controller 428 controls the force imparting component 27 so as to start generating resistance to the operation of the joystick lever 24 at the point when the pilot pressures sensed by the pilot pressure sensors 409a and 409b reach ±Q3 (an example of a specific value) preset on the basis of ±Q4 (an example of the start timing of the articulation).

Here, resistance to the operation of the joystick lever 24 can be generated ahead of the articulation start position on the basis of the pilot pressure by setting ±Q3 (an example of a specific value) to a value from before the start of the articulation. Accordingly, the operator can feel the start of the articulation, making it easy to perform fine operations.

(11) The wheel loader 1 (an example of a work vehicle) in Embodiment 4 further comprises the main hydraulic pressure source 31 (an example of a pump) that supplies fluid to the steering cylinders 21 and 22 (an example of hydraulic actuators) via the steering valve 32. The pump load pressure sensor 509 (an example of a timing sensor) senses the load pressure of the main hydraulic pressure source 31. The controller 528 controls the force imparting component 27 so as to start generating resistance to the operation of the joystick lever 24 at the point when the load pressure of the pump sensed by the pump load pressure sensor 509 reaches the load pressure R3 (an example of a specific value) preset on the basis of the load pressure R4 (an example of the start timing of the articulation).

Here, setting the load pressure R3 (an example of a specific value) to a value from before the start of the articulation makes it possible to generate resistance to the operation of the joystick lever 24 ahead of the articulation start position on the basis of the load pressure of the main hydraulic pressure source 31. Accordingly, the operator can feel the start of the articulation, making it easy to perform fine operations.

(12) The wheel loader 1 (an example of a work vehicle) in Embodiments 1 to 4 further comprises the torque sensor 103 (an example of a torque sensor) that senses the torque generated by operation of the joystick lever 24. The force imparting component 27 has the electric motor 111 as a drive source. The controller 28, 328, 428, or 528 controls the force imparting component 27 on the basis of the value sensed by the torque sensor 103.

Consequently, a force can be imparted according to the torque applied by the operator to the joystick lever 24. For example, the amount of force imparted can be controlled so that when the torque applied to the joystick lever 24 by the operator is high, the assisting force imparted by the force imparting portion 27 is increased, and when the torque is low, the assisting force can be reduced.

(13) The wheel loader 1 (an example of a work vehicle) in Embodiment 1 further comprises the torque sensor 103 (an example of a torque sensor) that senses the torque generated by operation of the joystick lever 24. The force imparting component 27 has the electric motor 111 as a drive source. The controller 28 has the calculator 203 and the drive circuit 204 (an example of an operation controller). The calculator 203 calculates the force to be imparted to the operation of the joystick lever 24 by combining the imparted force preset for the sensed torque with the imparted force preset for the deviation angle α (an example of a deviation angle). The drive circuit 204 operates the force imparting component 27 so as to impart the calculated force.

Consequently, resistance to the operation of the joystick lever 24 can be generated before the articulation starts, while the force imparting component 27 imparts an assisting force or a counterforce to the operation of the joystick lever 24.

(14) The wheel loader 1 (an example of a work vehicle) in Embodiment 2 further comprises the torque sensor 103 (an example of a torque sensor) that senses the torque generated by operation of the joystick lever 24. The force imparting component 27 has the electric motor 111 as a drive source. The controller 328 has the calculator 203 and the drive circuit 204 (an example of an operation controller). The calculator 203 calculates the force to be imparted to the operation of the joystick lever 24 by combining the imparted force preset for the sensed torque with the imparted force preset for the position of the valve body 33. The drive circuit 204 operates the force imparting component 27 so as to impart the calculated force.

Consequently, resistance to the operation of the joystick lever 24 can be generated before the articulation starts, while the force imparting component 27 imparts an assisting force or a counterforce to the operation of the joystick lever 24.

(15) The wheel loader 1 (an example of a work vehicle) in Embodiment 3 further comprises the torque sensor 103 (an example of a torque sensor) that senses torque generated by operation of the joystick lever 24. The force imparting component 27 has the electric motor 111 as a drive source. The controller 428 has the calculator 203 and the drive circuit 204 (an example of an operation controller). The calculator 203 calculates the force to be imparted to the operation of the joystick lever 24 by combining the imparted force preset for the sensed torque with the imparted force preset for the position of the pilot pressure. The drive circuit 204 operates the force imparting component 27 so as to impart the calculated force.

Consequently, resistance to the operation of the joystick lever 24 can be generated before the articulation starts, while the force imparting component 27 imparts an assisting force or a counterforce to the operation of the joystick lever 24.

(16) The wheel loader 1 (an example of a work vehicle) in Embodiment 4 further comprises the torque sensor 103 (an example of a torque sensor) that senses torque generated by operation of the joystick lever 24. The force imparting component 27 has the electric motor 111 as a drive source. The controller 528 has the calculator 203 and the drive circuit 204 (an example of an operation controller). The calculator 203 calculates the force to be imparted to the operation of the joystick lever 24 by combining the imparted force preset for the sensed torque with the imparted force preset for the load pressure of the main hydraulic pressure source 31 (an example of a pump). The drive circuit 204 operates the force imparting component 27 so as to impart the calculated force.

Consequently, resistance to the operation of the joystick lever 24 can be generated before the articulation starts, while the force imparting component 27 imparts an assisting force or a counterforce to the operation of the joystick lever 24.

(17) The wheel loader 1 (an example of a work vehicle) in Embodiments 1 to 4 further comprises the vehicle speed sensor 105 (an example of a speed sensor) that senses the speed of the work vehicle. The imparted force preset for the torque is varied on the basis of the speed sensed by the vehicle speed sensor 105.

Consequently, the force imparted to the operation of the joystick lever 24 by the force imparting component 27 according to the torque can also be varied depending on the speed of the vehicle, and furthermore, resistance to the operation of the joystick lever 24 can be generated before the articulation starts.

(18) With the wheel loader 1 (an example of a work vehicle) in Embodiments 1 to 4, the pilot valve 42 (an example of a control valve) is linked to the joystick lever 24.

Consequently, the operation of the joystick lever 24 is transmitted to the pilot valve 42.

(19) The method for controlling the wheel loader 1 in Embodiments 1 to 4 is a method for controlling an articulated wheel loader 1 (an example of a work vehicle) in which the front frame 11 and the rear frame 12 are linked, and comprises steps S110, S210, S310, and S410 (an example of a first acquisition step), steps S150, S160, S260, S360, S460, and S170 (an example of a generation step), and step S180 (an example of a transmission step). Steps S160, S260, S360, and S460 (an example of a generation step) involve acquiring the first rotation angle signal S(θin) and the second rotation angle signal S(θs), the valve body position signal S(Vp), the pilot pressure signals S(Pa) and S(Pb), or the pump load pressure signal S(Pp) (an example of a first signal) from the first rotation angle sensor 101 and the second rotation angle sensor 102 that sense the start timing of articulation, the valve body position sensor 309 that sense the start timing of articulation, the pilot pressure sensor 409a and the pilot pressure sensor 409b that sense the start timing of articulation, or the pump load pressure sensor 509 that sense the start timing of articulation. Steps S160, S260, S360 and S460 (an example of a generation step) involve generating the target assist torque signal S(T3) (an example of a second signal) for generating resistance to the operation of the joystick lever 24 on the basis of the first rotation angle signal S(θin) and the second rotation angle signal S(θs), the valve body position signal S(Vp), the pilot pressure signals S(Pa) and S(Pb), or the pump load pressure signal (Pp) (an example of a first signal). Step S180 (an example of a transmission step) involves transmitting the target assist torque signal S(T3) (an example of a second signal) to the force imparting component 27 that imparts an assisting force or a counterforce to the operation of the joystick lever 24.

Thus generating resistance to the operation of the joystick lever 24 on the basis of the start timing of the articulation allows the operator to feel by hand when the wheel loader 1 starts bending. Therefore, the vehicle body can be slightly bent, making fine operations easier to perform.

In this embodiment, the resistance to the joystick lever 24 is generated at the point when the articulation begins, but it may be before or after this starting point. If before the starting point, immediately before the starting point is preferable, and if after the starting point, immediately after the starting point is preferable.

(20) The method for controlling the wheel loader 1 in Embodiments 1 to 4 further comprises the step S120 (an example of a second acquisition step). Step S120 (an example of a second acquisition step) involves acquiring a steering torque signal S(T0) (an example of a third signal) from the torque sensor 103 (an example of a torque sensor) that senses the torque generated by operation of the joystick lever 24.

Steps S150, S160, S260, S360, S460, and S170 (an example of a generation step) have steps S160, S260, S360, and S460 (an example of a first determination operation), step S150 (an example of a second determination operation), and step S170 (an example of a calculation operation). Steps S160, S260, S360 and S460 (an example of the first determining operation) involve deciding on the counterforce to be imparted to the operation of the joystick lever 24 on the basis of the first rotation angle signal S(θin) and the second rotation angle signal S(θs), the valve body position signal S(Vp), the pilot pressure signals S(Pa) and S(Pb), or the pump load pressure signal S(Pp) (an example of a first signal), and outputting a second assist torque signal S(T2) (an example of a fourth signal). Step S150 (an example of a second determination operation) involves deciding on the assisting force or counterforce to be imparted to the operation of the joystick lever 24 on the basis of the steering torque signal S(T0) (an example of a third signal), and outputting a first assist torque signal S(T1) (an example of a fifth signal). Step S170 (an example of a calculation operation) involves generating a target assist torque signal S(T3) (an example of a second signal) by adding the assisting force or counterforce indicated by the second assist torque signal S(T2).

Consequently, resistance to the operation of the joystick lever 24 can be generated on the basis of the start timing of the articulation, while the force imparting component 27 imparts an assisting force or a counterforce to the operation of the joystick lever 24.

Other Embodiments

Embodiments of the present disclosure have been described above, but the present disclosure is not limited to or by the above embodiments, and various modifications are possible without departing from the gist of the present disclosure.

Figure 26:
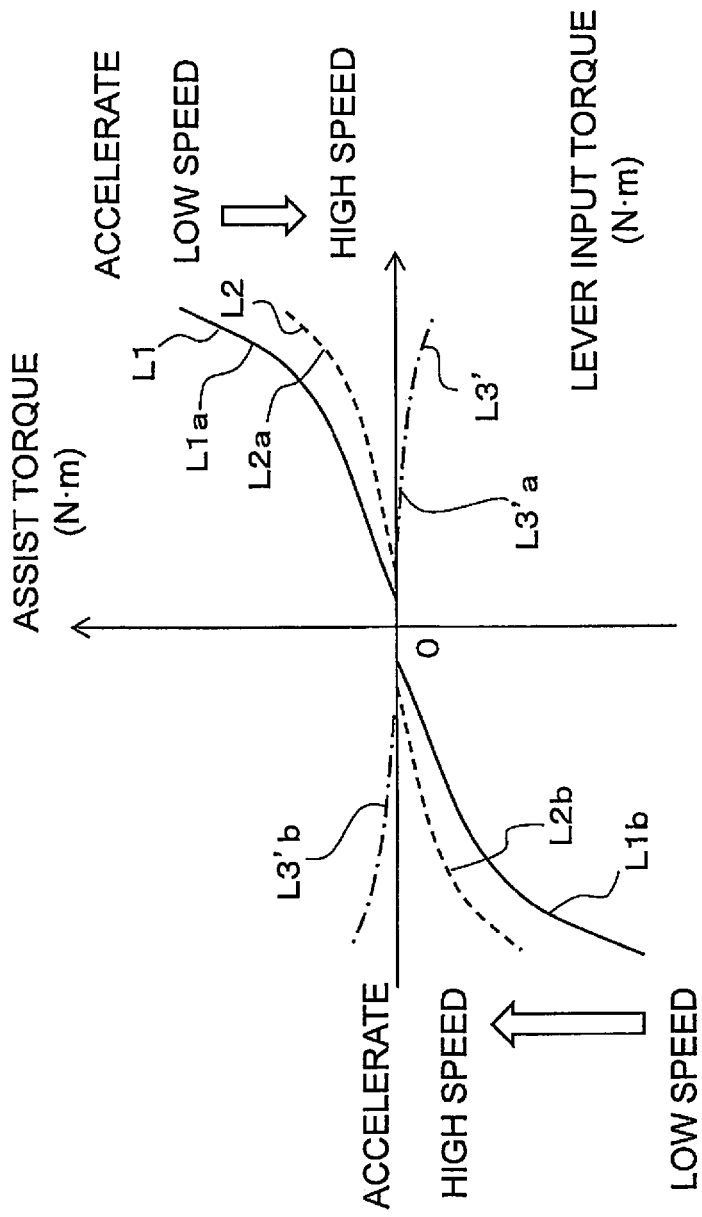
FIG. 26 is a graph of first assist torque information provided for each speed in a modification example of an embodiment of the present invention.

(A) In Embodiments 1 to 4, the force imparting component 27 is controlled so as to assist the operation of the joystick lever 24 in the first assist torque information, but this is not the only option. For example, as shown by the one-dot chain line L3' in FIG. 26, a counterforce may be imparted to the operation of the joystick lever 24 when the speed is high. The one-dot chain line L3' in FIG. 26 shows the assist torque information at high speed. As indicated by the portion L3'a when the deviation angle of L3' is on the positive side, the assist torque information is set so that the force imparting portion 27 imparts a force to the counterclockwise rotation side to the clockwise rotation of the joystick lever 24. As indicated by the portion L3'b when the deviation angle of L3' is on the negative side, the assist torque information is set so that the force imparting portion 27 imparts a force to the clockwise rotation side.

Figure 27:
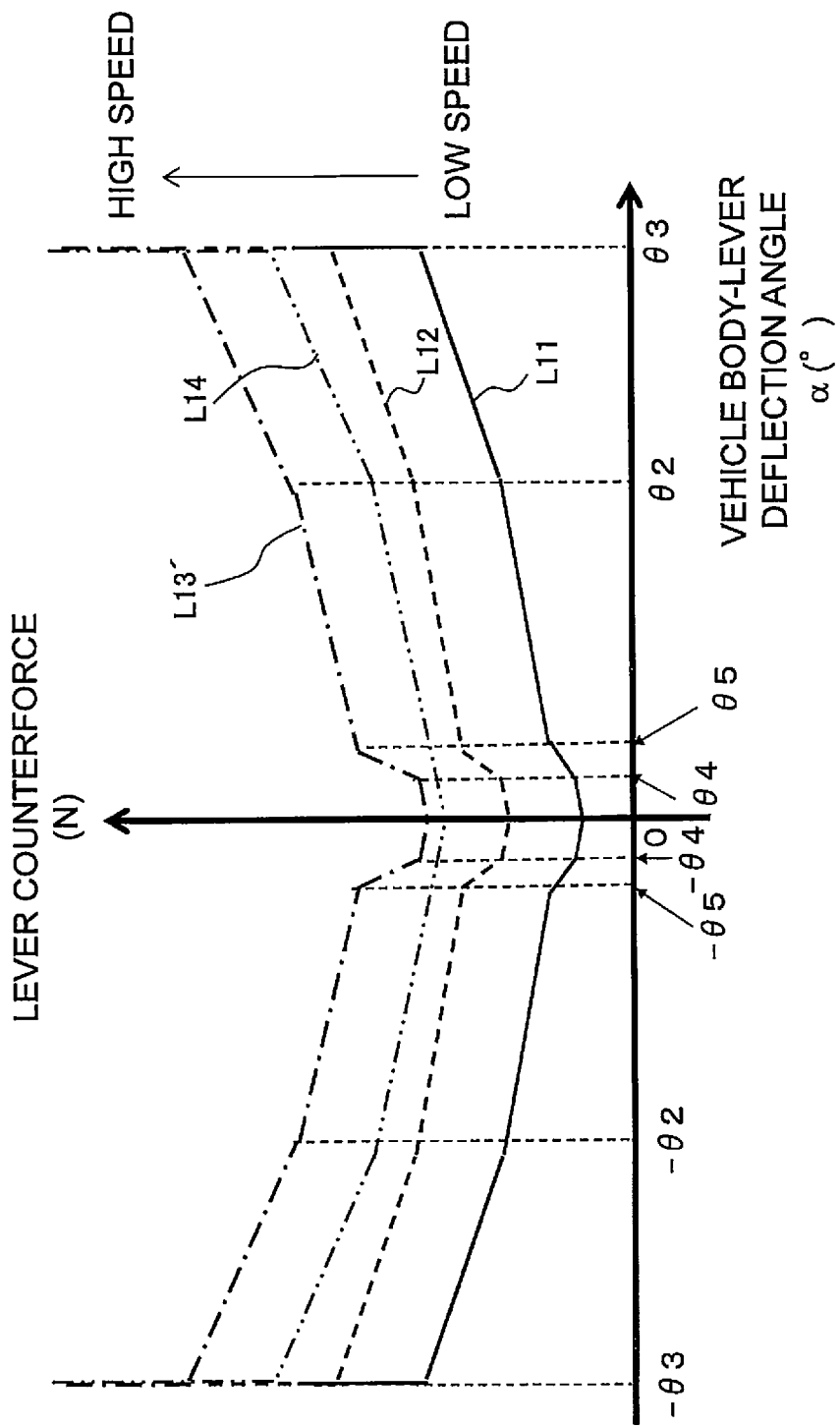

FIG. 27 is a graph of the state when the target assist torque, which is obtained by combining the first assist torque information shown in FIG. 26 and the second assist torque information shown in FIG. 11A in Embodiment 1, is imparted to the operation of the joystick lever 24. The lever operating force at high speed shown in FIG. 27 is set so that the operating force of the joystick lever 24 will be heavier over the entire region than when no assist torque is imparted (two-dot chain line L14). At the deviation angle 94, the counterforce is further increased to produce resistance in the joystick lever 24, allowing the operator to feel the start of articulation.

Figure 28:
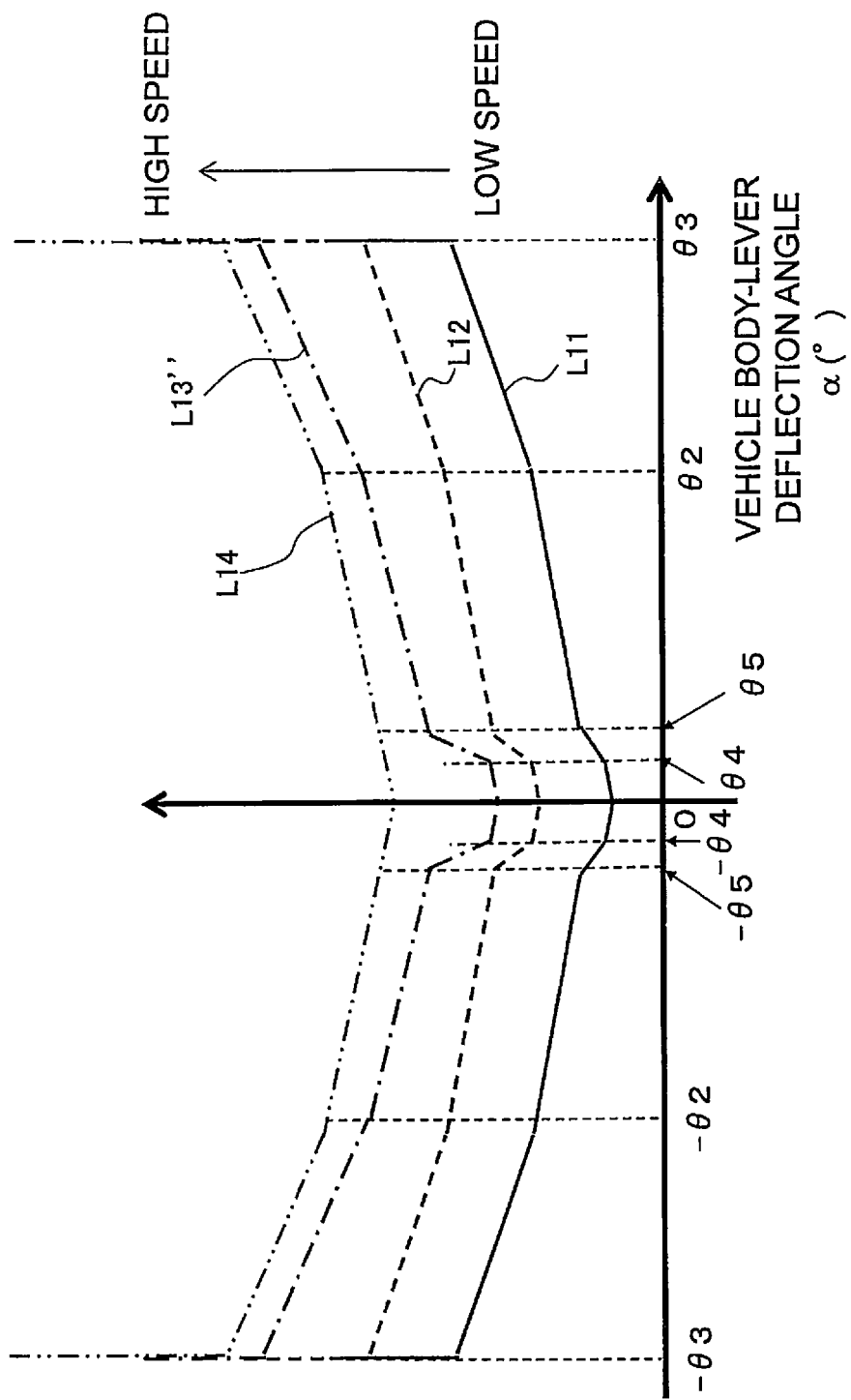
FIG. 28 is a graph of the combined assist torque in a modification example of an embodiment of the present invention.

In the first assist torque information in FIG. 10a, when the assisting force imparted to the operation of the joystick lever 24 is increased at a high vehicle speed, as shown in FIG. 28, the high-speed curve L13" of the total target assist torque may be set so that the lever counterforce is lower than in the curve when no assist torque is imparted over the entire region (two-dot chain line L14).

In the case of this curve L13", when the deviation angle θ4 is reached, resistance is generated in the joystick lever 24 by decreasing the assisting force, allowing the operator to feel the start of the articulation.

(B) In the above embodiments, the controller 28 stores the first assist torque information for three speeds (0 km/h, 25 km/h, and 40 km/h), but the speeds are not limited to these. Also, the first assist torque information is not limited to three kinds, and two kinds or four or more kinds may be provided. In addition, when the assist torque is smoothly varied according to the vehicle speed, it is preferable to provide three or more kinds of information.

(C) In the above embodiments, the controller 28 stores three kinds of first assist torque information, and the assist torque is continuously varied by interpolation according to the vehicle speed, but the assist torque may be varied in steps.

For example, let us assume that the first assist torque information at low speed is indicated by a solid line L1 in FIG. 10a, the first assist torque information at medium speed is indicated by a dotted line L2 in FIG. 10a, the first assist torque information at high speed is indicated by a one-dot chain line L3 in FIG. 10a. The low speed here is set, for example, to a speed of less than 15 km/hour, the medium speed is set to a speed of 15 km/hour or more and less than 25 km/hour, and the high speed is set to a speed 25 km/hour or more and 40 km/hour or less. Also, 15 km/hour can be set as a first threshold value and 25 km/hour can be set as a second threshold value, for example.

In such a case, when the joystick lever 24 is operated, the controller 28 compares the speed sensed by the vehicle speed sensor 105 with a first threshold value and a second threshold value, and determines whether or not the vehicle speed is a low, medium, or high speed. It then uses the first assist torque information for the determined speed to determine the first assist torque from the steering torque signal. The speed need not be divided up into three levels, and may instead be divided up into just two levels, or into three or more levels.

(D) With the wheel loader 1 in the above embodiments, the first assist torque information is provided for each speed, but it need not be provided for each speed. That is, the first assist torque may be determined on the basis of just the value sensed by the torque sensor 103.

In the above embodiments, the operation direction of the joystick lever 24 is sensed by the torque sensor 103 in determining the first assist torque, but the operation direction may instead be sensed by using the vehicle body-lever deviation angle α sensed in step S110.

Also, the vehicle body-lever deviation angle α may be calculated from the steering angle θs sensed by the steering angle sensor 104 and the rotation angle θin sensed by the first rotation angle sensor 101, rather than using the value sensed by the second rotation angle sensor 102.

Furthermore, the vehicle body-lever deviation angle α may be calculated from the steering angle θs calculated from the values sensed by the cylinder stroke sensors 106 and 107 and the rotation angle θin sensed by the first rotation angle sensor 101.

(E) In the above embodiments, the second assist torque information (FIG. 11a) and the first assist torque information (FIG. 10a) are combined to obtain the target assist torque for driving the electric motor 111, but instead of using the first assist torque information, just the second assist torque information may be used to impart assist torque. In this case, taking Embodiment 1 as an example, as shown in FIG. 11b, until the deviation angle α reaches angle ±θ4, the force imparting component 27 does not impart force to the operation of the joystick lever 24, a counterforce is imparted while the absolute value of the deviation angle α is between θ4 and θ5, and a constant counterforce is imparted when the absolute value of the deviation angle α is greater than θ5.

(F) Also, in the above embodiments, in the second assist torque information, when the joystick lever 24 is operated to the right side or the left side, the counterforce increases linearly while the absolute value of the deviation angle is between θ4 and θ5, while the absolute value of the position of the valve body 33 is between P1 and P2, while the absolute value of the differential pressure is between Q1 and Q2, and while the load pressure is between R1 and R2, but it may instead increase exponentially.

In order to prevent vibration caused by hunting, it is preferable for the increase in resistance to have some width, rather than rising straight up.

Figure 29:
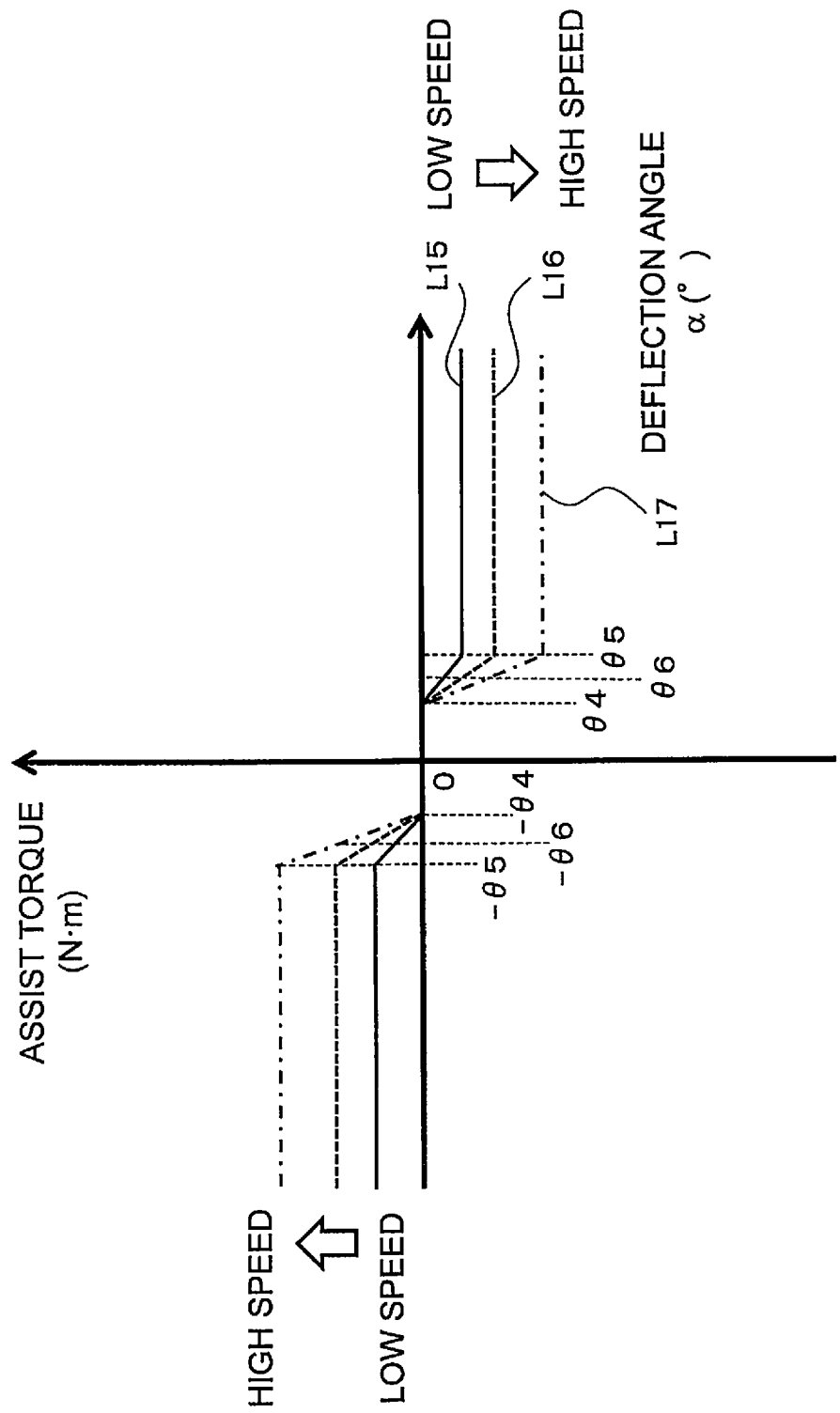
FIG. 29 is a graph of second assist torque information in a modification example of an embodiment of the present invention.

(G) In the above embodiments, the second assist torque is the same even at different vehicle speeds, but the second assist torque may be varied on the basis of the vehicle speed. To describe this using Embodiment 1 as an example, assist torque information may be provided for when the speed is low (solid line L15), medium (dotted line L16), and high (one-dot chain line L17) as shown in FIG. 29. In FIG. 29, the resistance is set to increase as the vehicle speed increase.

In this case, the second assist torque determination component 202 determines the second assist torque on the basis of the deviation angle α and the value from the vehicle speed sensor 105. Also, the second assist torque determination component 202 determines the second assist torque from the assist torque information for the three stored vehicle speeds, but when the value sensed by the vehicle speed sensor 105 is between these three speeds, the assist torque for that vehicle speed is calculated by interpolation.

(H) In Embodiment 3 above, the second assist torque is determined on the basis of the difference between the hydraulic pressure of the first pilot line 46 and the hydraulic pressure of the second pilot line 47 in the second assist torque information, but the second assist torque may be determined on the basis of the hydraulic pressure of each line. For example, the second assist torque may be determined on the basis of the change from the pressure of the second pilot line 47 when the pilot valve 42 is in the neutral position Np and the change from the pressure of the first pilot line 46 when the pilot valve 42 is in the neutral position Np. The force imparting component 27 imparts a force to the left rotation side when the change in the second pilot line 47 reaches a specific amount or more, and the force imparting component 27 imparts a force to the right rotation side when the change in the first pilot line 46 reaches a specific amount.

(I) In the above embodiments, the joystick lever 24 and the pilot valve 42 are mechanically linked by the connecting portion 25, but this is not the only option. The joystick lever 24 and the pilot valve may not be mechanically linked, and the operation of the joystick lever 24 may be electrically transmitted to the pilot valve to operate the pilot valve.

Figure 30:
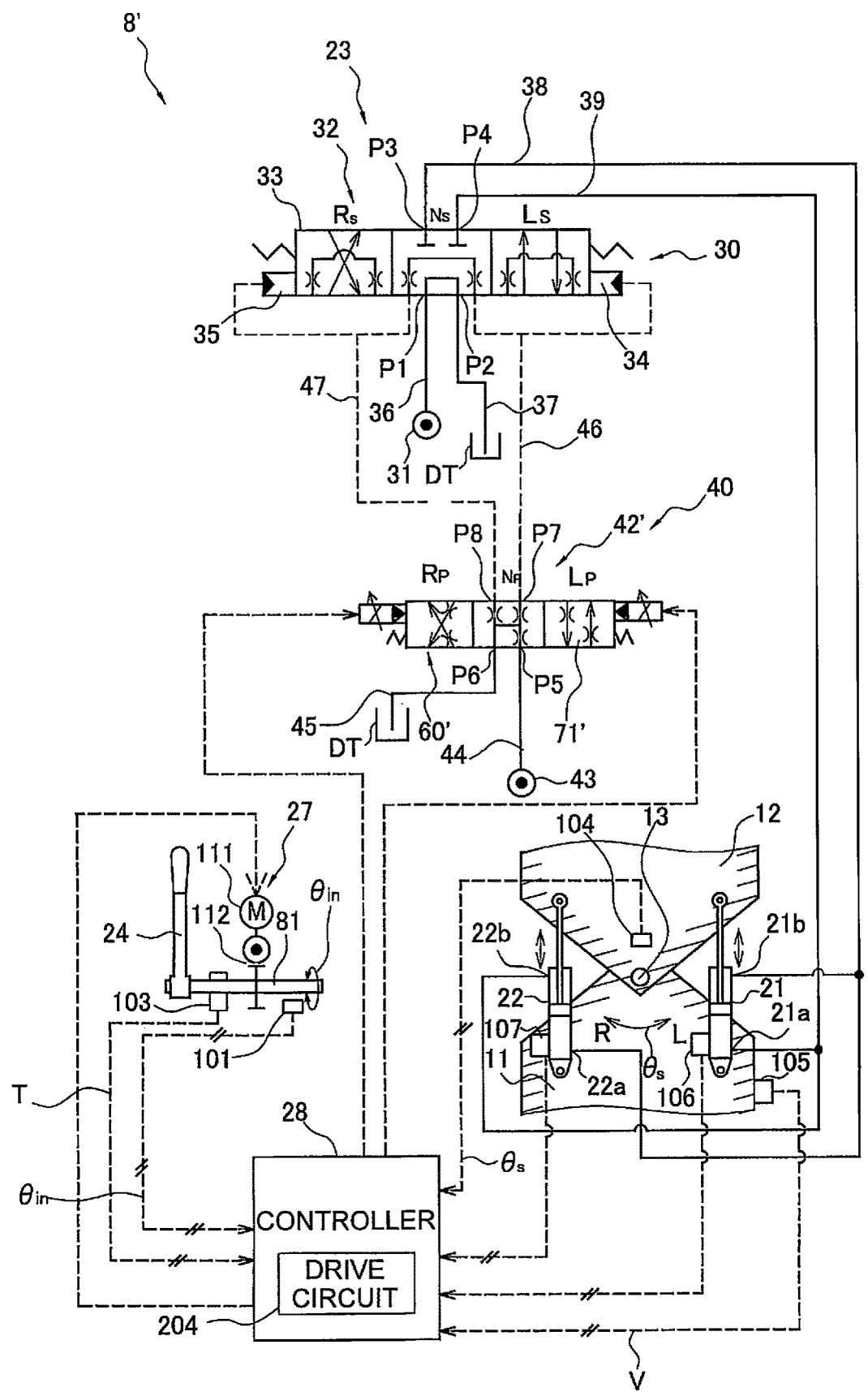
FIG. 30 is a configuration diagram of a steering operation device in a modification example of an embodiment of the present invention.

FIG. 30 is a diagram of a steering operation device 8' serving as an example of a configuration for electrically transmitting the operation of the joystick lever 24 to a pilot valve 42'. The steering operation device 8' shown in FIG. 30 is a modification example of Embodiment 1 above.

The pilot valve 42' shown in FIG. 30 is of a spool type instead of a rotary type as in the above embodiments. The pilot valve 42' has a valve body component 60' including a spool 71' and a sleeve (not shown), and the spool 71' is able to move to the neutral position Np, the left pilot position Lp, and the right pilot position Rp according to a signal from the controller 28, using the sleeve as a reference.

With the configuration shown in FIG. 30, the universal joint 83 as shown in FIG. 5 is not provided, for example. The joystick lever 24 is connected to the steering operation shaft 81. The steering operation shaft 81 is not linked to the pilot valve. Just as in the above embodiments, the force imparting component 27 imparts an assisting force or a counterforce to the steering operation shaft 81. Also, the first rotation angle sensor 101 senses the rotation angle θin of the steering operation shaft 81 and transmits it to the controller 28.

Also, with the steering operation device 8', the link mechanism 26 for linking the pilot valve and the front frame 11 as shown in FIG. 5 is not provided. The steering angle θs of the front frame 11 relative to the rear frame 12 is sensed by the steering angle sensor 104 and transmitted to the controller 28.

The controller 28 transmits a command to the pilot valve 42' to control the movement of the spool 71' of the pilot valve 42' on the basis of the received information about the rotation angle θin and the steering angle θs. The movement of the spool 71' changes the pilot pressure supplied from the pilot valve 42' to the steering valve 32, and also changes the amount of fluid supplied from the steering valve 32 to the steering cylinders 21 and 22. Consequently, a steering operation is performed. At this point, the controller 28 may control the pilot pressure so that there is little difference between θin and θs, and thereby causing the steering angle θs to match the rotation angle θin.

Figure 31:
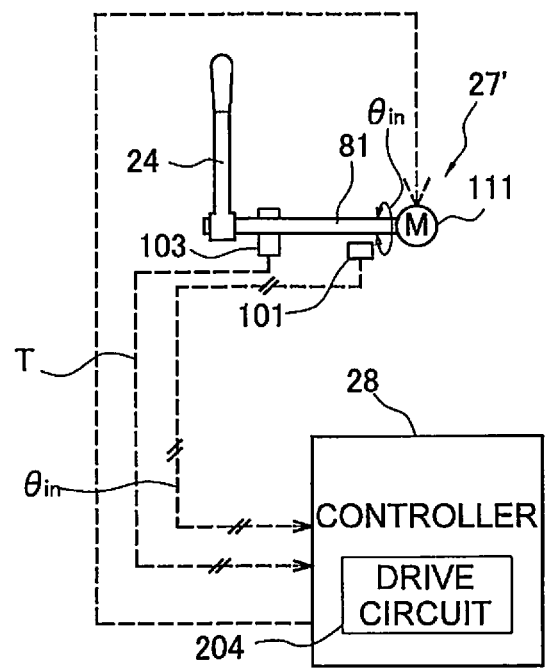
FIG. 31 is a configuration diagram of a force imparting component in a modification example of an embodiment of the present invention.

With the steering operation device 8', the force of the electric motor 111 is transmitted by the worm gear 112 to the steering operation shaft 81, but with the force application portion 27' shown in FIG. 31, the worm gear 112 or other such reduction gear device may not be used, and the rotary shaft of the electric motor 111 may be directly connected to the steering operation shaft 81.

With the steering operation device 8 shown in FIG. 5, the joystick lever 24 itself is able to rotate to the inside or outside of the driver's seat around a vertical axis. The joystick lever 24 of the steering operation device 8' shown in FIG. 30 may itself be configured so that it can rotate to the inside or outside of the driver's seat around a horizontal axis. In other words, what is important is that the pilot valve 42' operates on the basis of the operation of the joystick lever 24, and the force from the force imparting component 27 can be transmitted to the joystick lever 24.

Also, with the steering operation device 8', the deviation angle α is calculated on the basis of the value θs sensed by the steering angle sensor 104 instead of the second rotation angle sensor 102 shown in FIG. 9, and the second assist torque determination component 202 determines the second assist torque. Instead of using the deviation angle, a sensor for sensing the position of the spool 71' may be provided to the spool-type pilot valve 42' to determine the second assist torque from the position of the spool 71' as in Embodiment 2.

The electrical transmission may be performed by wire or wirelessly.

FIG. 30 shows the steering operation device 8' as an example of the configuration of a modification example of Embodiment 1, but a configuration in which the operation of the joystick lever 24 is electrically transmitted to the pilot valve (the configuration shown in FIG. 30) may be applied to Embodiments 2, 3, and 4.

(J) In the above embodiments, two springs (the first spring 64 and the second spring 65) are provided, but the second spring 65 need not be provided. In this case, for example, what is important is that the portion between the feedback spool 73 and the feedback sleeve 74 is fixed.

(K) In the above embodiments, the configuration is such that the amount of fluid supplied from the steering valve 32 to the steering cylinders 21 and 22 is controlled according to the pilot pressure inputted from the pilot valve 42 (an example of a control valve), but the configuration may instead be such that fluid from the pilot valve 42 is supplied directly to the steering cylinders 21 and 22.

(L) In the above embodiments, a force is generated by the electric motor 111, but an electric motor is not the only option, and a hydraulic motor or the like may be used instead. That is, what is important is that it is an actuator or the like capable of generating the force to be imparted.

(M) In the above embodiments, the drive circuit 204 is included in the controller 28, but it need not be included in the controller 28, and just the drive circuit 204 may be mounted as a single unit. Furthermore, the drive circuit 204 may be mounted on an electric motor.

(N) In the above embodiments, the wheel loader 1 is given as an example of a work vehicle, but a wheel loader is not the only option, and it may be an articulated dump truck, motor grader, or the like, or any articulated work vehicle.

The work vehicle and work vehicle control method of the present invention have the effect of facilitating fine operations, and are useful in a wheel loader or the like.

The invention claimed is:

1. An articulated work vehicle in which a front frame is linked to a rear frame, the articulated work vehicle comprising:
   a joystick lever configured to be operated by an operator, the joystick lever being usable to set a target steering angle;
   a hydraulic actuator driven by hydraulic pressure, the hydraulic actuator being configured to perform an articulation to change an actual steering angle of the front frame with respect to the rear frame in response to operation of the joystick lever;
   a control valve configured to control flow of fluid supplied to the hydraulic actuator so as to make the actual steering angle coincide with the target steering angle;
   a force imparting component configured to apply an assisting force or a counterforce to operation of the joystick lever; and
   a controller configured to control the force imparting component so as to generate resistance to operation of the joystick lever based on a start timing of an articulation.

2. The articulated work vehicle according to claim 1, wherein
   the controller is further configured to control the force imparting component so as to generate resistance to the operation of the joystick lever from a first position of the joystick lever in a state in which a deviation angle between the target steering angle and the actual steering angle is zero, to a second position of the joystick lever at which the articulation begins.

3. The articulated work vehicle according to claim 1, wherein
   the controller is further configured to generate resistance to the operation of the joystick lever by decreasing the assisting force or increasing the counterforce produced by the force imparting component.

4. The articulated work vehicle according to claim 1, further comprising:
   a steering valve configured to adjust the flow of fluid supplied to the hydraulic actuator based on a pilot pressure inputted from the control valve,
   the control valve being configured to control the flow of fluid supplied from the steering valve to the hydraulic actuator by adjusting the pilot pressure, and
   the controller being further configured to control the force imparting component so that an opening timing of the steering valve is within a period during which the resistance is generated.

5. The articulated work vehicle according to claim 1, wherein
   the control valve includes
   a first input member displaced according to the target steering angle,
   a second input member displaced according to the actual steering angle, and
   a biasing component biasing the first input member so that an amount of displacement of the first input member coincides with an amount of displacement of the second input member,
   a difference between the amount of displacement of the first input member and the amount of displacement of the second input member corresponds to a deviation angle between the target steering angle and the actual steering angle, and
   the joystick lever is further configured to be operated against the biasing force of the biasing component.

6. The articulated work vehicle according to claim 1, further comprising:
   a timing sensor configured to sense a timing at which generation of resistance is started, the timing being preset based on the start timing of the articulation,
   the controller being further configured to control the force imparting component so as to start generating resistance against the operation of the joystick lever when the timing sensor senses the timing at which the generation of resistance is started.

7. The articulated work vehicle according to claim 6, wherein
the timing sensor includes
a target steering angle sensor configured to sense the target steering angle, and
an actual steering angle sensor configured to sense the actual steering angle, and
the controller is further configured to control the force imparting component so as to start the generation of resistance against the operation of the joystick lever at a point when a deviation angle calculated from a sensing value of the target steering angle sensor and a sensing value of the actual steering angle sensor reaches a specific value preset based on the start timing of the articulation.

8. The articulated work vehicle according to claim 6, further comprising:
a steering valve configured to adjust the flow of fluid supplied to the hydraulic actuator based on a pilot pressure inputted from the control valve,
the control valve being further configured to control the flow of fluid supplied from the steering valve to the hydraulic actuator by adjusting the pilot pressure.

9. The articulated work vehicle according to claim 8, wherein
the timing sensor is configured to sense a position of a valve body of the steering valve, and
the controller is further configured to control the force imparting component so as to start the generation of resistance against the operation of the joystick lever at a point when the position of the valve body sensed by the timing sensor reaches a specific value set in advance based on the start timing of the articulation.

10. The articulated work vehicle according to claim 8, wherein
the timing sensor is configured to sense the pilot pressure, and
the controller is further configured to control the force imparting component so as to start the generation of resistance against the operation of the joystick lever at a point when the pilot pressure sensed by the timing sensor reaches a specific value preset based on the start timing of the articulation.

11. The articulated work vehicle according to claim 8, further comprising:
a pump configured to supply fluid to the hydraulic actuator via the steering valve,
the timing sensor being configured to sense a load pressure on the pump, and
the controller being further configured to control the force imparting component so as to start the generation of resistance against the operation of the joystick lever at a point when the load pressure on the pump sensed by the timing sensor reaches a specific value set in advance based on the start timing of the articulation.

12. The articulated work vehicle according to claim 1, further comprising:
a torque sensor configured to sense a torque produced by operation of the joystick lever,
the force imparting component including an electric motor as a drive source, and
the controller being further configured to control the force imparting component based on a value sensed by the torque sensor.

13. The articulated work vehicle according to claim 7, further comprising:
a torque sensor configured to sense a torque produced by operation of the joystick lever,
the force imparting component including an electric motor as a drive source, and
the controller further including
a calculator configured to calculate a force to be imparted to the operation of the joystick lever by matching imparted force that is preset for sensed torque to an imparted force being preset for the deviation angle, and
an operation controller configured to operate the force imparting component so that the calculated force will be imparted.

14. The articulated work vehicle according to claim 9, further comprising:
a torque sensor configured to sense a torque produced by operation of the joystick lever,
the force imparting component including an electric motor as a drive source, and
the controller further including
a calculator configured to calculate a force to be imparted to the operation of the joystick lever by matching an imparted force preset for the torque to an imparted force preset for the position of the valve body, and
an operation controller configured to operate the force imparting component so that the calculated force will be imparted.

15. The articulated work vehicle according to claim 10, further comprising:
a torque sensor configured to sense a torque produced by operation of the joystick lever,
the force imparting component including an electric motor as a drive source, and
the controller further including
a calculator configured to calculate a force to be imparted to the operation of the joystick lever by matching an imparted force preset for the torque to an imparted force preset for the pilot pressure, and
an operation controller configured to operate the force imparting component so that the calculated force will be imparted.

16. The articulated work vehicle according to claim 11, further comprising:
a torque sensor configured to sense a torque produced by operation of the joystick lever,
the force imparting component including an electric motor as a drive source, and
the controller further including
a calculator configured to calculate a force to be imparted to the operation of the joystick lever by matching an imparted force preset for the torque to an imparted force preset for the load pressure of the pump, and
an operation controller configured to operate the force imparting component so that the calculated force will be imparted.

17. The articulated work vehicle according to claim 14, further comprising:
a speed sensor configured to sense a speed of the work vehicle, the imparted force preset for the torque being varied based on the speed sensed by the speed sensor.

18. The articulated work vehicle according to claim 1, wherein
the control valve is linked to the joystick lever.

19. A method for controlling an articulated work vehicle in which a front frame and a rear frame are linked, the method for controlling the articulated work vehicle comprising:
- acquiring a first signal from a timing sensor configured to sense a start timing of an articulation;
- generating a second signal usable to generate resistance against operation of a joystick lever based on the first signal; and
- transmitting the second signal to a force imparting component configured to impart an assisting force or a counterforce to the operation of the joystick lever.

20. The method for controlling the articulated work vehicle according to claim 19, further comprising:
- acquiring a third signal from a torque sensor configured to sense torque produced by operation of the joystick lever,
- the generating a second signal including
  - a first determination operation in which counterforce to be imparted to the operation of the joystick lever is determined based on the first signal, and a fourth signal is outputted,
  - a second determination operation in which assisting force or counterforce to be imparted to the operation of the joystick lever is determined based on the third signal, and a fifth signal is outputted, and
  - a computation operation in which the counterforce indicated by the fourth signal and the assisting force or counterforce indicated by the fifth signal are added together to generate the second signal.

* * * * *